Oct. 20, 1959 R. W. HUTTON ET AL 2,909,611
MULTI-GROUP DIRECT-ACCESS CROSSBAR TELEPHONE SWITCHING SYSTEM
Filed June 5, 1953 29 Sheets-Sheet 3
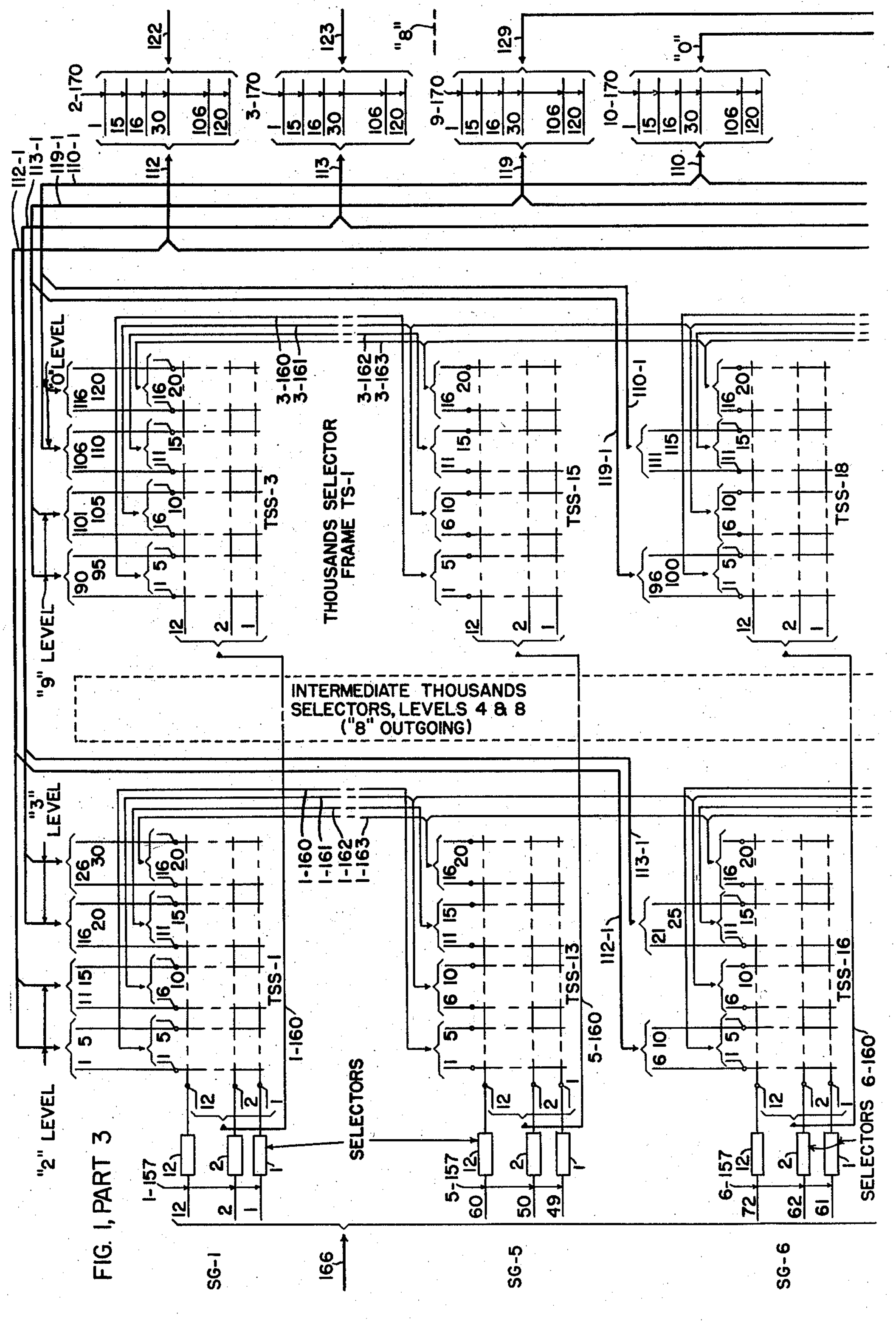
FIG. 1, PART 3

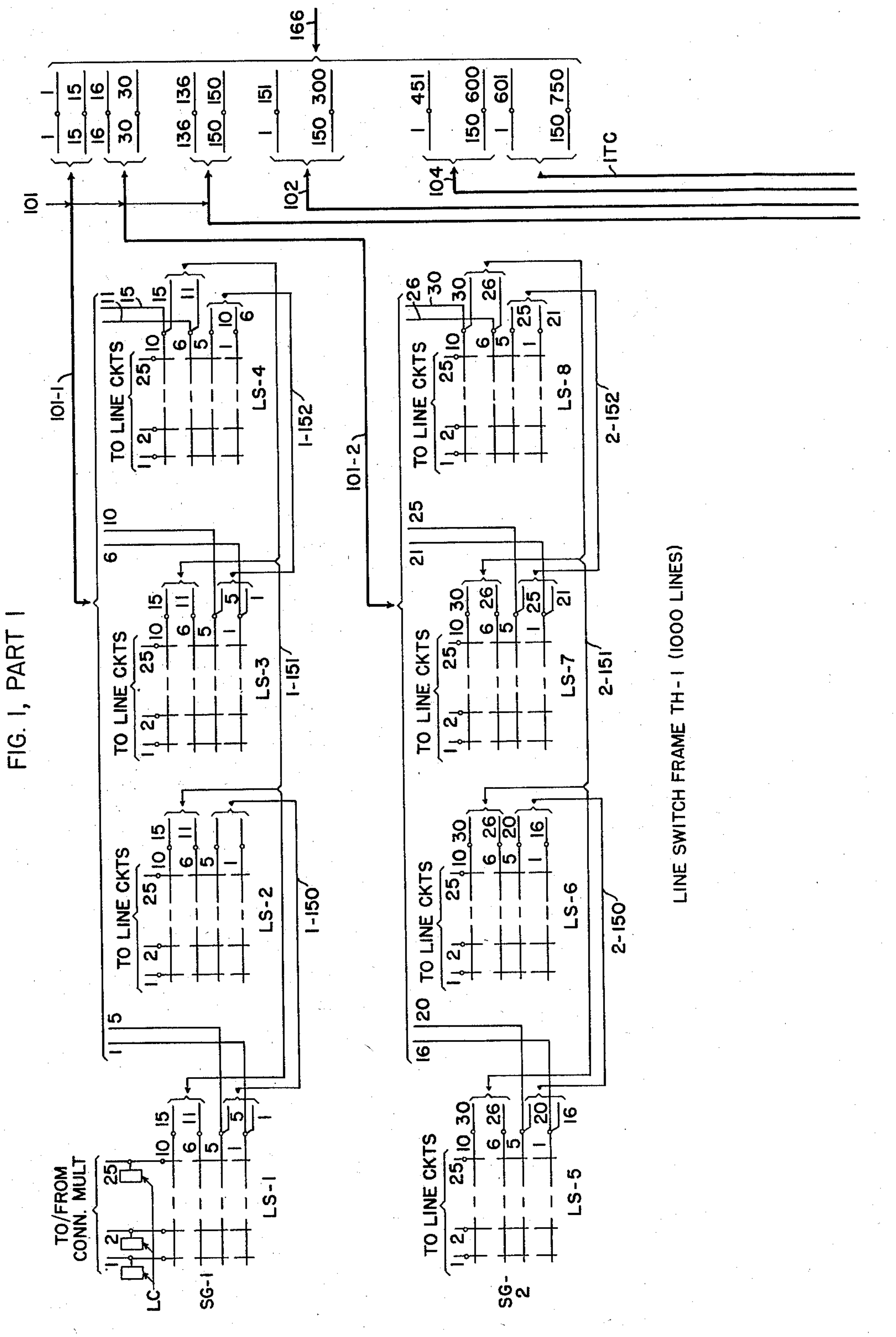
FIG. 1, PART I

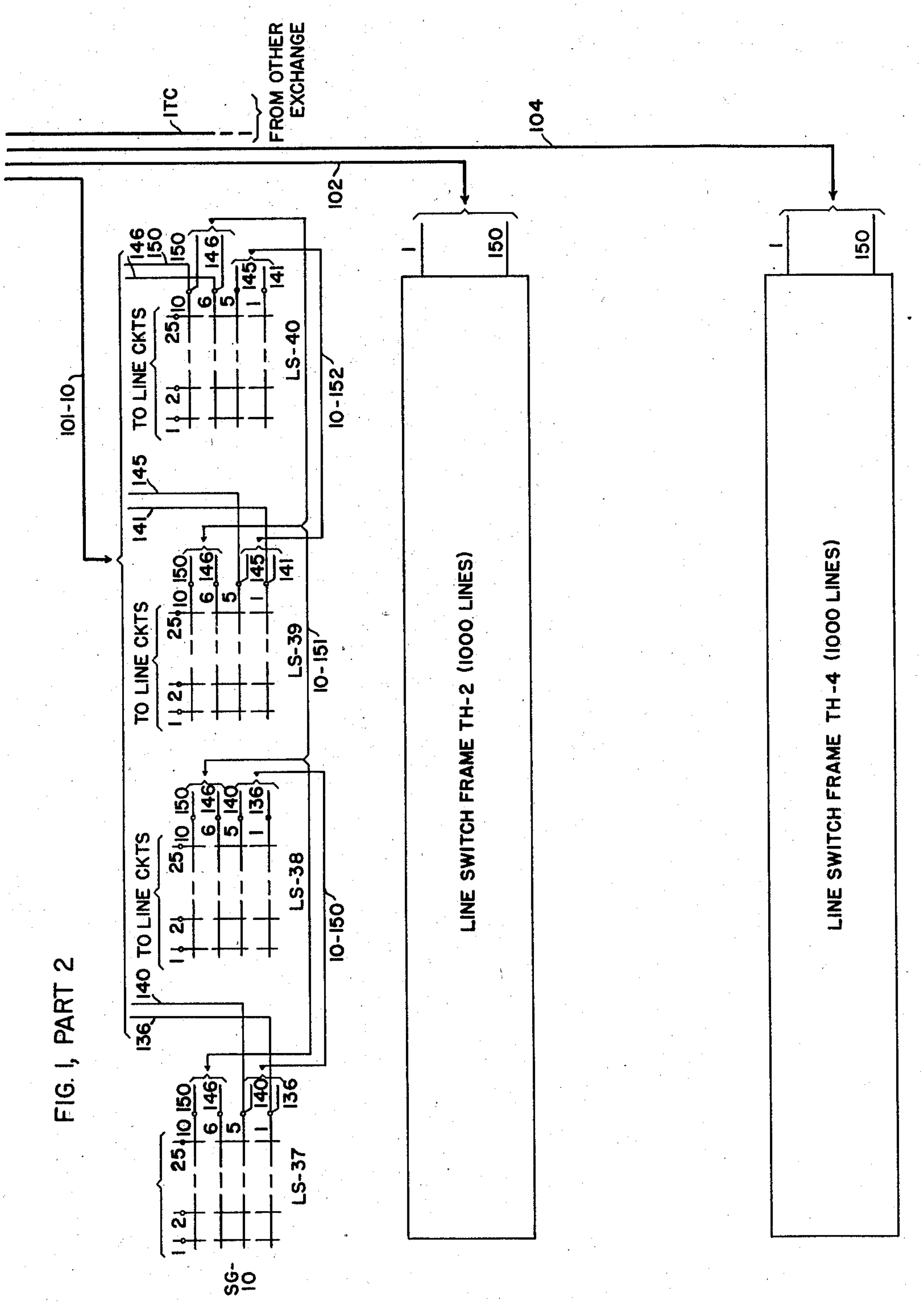
FIG. 1, PART 2

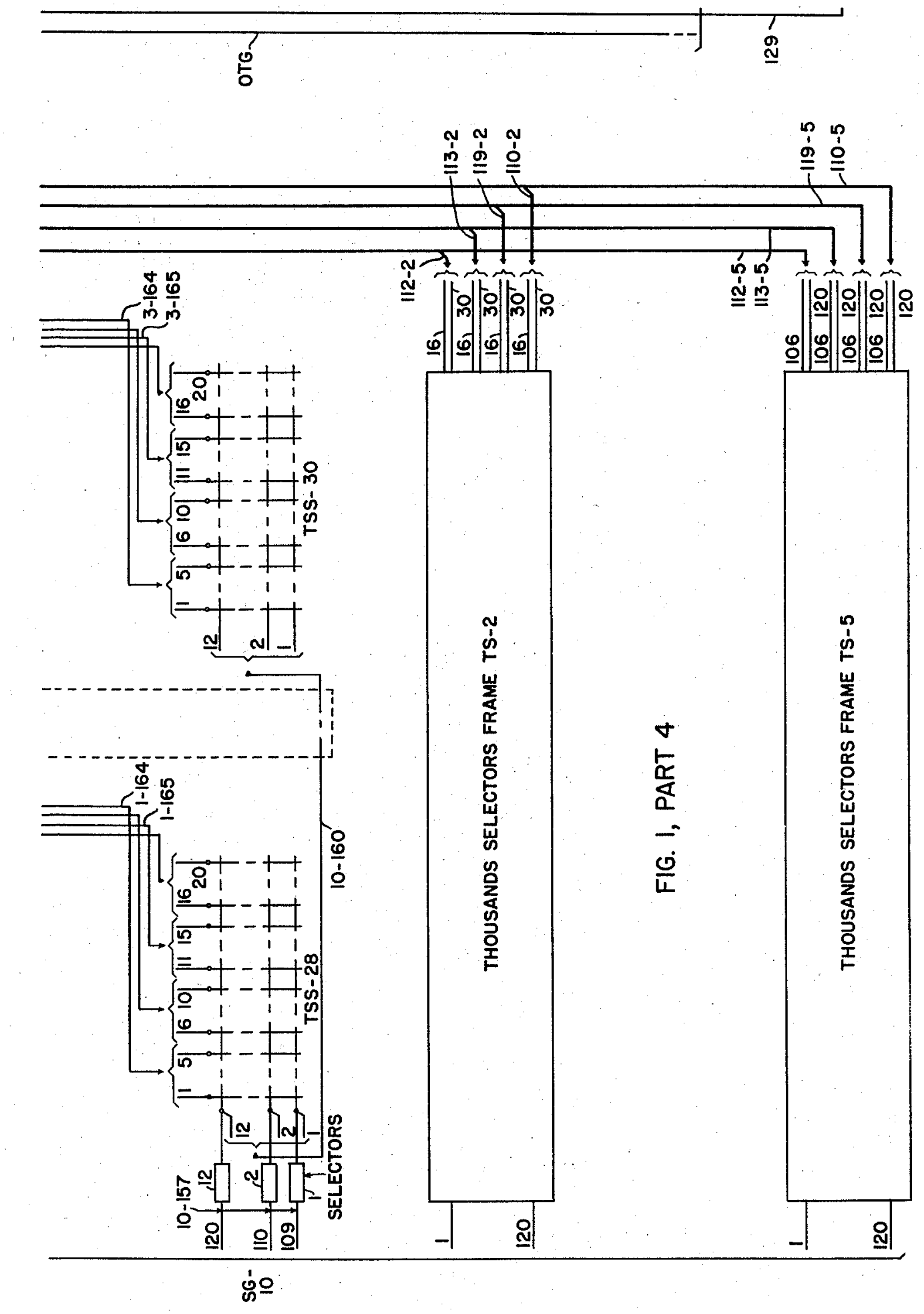
FIG. 1, PART 4

MULTI-GROUP DIRECT-ACCESS CROSSBAR TELEPHONE SWITCHING SYSTEM
Filed June 5, 1953 29 Sheets-Sheet 5
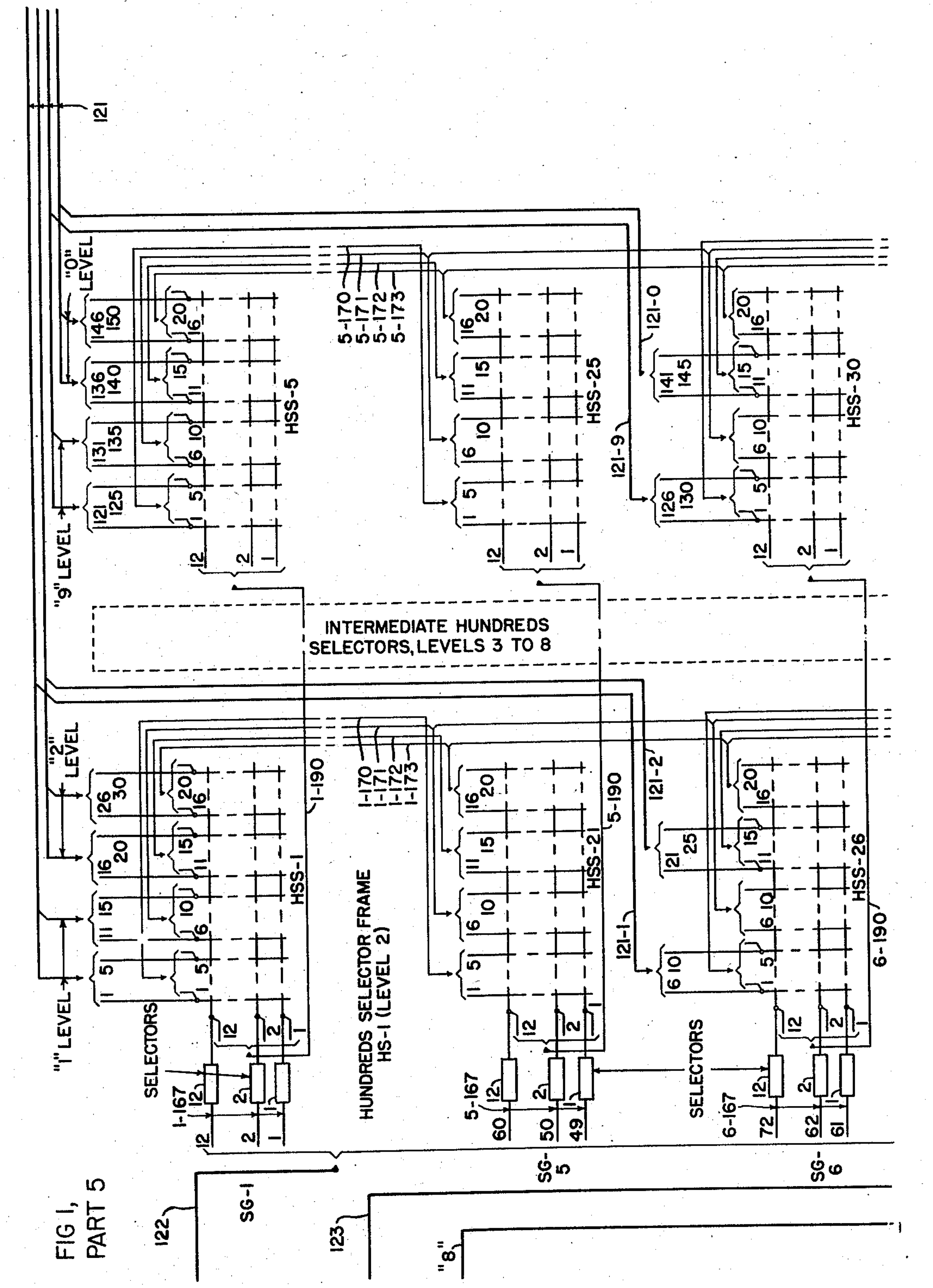
FIG 1, PART 5

Oct. 20, 1959 R. W. HUTTON ET AL 2,909,611
MULTI-GROUP DIRECT-ACCESS CROSSBAR TELEPHONE SWITCHING SYSTEM
Filed June 5, 1953 29 Sheets-Sheet 6
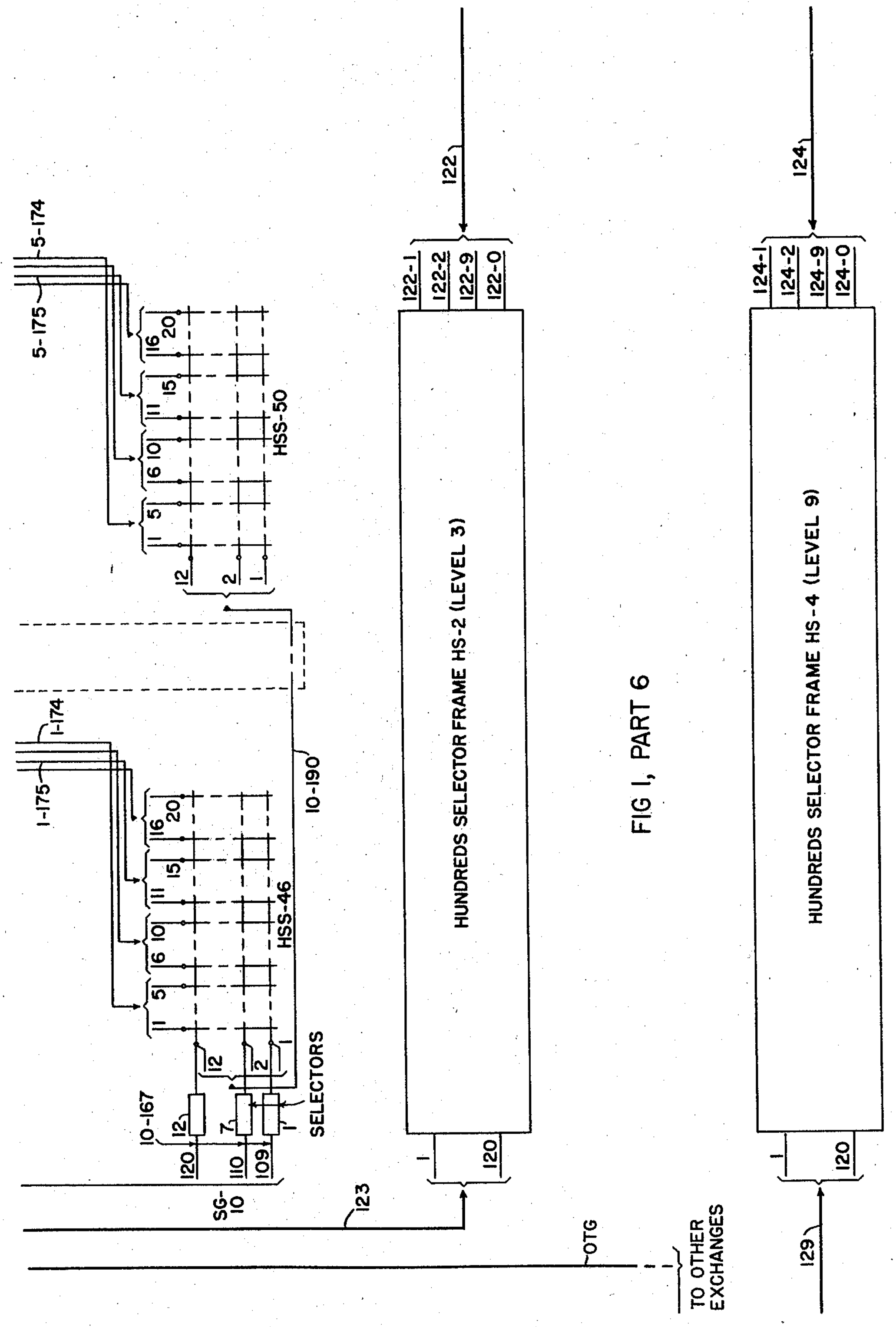
FIG 1, PART 6

Oct. 20, 1959 R. W. HUTTON ET AL 2,909,611
MULTI-GROUP DIRECT-ACCESS CROSSBAR TELEPHONE SWITCHING SYSTEM
Filed June 5, 1953 29 Sheets-Sheet 7
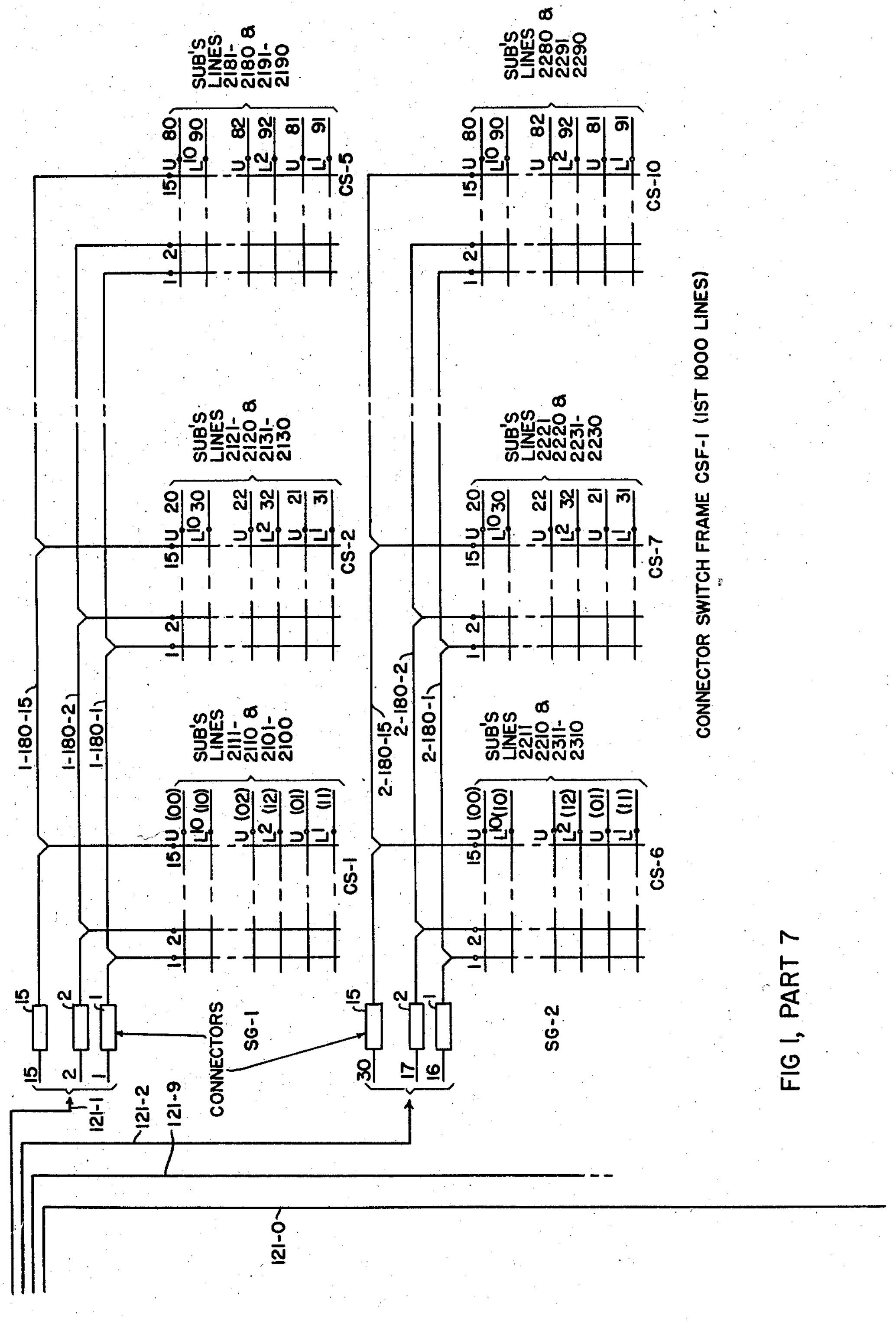
FIG 1, PART 7

Oct. 20, 1959 R. W. HUTTON ET AL 2,909,611
MULTI-GROUP DIRECT-ACCESS CROSSBAR TELEPHONE SWITCHING SYSTEM
Filed June 5, 1953 29 Sheets-Sheet 8
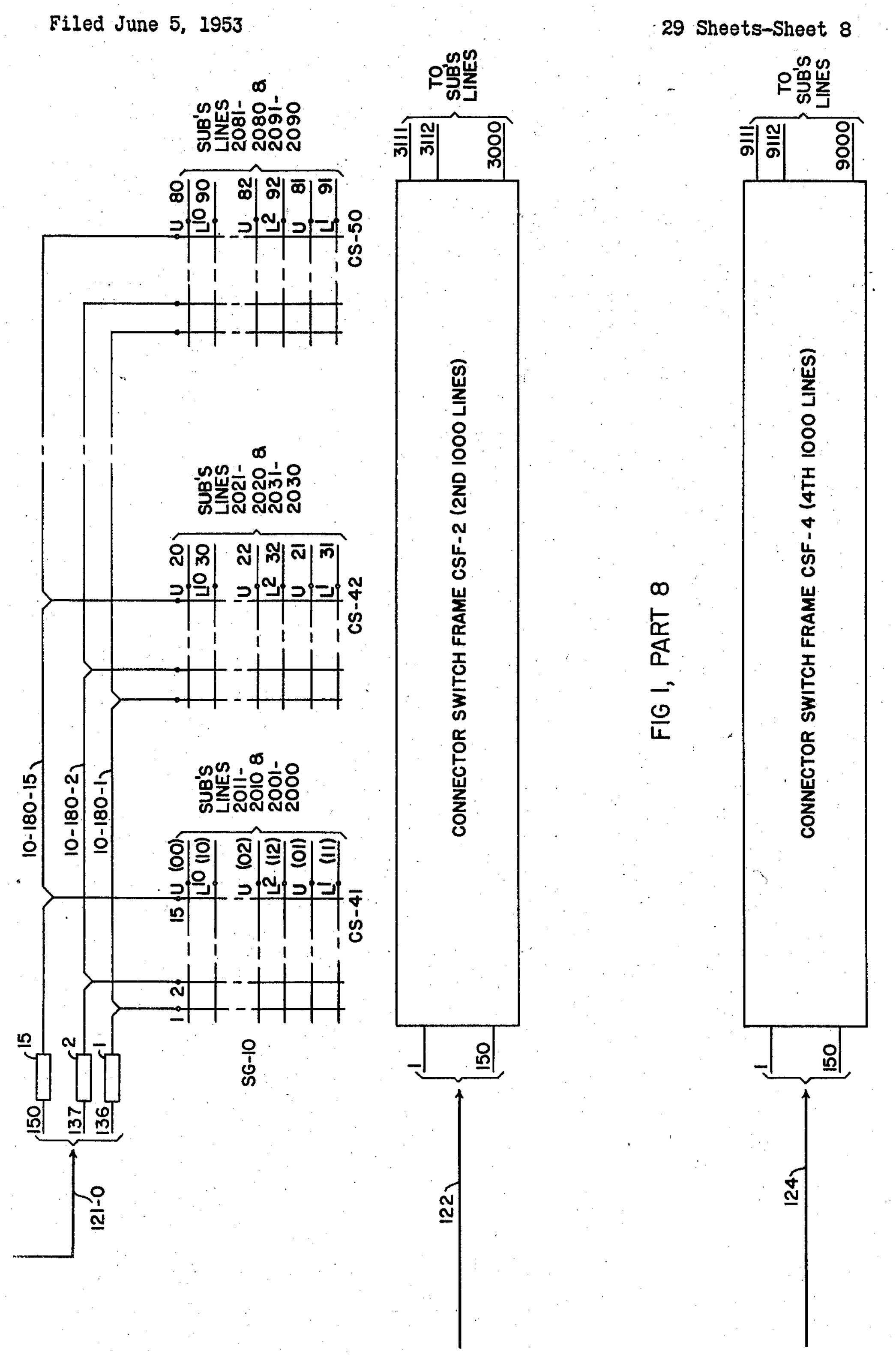
FIG I, PART 8

Oct. 20, 1959 R. W. HUTTON ET AL 2,909,611

MULTI-GROUP DIRECT-ACCESS CROSSBAR TELEPHONE SWITCHING SYSTEM

Filed June 5, 1953 29 Sheets-Sheet 14

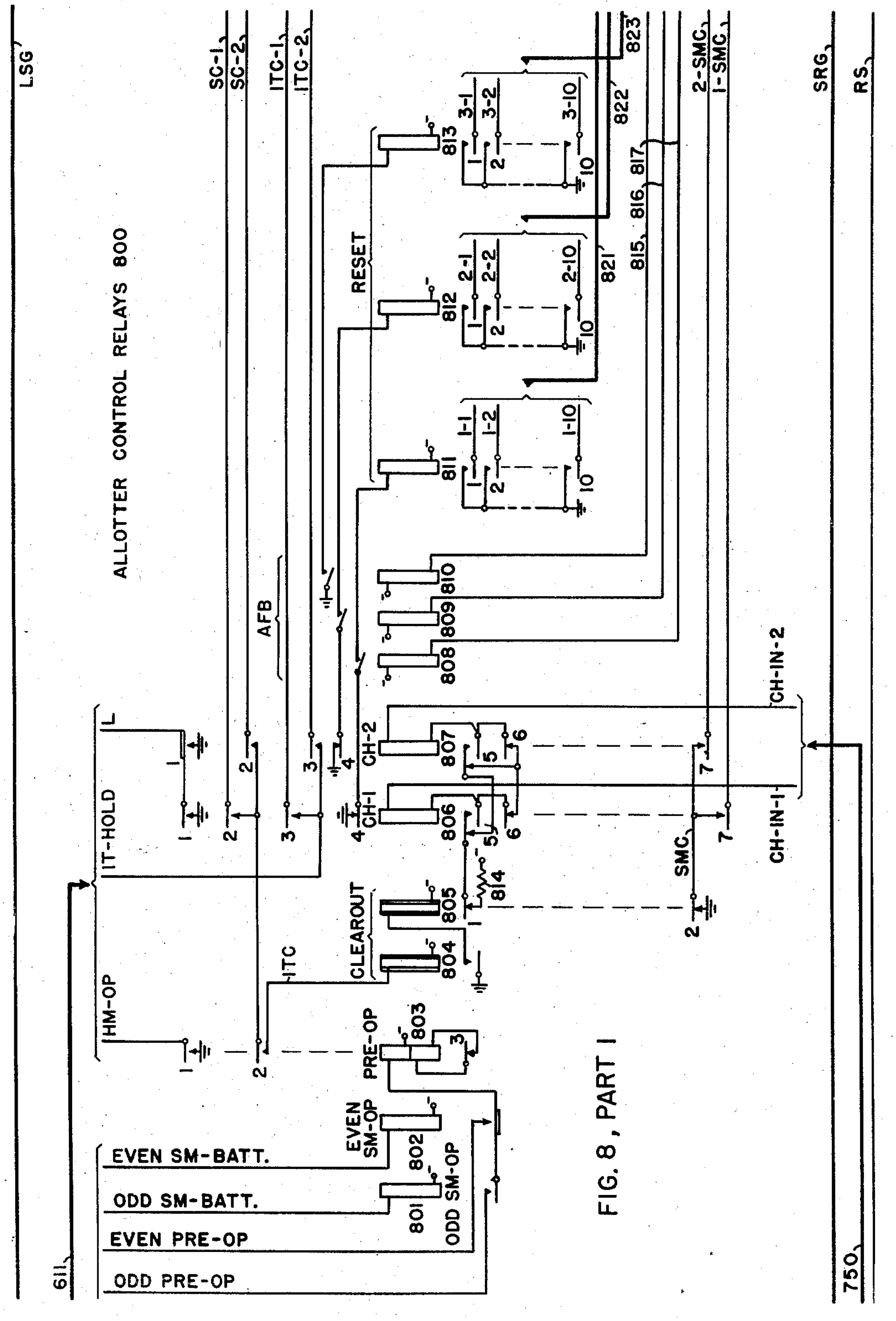
FIG. 8, PART I

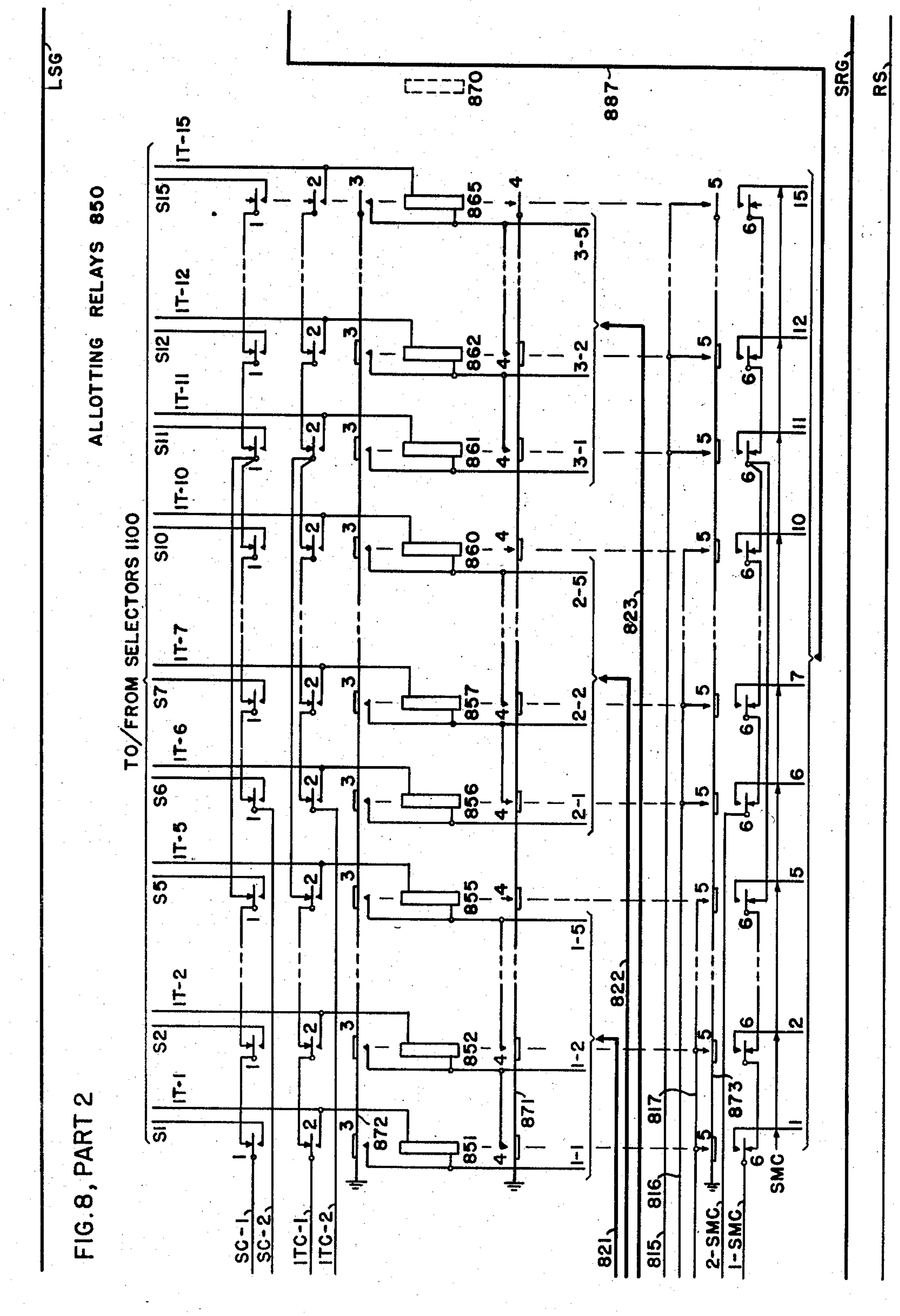
FIG. 8, PART 2

COMMON TEST RELAYS 1350

Oct. 20, 1959 R. W. HUTTON ET AL 2,909,611

MULTI-GROUP DIRECT-ACCESS CROSSBAR TELEPHONE SWITCHING SYSTEM

Filed June 5, 1953 29 Sheets-Sheet 23

MULTI-GROUP DIRECT-ACCESS CROSSBAR TELEPHONE SWITCHING SYSTEM
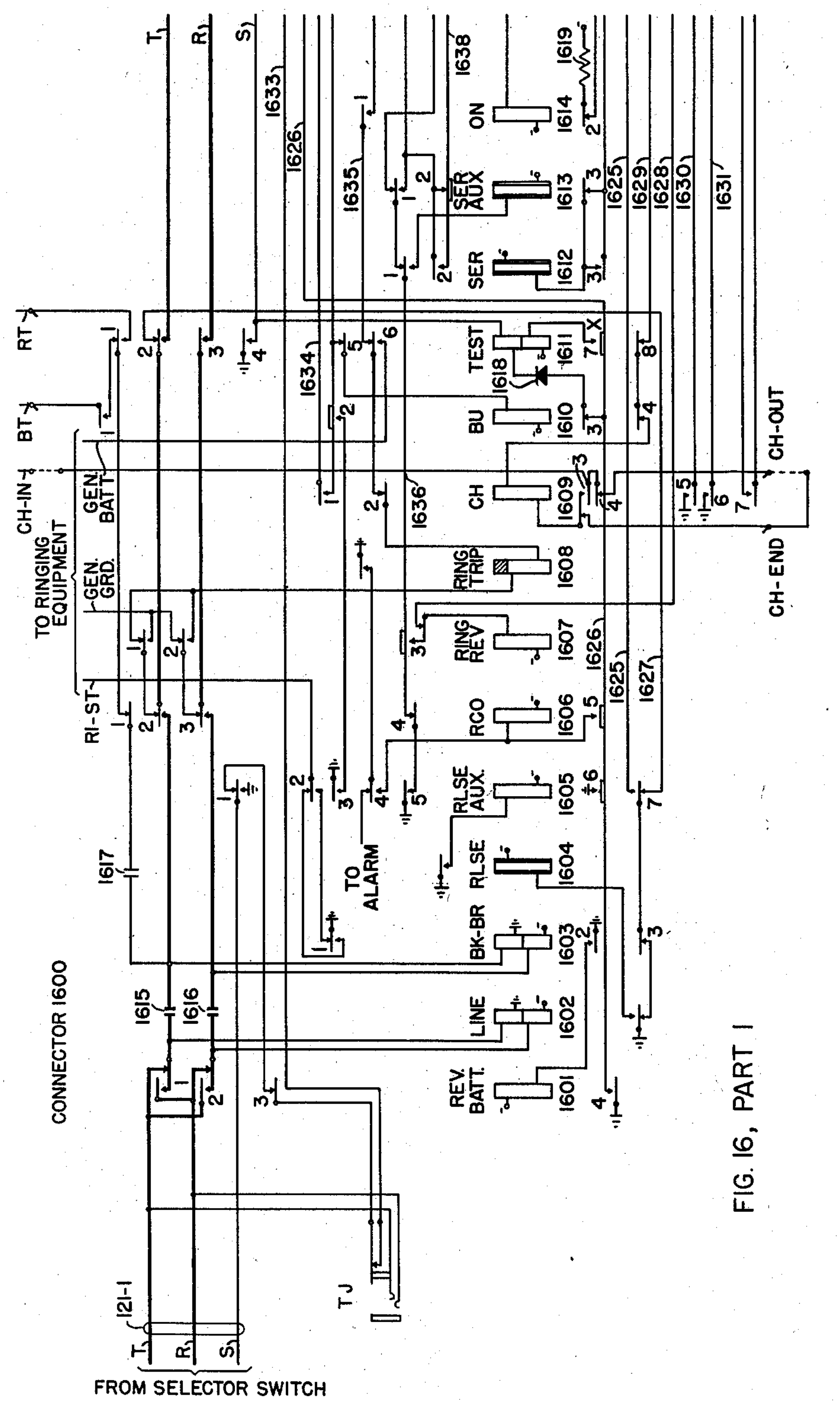
FIG. 16, PART 1

FIG. 16, PART 2
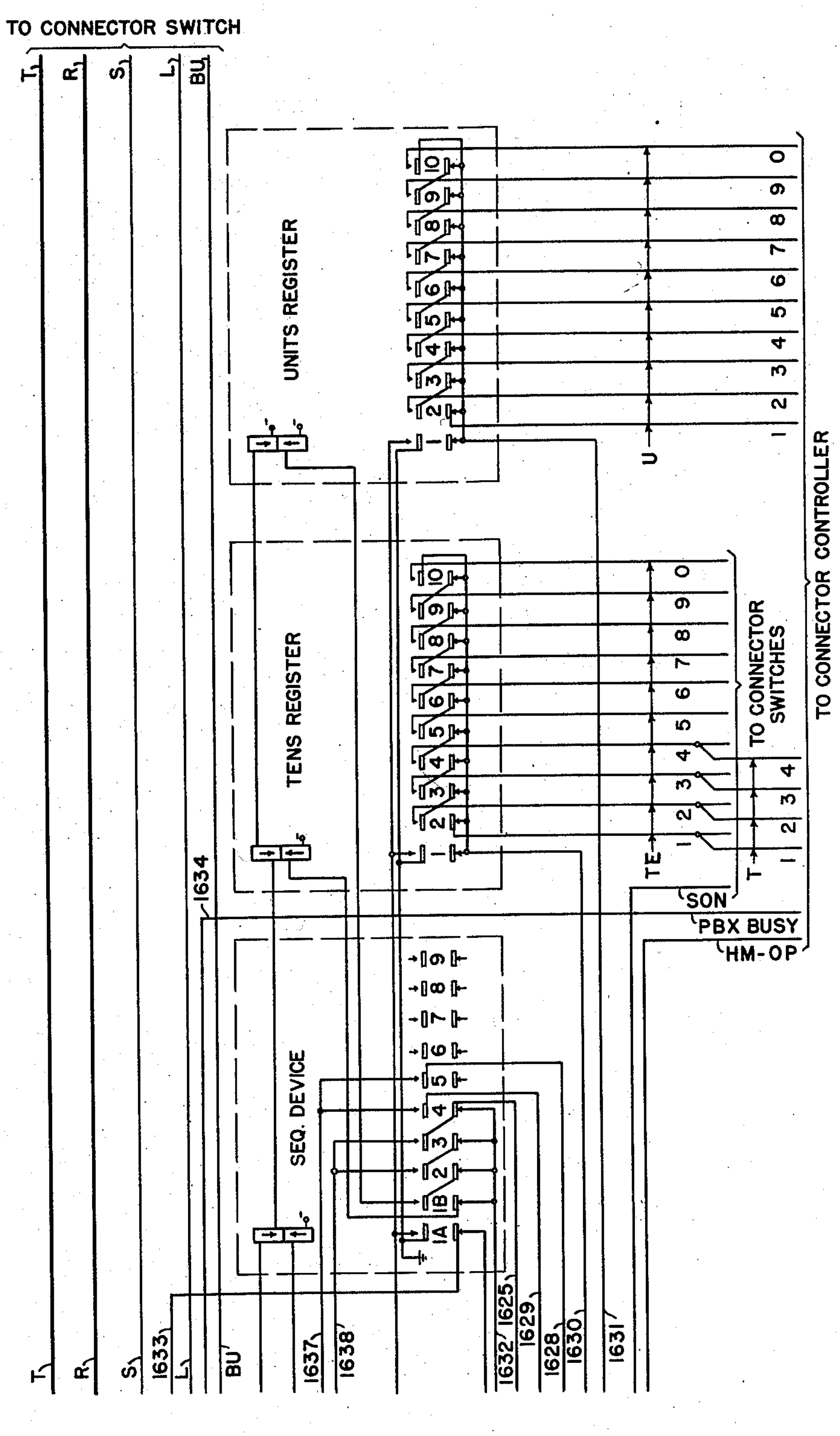

CONNECTOR SWITCH CONNECT RELAYS 1850

Oct. 20, 1959 R. W. HUTTON ET AL 2,909,611

MULTI-GROUP DIRECT-ACCESS CROSSBAR TELEPHONE SWITCHING SYSTEM

Filed June 5, 1953 29 Sheets-Sheet 28

GENERAL TRUNKING DIAGRAM

CALL-THROUGH DIAGRAM

LINE CONTROLLER AND LINE SWITCH

THOUSANDS SELECTOR

HUNDREDS SELECTOR

SELECTOR CONTROLLER AND SELECTOR SWITCH

CONNECTOR

CONNECTOR CONTROLLER AND CONNECTOR SWITCH

United States Patent Office 2,909,611

Patented Oct. 20, 1959

2,909,611

MULTI-GROUP DIRECT-ACCESS CROSSBAR TELEPHONE SWITCHING SYSTEM

Robert W. Hutton, Chicago, and Arthur T. Sigo, Maywood, Ill., and Charles J. Adams, Los Gatos, Calif., assignors to International Telephone and Telegraph Corporation, a corporation of Maryland Application June 5, 1953, Serial No. 359,761

8 Claims. (Cl. 179—18)

Table of Contents

| | Column |
|---|---|
| I. General description | 2 |
| IA. The drawings | 3 |
| II. General trunking diagram (Fig. 1) | 4 |
| IIA. Line switch frame | 4 |
| IIB. Thousands selector frame | 5 |
| IIC. Hundreds selector frame | 6 |
| IID. Connector switch frame | 7 |
| IIE. Capacity variations | 8 |
| III. General operation | 9 |
| IIIA. Initiation of call | 9 |
| IIIB. Thousands selector 1100 | 10 |
| IIIC. Hundreds selector 1200 | 11 |
| IIID. Connector 1600 | 12 |
| IV. Detailed description | 13 |
| IVA. Crossbar switches (Figs. 10, 15, and 19) | 13 |
| IVA1. Line switch 1000 | 13 |
| IVA2. Selector switch 1500 | 13 |
| IVA3. Connector switch 1900 | 13 |
| IVB. Line controller 600 (Figs. 6 to 9) | 13 |
| IVB1. Purpose and arrangement | 13 |
| IVB2. General operation | 13 |
| IVB2a. Fives group selection | 13 |
| IVB2b. Units selection | 13 |
| IVB2c. Starting | 13 |
| IVB2d. Select magnet operation | 13 |
| IVB2e. Hold magnet operation | 13 |
| IVB2f. Clearout | 15 |
| IVB3. Functional relay groups | 15 |
| IVB4. Detailed operation | 15 |
| IVB4a. Fives group selection | 15 |
| IVB4b. Units selection | 15 |
| IVB4c. 50-line group selection | 16 |
| IVB4d. Allotting relay operation | 16 |
| IVB4e. Switching relay operation | 18 |
| IVB4f. Allotting operation | 19 |
| IVB4g. Clearout | 20 |
| IVB4h. Alarms | 21 |
| IVC. Thousands selector 1100 (Fig. 11) | 21 |
| IVC1. Circuit functions of selector 1100 | 21 |
| IVC2. Relay functions of selector 1100 | 22 |
| IVC3. Detailed operation | 22 |
| IVC3a. Seizure | 23 |
| IVC3b. Receipt of digit pulses | 23 |
| IVC3c. Digit "1" absorption | 24 |
| IVC3d. Selector 1100 relay operation | 24 |
| IVC3e. Clearout | 26 |
| IVC3f. Restricted service | 26 |
| IVC3g. Test jack TJ | 26 |
| IVD. Hundreds selector 1200 (Fig. 12) | 27 |
| IVD1. Circuit functions of selector 1200 | 27 |
| IVD2. Detailed operation | 27 |
| IVD2a. Seizure | 27 |
| IVD2b. Receipt of digit impulses | 27 |
| IVD2c. Selector 1200 relay operation | 28 |
| IVD2d. Clearout | 28 |
| IVD2e. Test jack TJ | 29 |
| IVE. Selector controller 1300 (Figs. 13 to 15) | 29 |
| IVE1. Purpose and arrangement | 29 |
| IVE2. General operation | 29 |
| IVE2a. Fives group selection | 29 |
| IVE2b. Select magnet selection and operation | 29 |
| IVE2c. Hold magnet selection and operation | 29 |
| IVE2d. Clearing out | 30 |
| IVE3. Functional relay groups | 30 |
| IVE4. Detailed operation | 30 |
| IVE4a. Level relays 1400 | 30 |
| IVE4b. Common test relays 1350 | 31 |
| IVF. Connector 1600 (Figs. 16, parts 1 and 2) | 33 |
| IVF1. Circuit functions of connector 1600 | 33 |
| IVF2. Relay functions of connector 1600 | 33 |
| IVF3. Impulse counter functions of connector 1600 | 34 |
| IVF4. Detailed operation | 34 |
| IVF4a. Seizure | 34 |
| IVF4b. Tens digit registration | 35 |
| IVF4c. Units digit registration | 36 |
| IVF4d. Stations digit registration | 36 |
| IVF4e. Testing the called line | 37 |
| IVF4f. The called line test busy | 38 |
| IVF4g. Called line answer | 38 |
| IVF4h. Answered supervision | 38 |
| IVF4i. Clearout | 39 |
| IVF4j. P.B.X service | 39 |

Table of Contents—Continued

| | Column |
|---|---|
| IVG. Connector controller 1700 (Figs. 17 to 19) | 39 |
| IVG1. Purpose and arrangement | 40 |
| IVG2. General operation | 40 |
| IVG2a. P.B.X service | 41 |
| IVG3. Functional relay groups | 41 |
| IVG4. Detailed operation | 41 |
| IVG4a. P.B.X service | 42 |
| Claims | 44 |

The present invention relates to a multi-group direct-access crossbar telephone switching system, being a system capable of serving lines comprising groups such as of one hundred or of one thousand lines each, with the lines or trunks at each switching stage being each provided with sufficient sets of crossbar-switch contacts to give it direct access to all of the lines or trunks accessible thereto, as distinct from such other crossbar systems as employ intermediate links at each switching stage.

The principal object of the invention is to provide a feasible and economical system of the foregoing character which permits the lines to be grouped, and the required numerical switching stages to be operated, on a decimal basis, with the selection progressing digit-by-digit upon the dialing of the group-selecting digits of called numbers, and which employs a switching plan of sufficient flexibility that it can be used with reasonably uniform economy in any one of a wide variety of trunking and traffic situations.

A specific object is to arrange the foregoing switching plan to permit the use throughout of crossbar switches having a built-in multiple in each of the two coordinate directions (herein termed vertical and horizontal).

I. GENERAL DESCRIPTION

This invention is disclosed as embodied in a multi-thousand-line exchange which is trunk-connected with other exchanges as required.

In the illustrated embodiment, the lines comprise basic groups of one hundred, with each such group having first crossbar switches non-numerically controlled to serve as line switches, and also having second crossbar switches numerically controlled to serve as connector switches. Selection between ten such 100-line groups, serving one thousand lines, is provided by a frame of numerically controlled crossbar switches serving as hundreds selector switches within the 1000-line group.

Further frames of numerically controlled crossbar switches serve as thousands selector switches, each such frame having access to the hundreds selectors of the several 1000-line groups.

Each of the illustrated line switches is a 10 by 25 switch, having ten horizontals and twenty-five verticals, which provide termination points for ten trunks and twenty-five lines, respectively. However, it has been chosen to arrange for grading to provide fifteen trunks for the lines of any 100-line group served by four line switches. For this purpose, the lines are arranged in two sub-groups of fifty lines each. The fifteen trunks comprise two individual groups of five trunks each and one common group of five trunks. A feature of the invention is that the line controller of any trunk-graded 100-ling group, in controlling the connection of calling lines to respective idle trunks, while giving first choice to the individual trunks, directs calls evenly to the individual trunks and directs the overflow calls evenly to the common trunks.

An important feature of the invention is that reasonably efficient use can be made of standardized crossbar switches under varying requirements as to the number of numerical groups and the respective numbers of trunks therein. In carrying out this feature, the thousands and the hundreds selector switches are illustrated as of 12 by 20 capacity, each having twelve horizontals and twenty verticals. Twelve "in" trunks may connect to the horizontals of any such switch, and twenty "out" trunks may connect to its verticals. Additional "out" trunks may be rendered accessible to the same "in" trunks by connecting the in trunks to the horizontals of additional selector switches, as required. Each switch is so arranged that the twenty "out" trunks connected to its verticals may readily comprise two numerical groups of ten, or one group of ten and two groups of five, or four groups of five. On any selector frame, the switches may be arranged in superposed tiers, or shelves, with each shelf comprising a separate group of switches disposed end-to-end and horizontal-multipled to serve a separate group of twelve "in" trunks. Each shelf is provided with a separate selector controller which is numerically controllable from any associated calling "in" trunk to select any desired associated numerical group of "out" trunks and to operate the concerned crossbar switch to connect the calling "in" trunk to an idle "out" trunk in the selected group. Jumpers or straps are extended vertically between adjacent shelves to multiple the "out" trunks to corresponding verticals of as many shelves as necessary to provide the desired traffic load. By arranging that the selector controller for any shelf of crossbar selector switches chooses the trunks in any selected numerical group in a fixed order of preference, any desired degree of grading may be employed in the vertical inter-shelf strapping for any numerical group.

Another feature is that circuit arrangements in the line controllers and in the selector controllers prevent premature seizure of a trunk included in a connection being cleared out, whereby the clearing out of the involved crossbar switching apparatus is not interfered with, and double connections are consequently avoided.

Other objects and features of the invention will become apparent from the specification and claims following, considered in conjunction with the accompanying drawings comprising Figs. 1 through 20, which show one embodiment of the invention as applied to a multi-thousand line direct-access crossbar switching system of the type hereinbefore characterized.

*IA. The drawings*

Referring now to the drawings,

Fig. 1, parts 1 to 8, is a complete single-line trunking diagram showing the relationship existing between the crossbar switches employed in extending connections to and from lines and trunks;

Figs. 2 to 5, when arranged as indicated in Fig. 21 represent a call-through diagram showing briefly the apparatus involved in extending a connection from a calling line to a called line;

Figs. 6 to 9 show a circuit diagram of any line controller serving its associated one hundred subscriber lines. The line controller exercises control over the line switch (Fig. 10) in extending a connection from a calling line to an idle selector;

Figure 13:
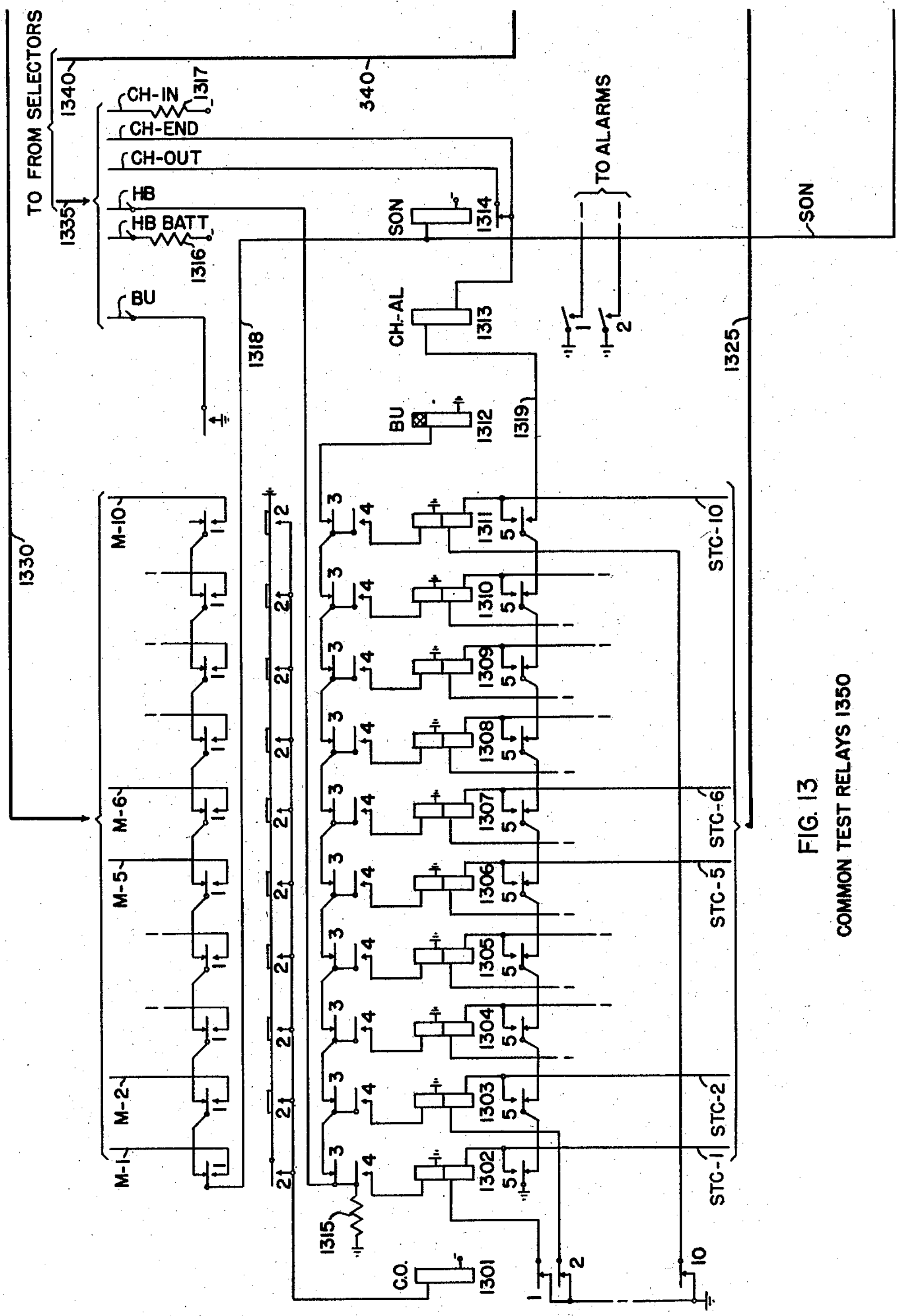
Figure 14:
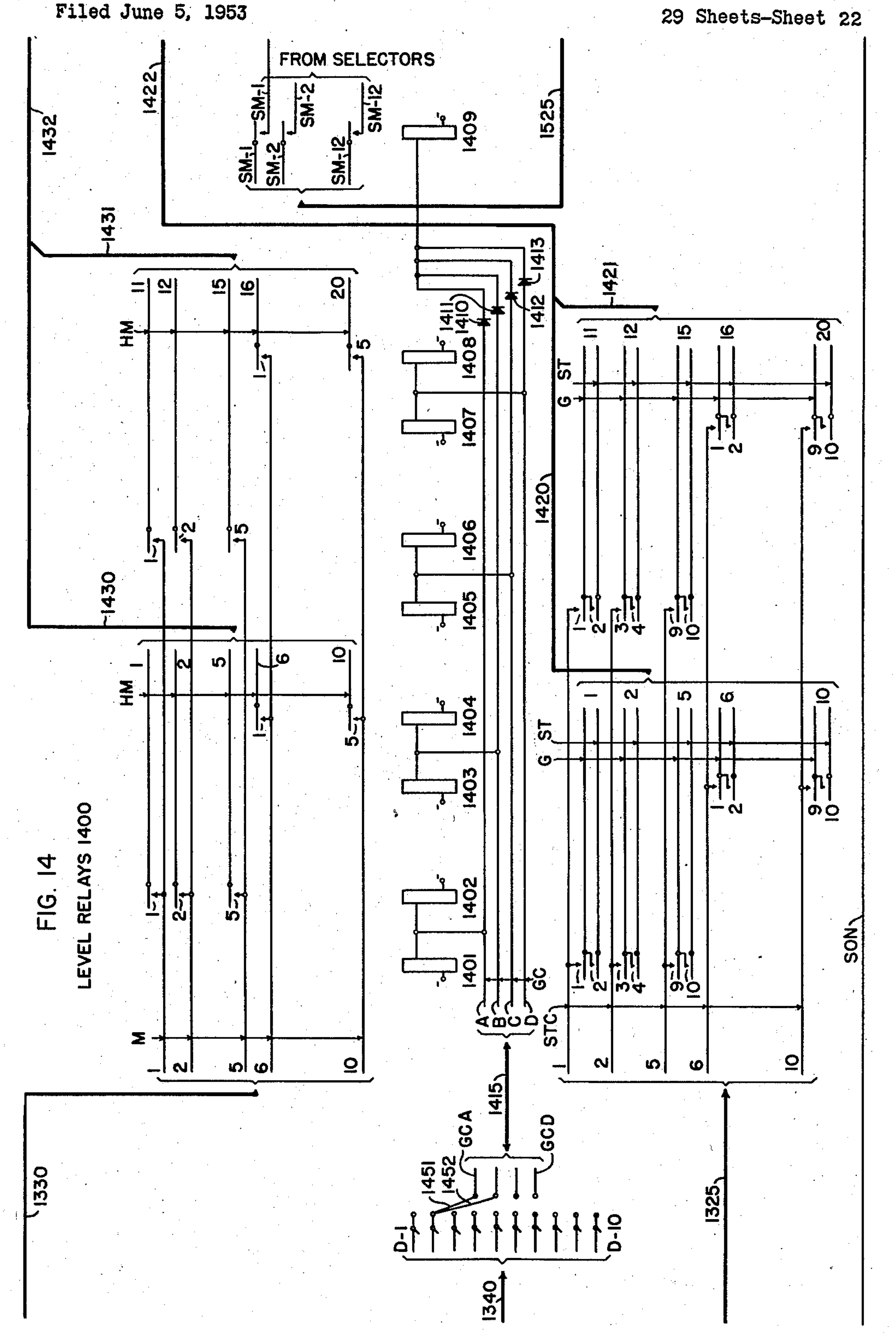
Figure 15:
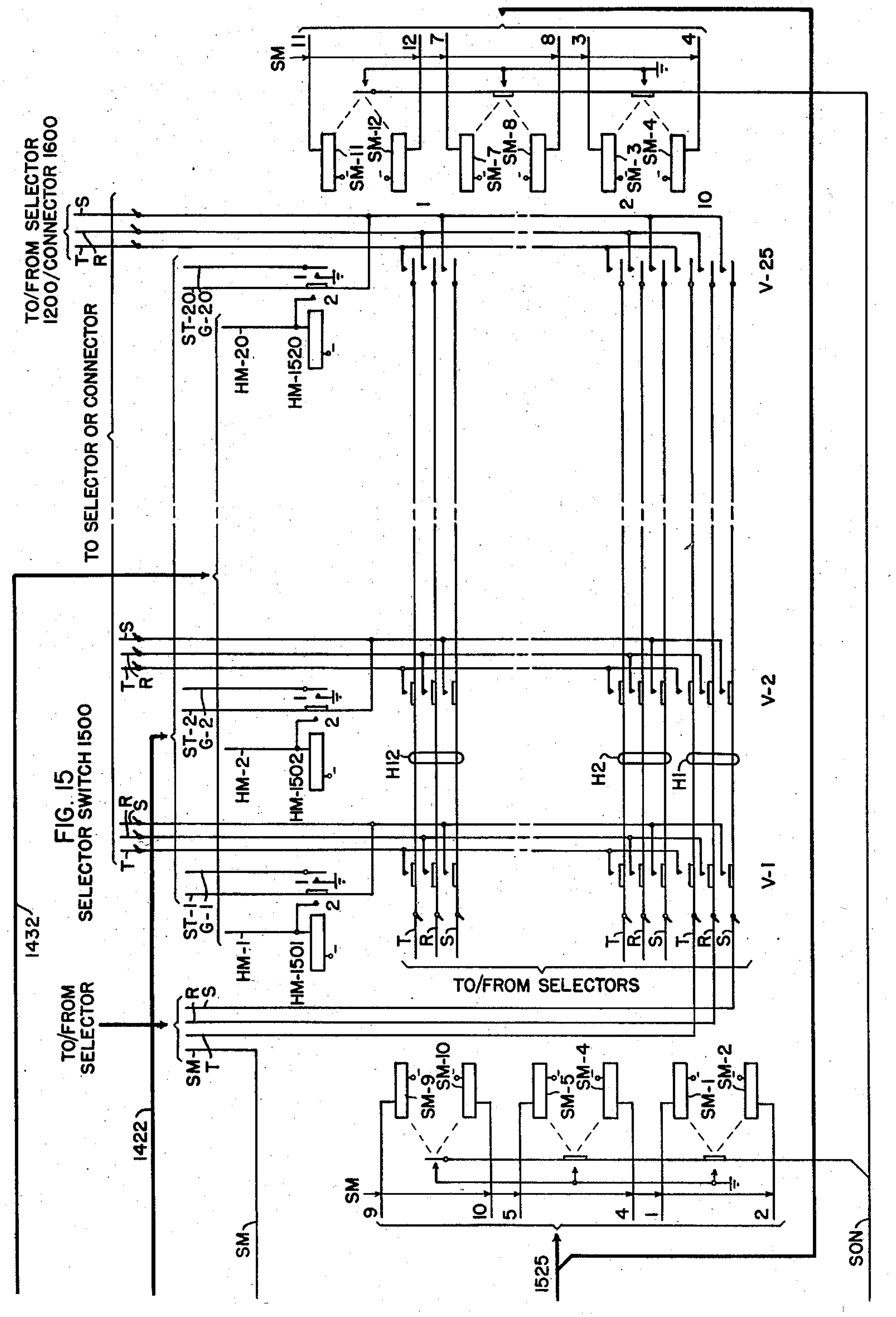
Figure 17:
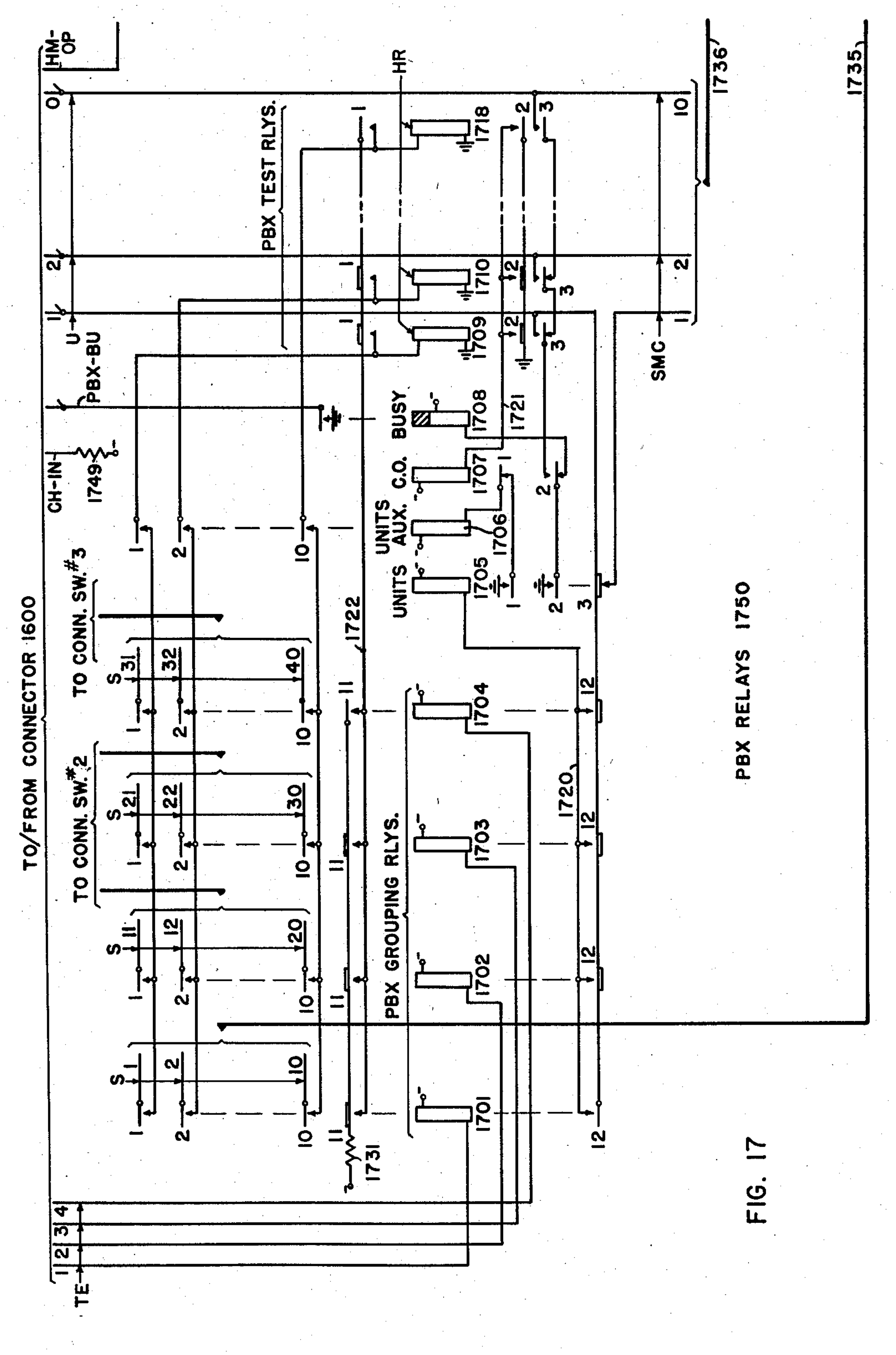
Figure 18:
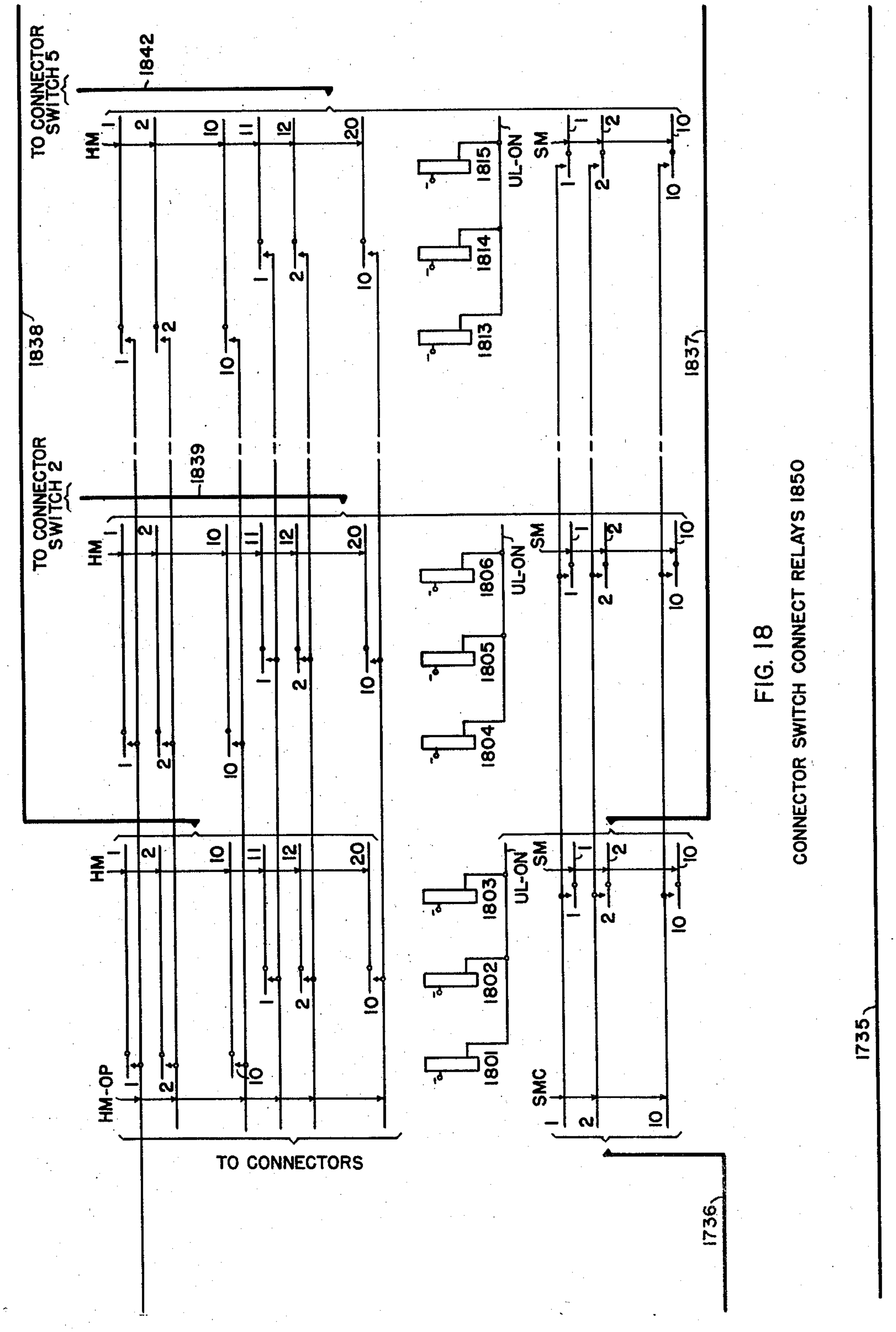
Figure 19:
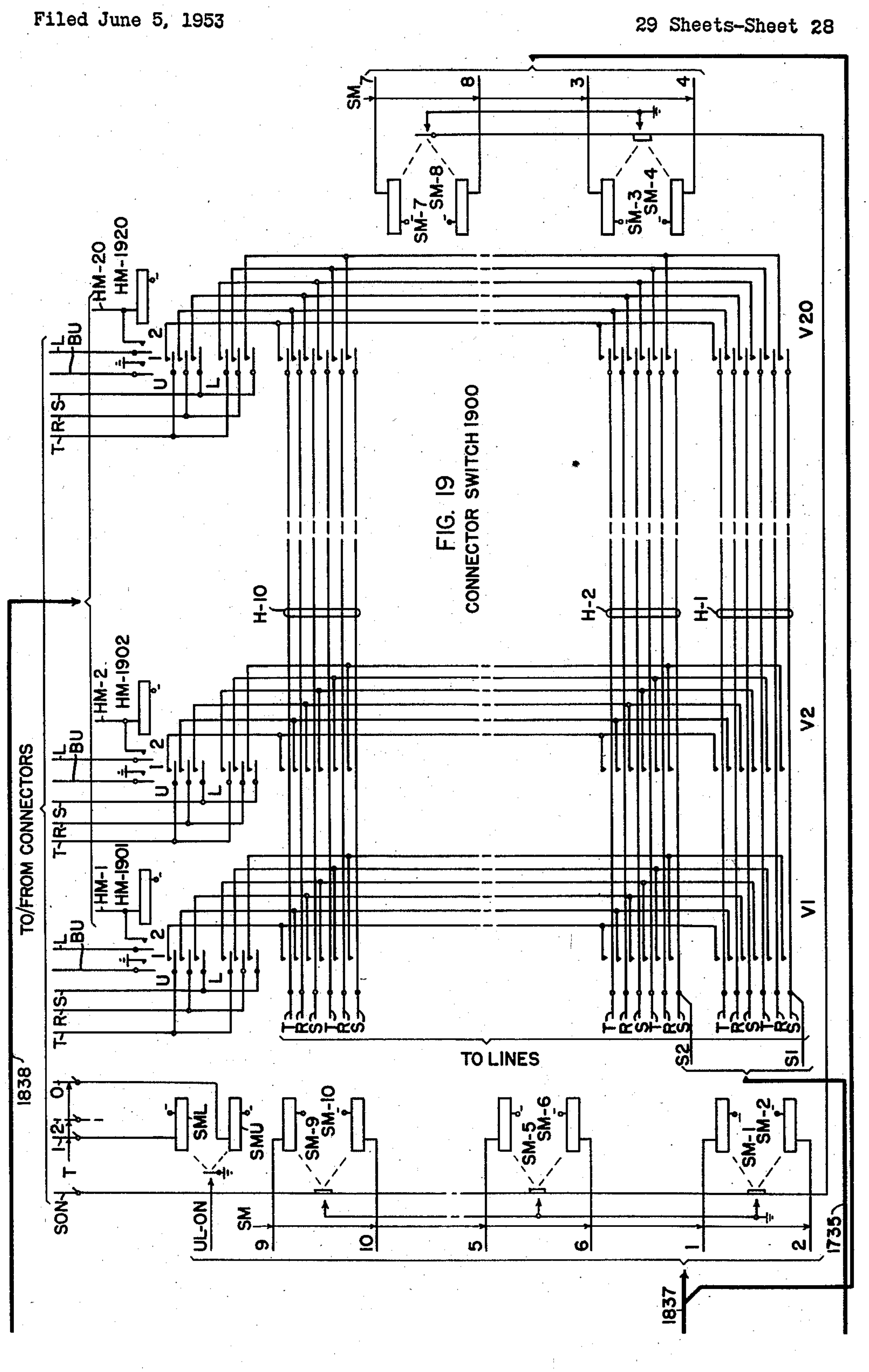
Figure 20:
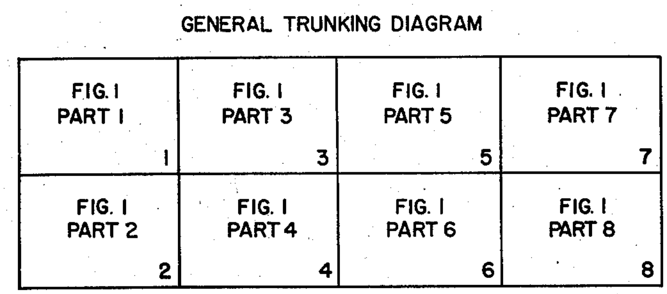
Figure 21:
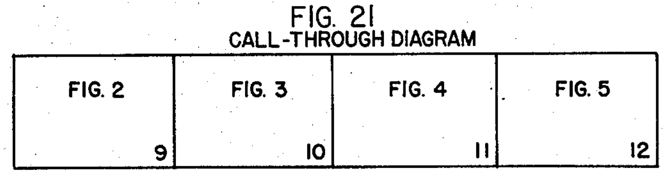
Figure 22:
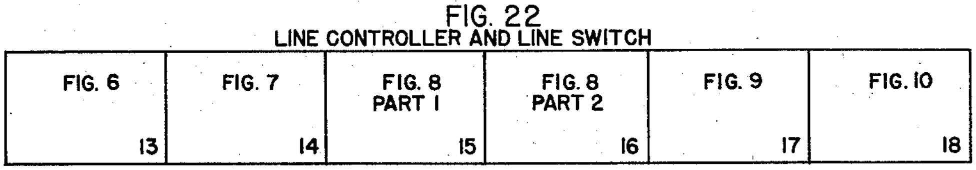
Figure 23:
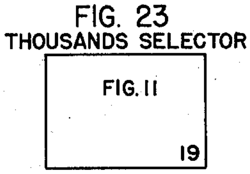
Figure 24:
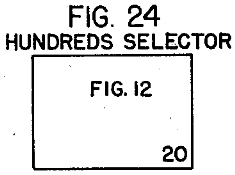
Figure 25:
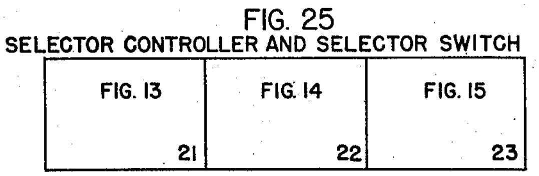
Figure 26:
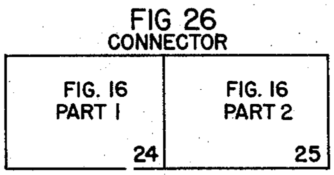
Figure 27:
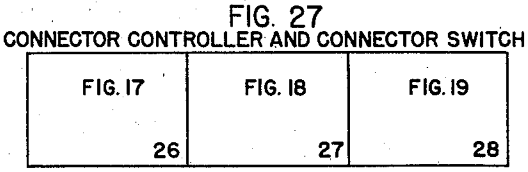

Figs. 13 to 15 disclose a circuit diagram of the selector controller 1300 and the selector switch 1500 used in conjunction therewith;

Fig. 16, parts 1 and 2, is a circuit diagram of any connector 1600 of any connector frame;

Figs. 17 to 19 disclose a circuit diagram of the connector controller 1700 and the connector switch 1900 used in conjunction therewith; and Figs. 20 to 27 show the way in which the sheets of drawings on which Figs. 1 to 19 are shown should be arranged in order to be best understood.

Figure 11:
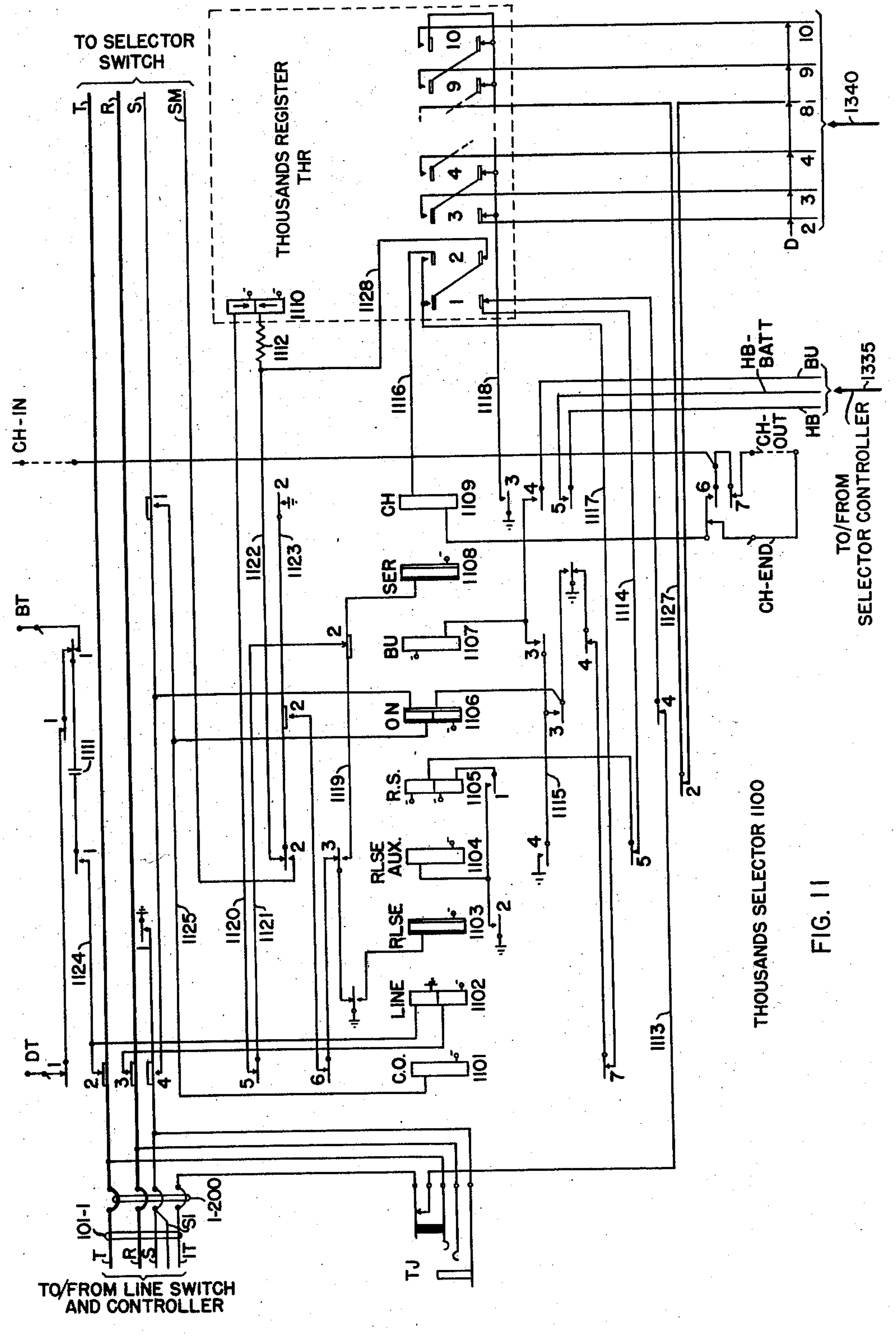
Fig. 11 is a circuit diagram of any local thousands selector 1100 on any thousands selector frame.
Figure 12:
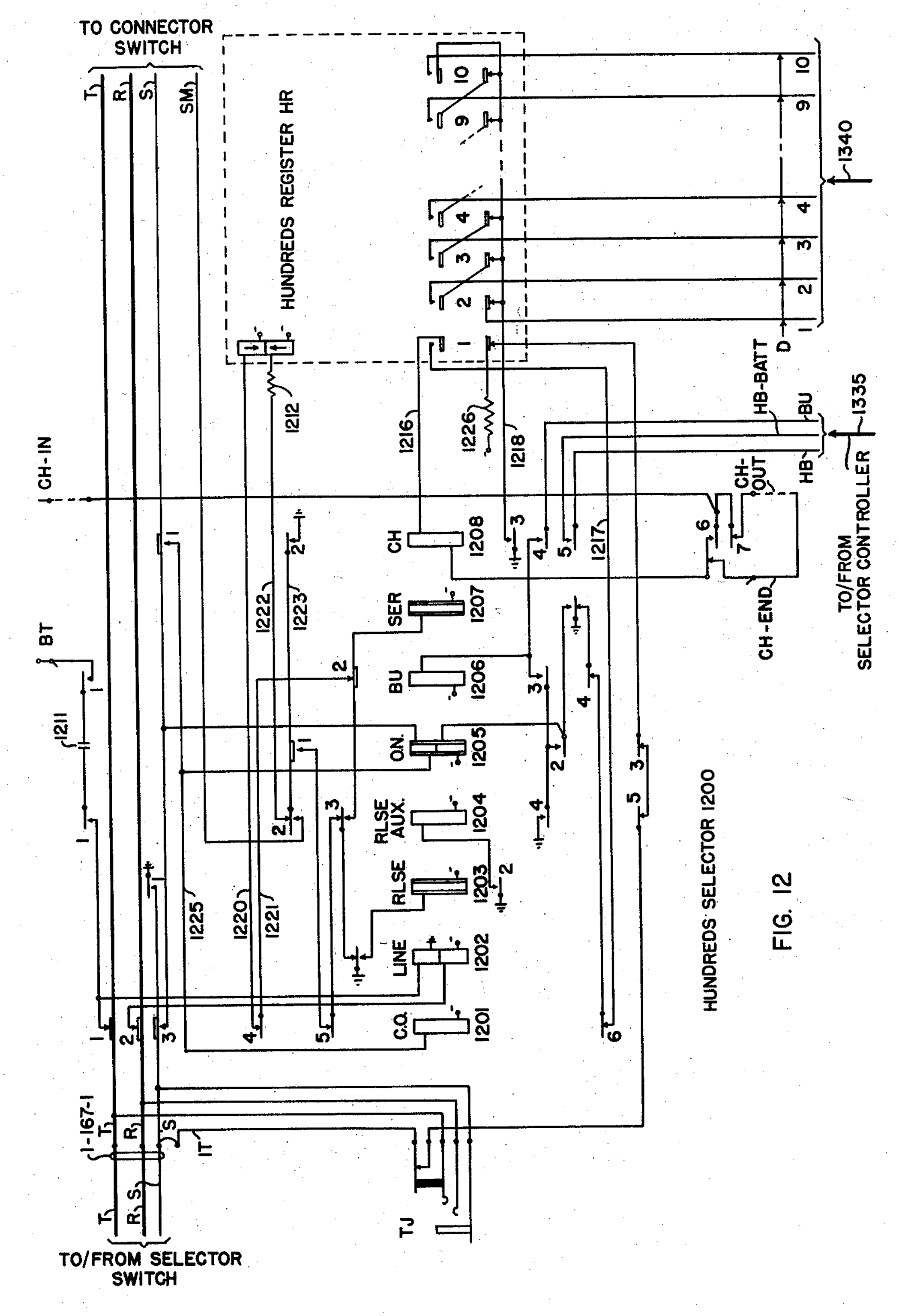
Fig. 12 is a circuit diagram of the hundreds selector 1200 on any hundreds selector frame.

The devices shown in Figs. 11, 12, and 16, having reference characters THR, HR, SEQ, TR, and UR assigned thereto, are magnetic impulse counters which are of the general type disclosed in the Bellamy and Bowers application for a Multi-Group Primary-Secondary-Spread Crossbar Telephone System, Serial No. 329,802, filed January 6, 1953.

II. GENERAL TRUNKING DIAGRAM (Fig. 1)

The general trunking diagram shown in Fig. 1, parts 1 to 8, will now be explained.

*IIA. Line switch frame*

Referring now to Fig. 1, parts 1 and 2, it will be observed that the lines of the illustrated exchange are served by line switch frames TH–1 to TH–4. The switches of line frame TH–1, serving 1000 lines, are shown in some detail, with the switches of frames TH–2 to TH–4 assumed to be similar.

In any line switch frame TH–1, there are ten groups of crossbar switches of which the first, second, and tenth groups SG–1, SG–2, and SG–10 are shown, each group including four crossbar switches, such as line switches LS–1 to LS–4. Each switch, such as LS–1, may be described as a 25 by 10 three-wire switch, as each switch has 25 locations or cross paths to which 25 three-conductor line circuits are respectively connected and has ten horizontal locations or longitudinal paths, to which the three-wire trunks of cable group 101–1 are connected. The 100 subscriber line circuit of each switch group, 25 of which are shown connected to switch LS–1, are served by the trunks in trunk cable 101–1.

The horizontal or longitudinal paths on the switches in any one group are multipled in such a manner that the first five horizontals of switches LS–1 and LS–2 are connected together by conductors in cable group 1–150; that the first five horizontals of switches LS–3 and LS–4 are connected together by conductors in cable group 1–152; and that the last five horizontals 6 to 10 of all the switches in switch group SG–1 are connected together by conductors in cable group 1–151. Originating trunks 1 to 5 of cable group 101–1 are connected to the horizontals 1 to 5 of switches LS–1 and LS–2; originating trunks 6 to 10 are connected to horizontals 1 to 5 of switches LS–3 and LS–4; and originating trunks 11 to 15 are connected to horizontals 6 to 10 of switches LS–1 to LS–4. In this manner, any one of the 50 subscriber lines (assigned to the vertical locations on line switches LS–1 and LS–2) have access to five trunks (1 to 5) individual to them; any one of the 50 lines (assigned to the vertical locations on switches LS–3 and LS–4) have access to five trunks (6 to 10) which are individual to them; and all 100 lines in a switch group such as SG–1 have common access to trunks 11 to 15.

The switches LS–5 to LS–8 of switch group SG–2 and the switches LS–37 to LS–40 of switch group SG–10 are multipled together in a similar manner, thereby providing a total of 150 trunks serving 1000 lines. The trunks from switch groups SG–1 to SG–10 are extended to the intermediate distributing frame IDF over conductors in cable groups 101–1 to 101–10.

The 1000 lines terminated on line switch frame TH–2 are served by 150 trunks extending to the intermediate distributing frame IDF over conductors in cable 102 in a manner similar to the trunks in line switch frame TH–1, and similarly the trunks in line switch frame TH–4 extend to the intermediate distributing frame IDF over conductors in cable group 104.

The provision of four-line switch frames, each serving 1000 lines and each having access to a total of 150 trunks, results in a total of 600 trunks for 4000 lines. These trunks extend to the intermediate distributing frame IDF from whence they are assigned to selectors, as will be described hereinafter.

The 150 incoming trunks in trunk cable ITC over which incoming calls reach this exchange are connected to incoming selectors, not shown, these incoming trunks being shown only for the sake of system completeness.

*IIB. Thousands selector frame*

Referring now to Fig. 1, parts 3 and 4, it will be observed that the 750 trunks (600 originating and 150 incoming) from the line switch frames and from the incoming trunks in trunk cable ITC are extended by frame jumpers 166 to the selectors in the thousands selector frames TS–1 to TS–5.

The switches of thousands selector frame TS–1, serving 120 selectors, are shown in some detail, with the switches of frame TS–2 and TS–5 assumed to be similar.

In thousands selector frame TS–1, the switches are divided into ten switch groups SG–1 to SG–10 with three switches such as TSS–1 to TSS–3 included in each group. The intermediate thousands selector switch TSS–2 in group SG–1 is not shown.

Each thousands selector switch such as TSS–1 has 20 vertical locations or cross paths to which the trunks outgoing from the thousands selectors are terminated, and has 12 horizontal locations or longitudinal paths to which 12 selectors (both incoming and local are connected). The 12 longitudinal paths are provided by using an eleventh and twelfth select magnet in place of the upper and lower select magnets used in the noted Bellamy and Bowers application.

The horizontals of each of the switches in any one switch group, such as group SG–1, are multipled together by conductors in cable group 1–160 so that each of the twelve selectors in group SG–1 is connected to the horizontals of all the switches in group SG–1. In this way, each selector has access to the 20 verticals on each of the associated selector switches, thereby providing any selector access to the 60 outgoing trunks terminated on the switch verticals.

These 60 trunks, common to any one of the selectors of any switch group SG–1, are divided into trunk groups or levels, each trunk group or level reached by any one selector including from 1 to 10 trunks, as desired. As will hereinafter be described with reference to the vertical multipling between switch groups, each level comprises 15 trunks, but each selector has access to only ten trunks in any one level.

It has been chosen to illustrate the thousands selector stages as having 6 levels, levels 2, 3, 4, 8, 9, and 0 of which levels 8 and 0 are outgoing levels while the remaining levels are local levels. Under such an arrangement, the provision of 6 trunk levels with 15 trunks in each level, would normally require a total of 90 verticals or 4½ switches. However, since it is desired to have 15 trunks in a level and to maintain switch cost to a minimum, it has been chosen to connect the vertical multiples of the switches in the switch groups SG–1 to SG–10 of any frame in such a manner that ten verticals of any switch provides termination points for 10 of the 15 trunks in any level, five of these trunks being individual to certain selectors in the concerned frame and the other five being common to all selectors in the frame. The remaining 5 trunks of any level are served by other switches and are individual to certain other selectors which also have access to the same 5 trunks common to all selectors.

Exemplifying, the 120 selectors of any thousands selector frame are divided into two groups with the selectors terminated on the horizontals of the switches of group SG–1 to SG–5, comprising the first group and the selectors associated with switch groups SG–6 to SG–10, comprising the second group. In any level, the first group of selectors have access to individual trunks 1 to 5 of any trunk level; the second group of selectors have access to individual trunks 6 to 10 of any trunk level; and both groups of switches have access to the common trunks 11 to 15 of any level. To accomplish such trunk grading, the verticals of the switches of the switch groups are connected in the following manner:

Verticals 1 to 5 of the switches in group SG–1 are multipled to the corresponding verticals on the corresponding switches in groups SG–2 to SG–5 over conductors in cable group 1–160 while the verticals 1 to 5 of the switches in group SG–6 are multipled to the corresponding verticals on the corresponding switches in switch groups SG–7 to SG–10 over conductors in cable group 1–164. The verticals 6 to 10 of the first switch of each of the switch groups SG–1 to SG–10 are connected together over conductors in cable group 1–161, rendering these verticals common to all of the selectors. Under this arrangement, the "2" level, trunks 1 to 15 of cable group 112–1, while containing 15 trunks, use 10 verticals of the switches in any switch group. The "3" level trunks, trunks 1 to 15, are terminated on the last 10 verticals on the first switch in each of the switch groups and are multipled in a similar manner over conductors in cable groups 1–162, 1–163, and 1–165.

The intermediate thousands selector switches are shown as a dotted rectangle and are assumed to be similar to the thousands selector switch TSS–1. The intermediate switch, in this disclosure, one switch, provides trunks for the "4" and "8" trunk levels.

Thousands selector switch TSS–3 serves the "9" and "0" levels and is interconnected with other switches in the manner described for the "2" and "3" level over conductors in cable groups 3–160 to 3–165.

The switches of the thousands selector frames TS–2 to TS–5 are interconnected in a manner similar to that described with reference to thousands selector frame TS–1. The levels of thousands selectors frames TS–2 to TS–5 are multipled to the corresponding levels of the thousands selector frame TS–1 over conductors in cable groups 112–2 to 112–5 for the "2" level; and over conductors in cable group 113–2 to 113–5 for the "3" level, and so forth.

The trunks from the "2" level of trunks of all frames extend to the intermediate distributing frame IDF over conductors in cable group 112 and are terminated on terminals 2–170; all trunks in the "3" level are terminated on terminals 3–170; and all the trunks in the "0" level are terminated on terminals 10–170. In this way, the 15 trunks of any level from all thousands selector frames are grouped on the IDF terminals corresponding to the concerned level.

Briefly then, as will hereinafter be described in detail, a calling line is extended to an idle selector over one of the ten originating trunks available to any one line, and upon dialing of a particular level (2, 3, 4, 8, 9, or 0) will be extended to a corresponding terminal on the intermediate distributing frame IDF from whence they are connected, as desired, to the hundreds selectors serving the level dialed, or to trunks outgoing to other exchanges.

Since trunks to other exchanges are selected by the dialing of a single digit, "8" or "0," the trunks served by these levels are extended to some suitable trunk coupler (not shown) rather than to hundreds selectors. The trunks of the remaining levels, assigned digits "2," "3," "4," and "9' are extended to the corresponding one of the hundreds selector frames HS–1 to HS–4, depending on the level dialed.

*IIC. Hundreds selector frame*

Referring now to Fig. 1, parts 5 and 6, it will be observed that the hundreds selector frames HS–1 to HS–4, of which the first, second, and last are shown, correspond respectively with the assigned local levels. Hundreds selector frame HS–1 is assigned to "2" level; frame HS–2 assigned the "3" level; frame HS–3, not shown, is assigned "4" level; and frame HS–4 is assigned the "9" level.

Hundreds selector frame HS–1 has ten switch groups, SG–1 to SGG–10, groups SG–1, SG–5, SG–6 and SG–10 being shown in detail with groups SG–2 to SG–4 multipled in a manner similar to switch groups SG–1 and SG–5, and groups SG–7 to SG–9 multipled in a manner similar to switch groups SG–6 and SG–10.

It is assumed that the line switches are completely equipped so as to require ten hundreds selector levels in order to reach any 100-line group. Therefore, the switch groups SG–1 to SG–10 provide for 10 levels of trunks, levels 1 to 0.

The horizontals of the selector switches in any one group are connected together, and the interconnection of the verticals to provide 15 trunks for each level is similar to that described with reference to the thousands selector frame TS–1.

As hereinbefore pointed out, the selectors in the thousands selector frames comprise both local selectors and incoming selectors. In the hundreds selector frames, the selectors are local only, therefore the 15 hundreds trunks of any level extend over conductors in associated cable group to the associated connectors.

As will be described hereinafter, since any hundreds selector frame is reached by dialing levels assigned thereto, the thousands group containing the called line is already determined. Therefore, the hundreds selector frames are trunk connected to corresponding connector switch frames and the trunks in the ten levels are connected to corresponding groups of 100 lines as the selector switches are numerically-controlled.

Exemplifying, the hundreds selector frame HS–1 is reached by trunks in level "2"; frame HS–2 is reached by trunks in level "3"; and so forth. The hundreds selector frame HS–1 is trunk connected to the connector switch frame terminating the lines having the thousands digit 2 prefixed, such digit corresponding to the trunk level dialed in the thousands selector frame to reach hundreds selector frame HS–1.

The hundreds trunks from hundreds selector frame HS–1 are connected to connector switch frame CSF–1 (Fig. 1, parts 7 and 8) over trunks in cable group 121; the trunks from frame HS–2 are connected to frame CSF–2 over conductors in cable 122; and the trunks of frame HS–4 are connected to frame CSF–4 over trunks in cable 124.

*IID. Connector switch frame*

Referring now to Fig. 1, parts 7 and 8, it will be observed that each of the connector switch frames, CSF–1 to CSF–4, serves a separate one thousand lines. These switches are 20 by 20 switches (twenty horizontals and twenty verticals), in which verticals 1, 2 and 15 only are shown, using the upper and lower select magnets to effectively provide the 20 horizontals. The lines are terminated on the horizontals and the connectors are terminated on the verticals. Since each switch serves 20 lines, five connector switches serve 100 lines and are arranged in a switch group such as SG–1. Ten such switch groups, SG–1 to SG–10, each serving 100 lines comprise a connector switch frame serving 1000 lines. Of the ten switch groups, only the first, second and last are shown, and in any switch group only the first, second and last switches are shown.

It has been chosen to provide the one hundred lines in any switch group with 15 connectors. These connectors are terminated on the verticals of the connector switches which are connected together by conductors in cable groups, such as 1–180–1 to cable 1–180–15 for switch group SG–1. The 1000 lines in any connector switch frame are therefore served by 150 connectors.

As hereinbefore noted, the 15 trunks in level "1" of the hundreds selector frame HS–1 are terminated on the 15 connectors serving the 100 lines of switch group SG–1 of connector switch frame CSF–1; the trunks of level "2" are extended to connectors associated with connector switch group SG–2 of frame CSF–1; and the "0" trunks reach the connectors of switch group SG–10.

The connector frames CSF–1 to CSF–4 each serve 1000 lines. The lines in any frame are reached by dialing, in a thousands selector frame, the thousands digit of the directory number of the lines served by the concerned frame; by dialing, in the hundreds selector frame, the hundreds digit of the directory number of a called line; and by dialing, in the connector switch frame, the tens and units digits of the directory number, a particular switch and horizontal in the selected switch group is indexed.

As hereinbefore pointed out, responsive to the dialing of the digit "2," an idle selector of the group of hundreds selectors serving level "2" is seized and responsive to the dialing of a hundreds digit 1, an idle connector of the group of connectors serving level "1" is seized.

As will be described in detail, with reference to Figs. 2 to 5, a connection from a calling line on a line switch frame to a called line on a connector switch frame includes line switch LS–1, originating trunk 1 of group 101, the first selector of switch group SG–1 of thousands selector frame TS–1, switch TSS–1, thousands trunk 1 of group 112–1 (reached by dialing thousands digit 2), the first hundreds selector of switch group SG–1 of frame HS–1, switch HSS–1, hundreds trunk 1 of group 121 (reached by dialing hundreds digit 1), the first connector of switch group SG–1 of frame CSF–1, and switch CS–1. Line 2101 is reached by dialing tens digit "0" and units digit "1."

Referring now to connector switches CS–1 to CS–5 it will be observed that switch CS–1 terminates lines having the tens digit of the directory number being the digit "0" or digit "1"; the tens digit of the numbers of the lines of switch CS–2 being the digit "2" or the digit "3"; and the directory number of the lines of switch CS–5 having a tens digit "8" or "9." On each of the switches, the tens digit of least value of the two tens digit assigned to any switch is assigned to the upper section of each horizontal. Illustrating, the tens digit "0," "2," "4," "6," and "8" are associated with the upper section while tens digits "1," "3," "5," "7," and "9" are associated with the lower section of the horizontals, this association being controlled by the tens digit wire assignment to the auxiliary select magnets.

The units digit of the directory numbers of the lines assigned to horizontals correspond respectively to the horizontal numbering as determined by the physical location of such horizontals. The lines whose units digit of the directory numbers end in "1" are assigned the first horizontal, both upper and lower sections; the lines with units digits "2" are assigned to the second horizontal; and so forth.

Accordingly, as will become apparent hereinafter, the P.B.X lines in a P.B.X group are numbered from 1 to 9 and 0.

*IIE. Capacity variations*

The capacity of the trunking plan shown in Fig. 1 is capable of variations according to the number of lines being served, the number of local levels; and the number of outgoing levels. If, for example, only one thousand lines are initially required for an installation, only line switch frame TH–1 need be installed along with a hundreds selector frame HS–1 and a connector switch frame CSF–1.

At any line frame, the line switches may be omitted when the full frame capacity (1000 lines) is not required. Omitting any line switch reduces the capacity of the line frame by 25 lines. Therefore, under conditions when only 50 lines in any switch group is required initially, two switches are required and then the ten horizontals terminating the trunks outgoing to the selectors are more than sufficient to answer the traffic demand of those 50 lines. When the exchange serves several thousand lines, the addition of a thousands selector frame is required, as is well known.

The number of switches in any switch group of a thousands selector frame is controlled by the number of levels required for serving both local and outgoing calls; the number of switches in any switch group of a hundreds selector frame is dependent upon the local levels provided (in this disclosure, 10 levels) and the number of switches required in any switch group of a connector frame is dependent upon the initial number of lines being served and the directory number assignment.

III. GENERAL OPERATION

The operation of the system in completing calls will now be described with particular reference to Figs. 2 to 5 which show in more circuit detail, the portions of the apparatus directly included in the talking path through a line frame, a first and a second selector frame, and a connector frame. Subsequent parts of the description cover the detailed operation of the control apparatus involved in operating the crossbar switches in extending a connection from a calling line to a called line.

The operation involved in making a locally-originated call from station S1 on line 200 will now be described with reference to Figs. 2 to 5.

*IIIA. Initiation of call*

When the receiver (not shown) is removed at calling station S1 of calling line 200, the usual direct-current bridge is closed across the tip and ring conductors of line 200 and operates lines relay 225 through break contacts 1 and 2 of cutoff relay 226. Line relay 225, at its contacts 1 and 2, ground the common fives relay wire FR–1 and the corresponding units wire U–1, extending to line controller 600 over conductors in cable group FG–1. The units wire U–1 is individual to line relay 225 while the fives relay wire FR–1 is common to the five line relays in any fives group (verticals 1 to 5, 6 to 10, etc.) in which the calling line is located.

Grounding the fives relay wire FR–1, and units wire U–1 as will hereinafter be described in detail, causes line controller 600 to set line switch LS–1 with specific regard to the calling line and with specific reference to an idle thousands selector. Upon being so set, line controller 600 operates the magnets SM–1 and then HM–1 to close the indicated open points of line switch LS–1 to extend the calling line to an originating trunk 101–1.

In order to select an idle trunk, a test circuit for originating trunk 101–1, including test conductor IT extending to thousands selector 1100 over IDF jumpers 166, is completed. This test is for an idle-indicating potential from the selector associated with trunk 101–1, which when such selector is idle, is supplied from the upper winding of the restricted service relay RS of the associated thousands selector 1100, over the idle-test wire IT and through the winding of an allotting relay (not shown in Fig. 2) to ground. If the selector associated with trunk 101–1 is busy, ground potential from the selector prevents it from being taken for use, and busy tone is returned to the calling line.

When originating trunk 101–1 is idle, line controller 600 grounds selector magnet wire SM–1, operating select magnet SM–1 which positions the select shaft associated with the idle originating trunk 101–1 of switch LS–1 in a selecting position. Upon being so positioned, battery potential from the PRE–OP–ODD wire is connected to the tip conductor of trunk 101–1 to operate the line relay in the associated selector. Following this, ground is extended to the winding of the hold magnet HM–1 associated with the vertical terminating calling line 200 and upon so operating, the calling line 200 is extended through the closed contacts on line switch LS–1, over originating trunk 101–1, through IDF jumpers 166 and over conductors 1–157–1 to the battery and ground connected line relay 1102 of selector 1100.

By this time, however, line relay 1102 has operated from the battery potential projected ahead on the tip conductor and its contacts extends ground potential to the winding of release relay 1103, operating it. Contacts on relay 1103 extend ground potential to the sleeve conductor of the originating trunk maintaining the concerned hold magnet (in this case HM–1) operated after the line controller is released. This ground potential is further extended to the battery-connected winding of cutoff relay 226 of line circuit LC–1 associated with the calling line. Cutoff relay 226 operates and at its contacts 1 and 2 restores line relay 225. With the restoration of relay 225, ground potential is removed from the grounded conductors in cable group FG–1 and the marking potentials are thereby removed from the common equipment.

When battery potential is extended ahead on the tip conductor of the selected trunk, relays in the line controller 600 are operated to initiate the clearing out of the common apparatus in preparation for another call. Before the common apparatus is completely cleared out, ground is returned to the hold magnet and cutoff relay windings to maintain the connection intact.

The calling line is now connected to an idle thousands selector 1100; the common equipment is released; and dial tone is returned to the calling station.

*IIIB. Thousands selector 1100*

When thousands selector 1100 is seized by the described extension of a connection thereto from calling line 200, through line switch LS–1, idle originating trunk 101–1, and IDF jumper 166, line relay 1102 is maintained operated. Its original operate circuit, as hereinbefore described, was from the battery potential projected ahead over the tip conductor. Line relay 1102, release relay 1103, and release auxiliary relay 1104 operate and return dial tone to the calling line, as noted.

The calling subscriber upon receipt of dial tone, dials the digit in the directory number of the called line and station.

Figure 2:
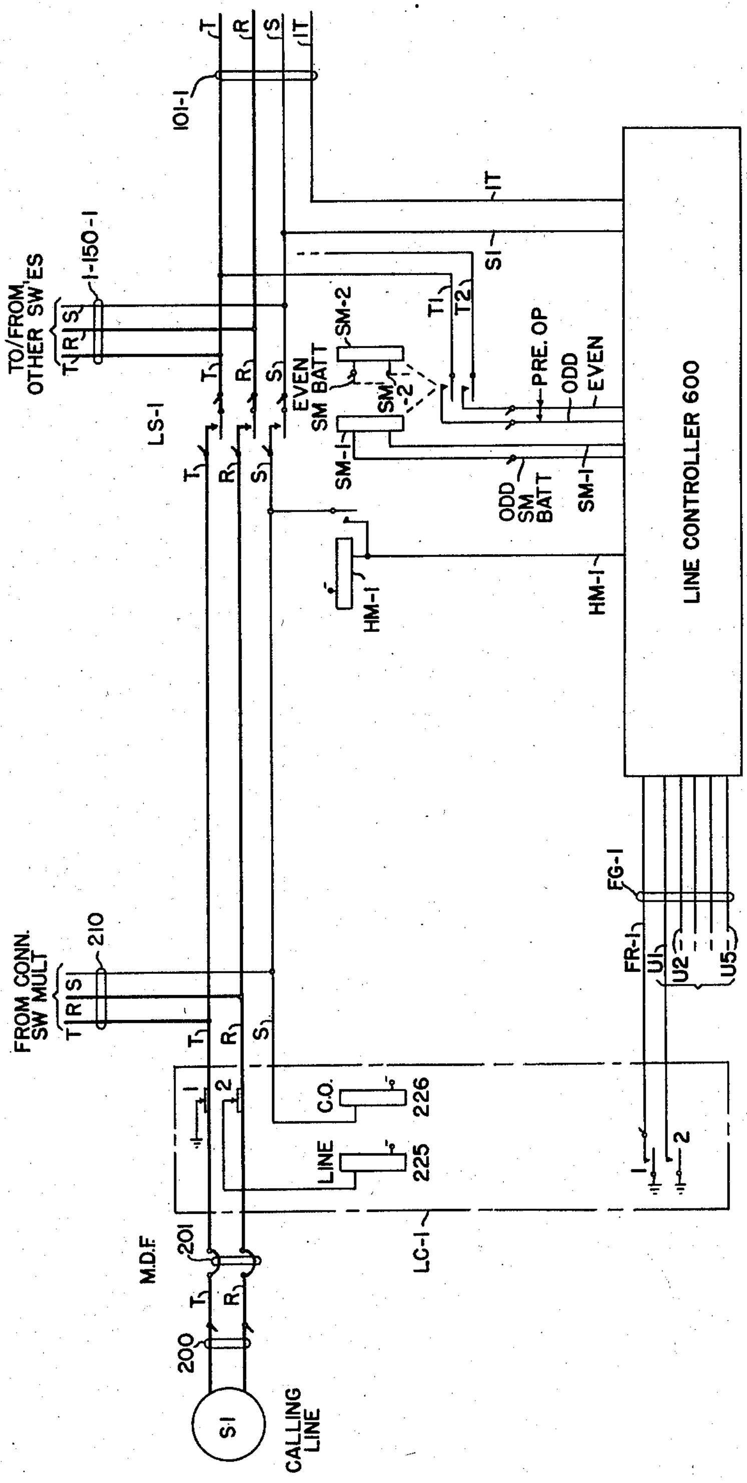
Figure 3:
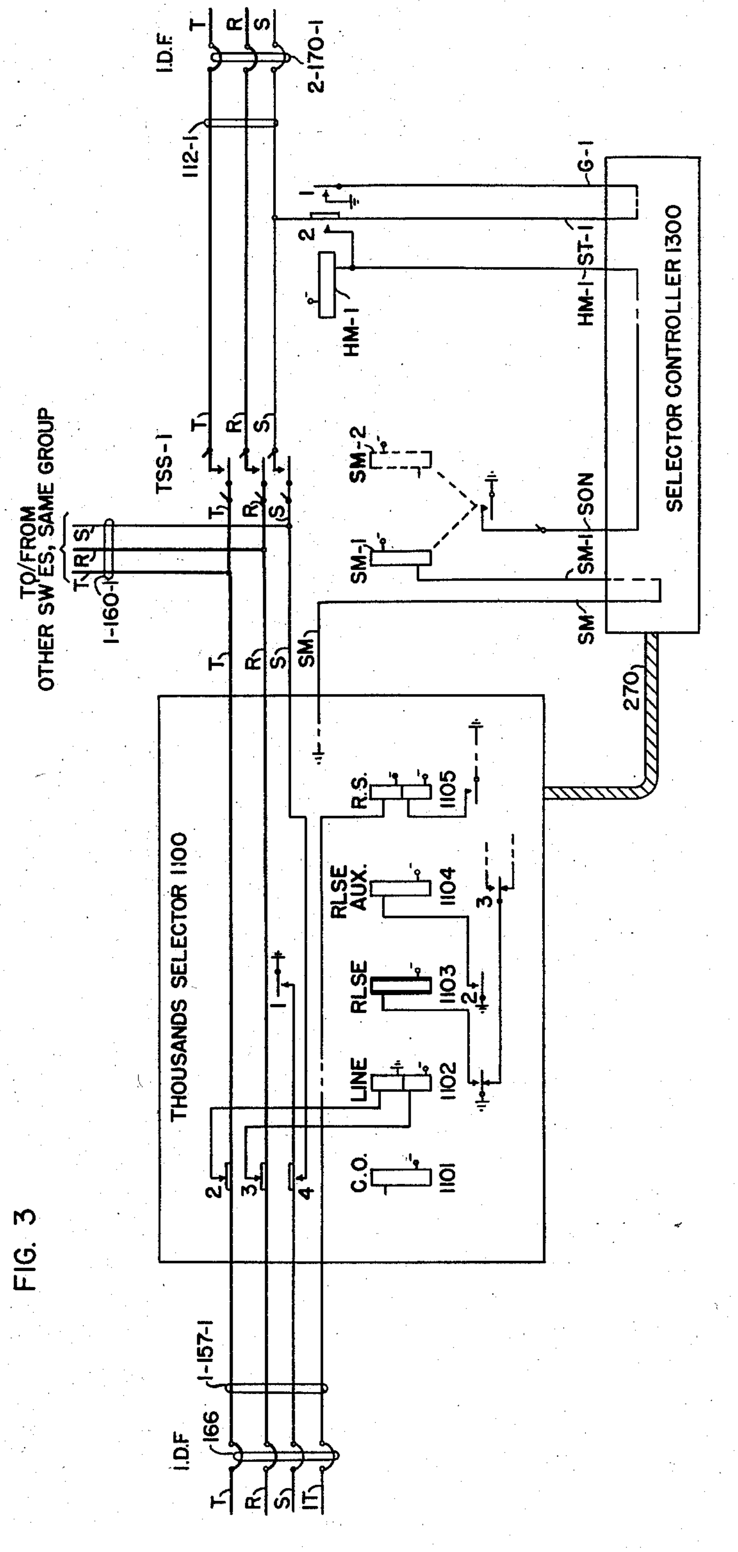
Figure 4:
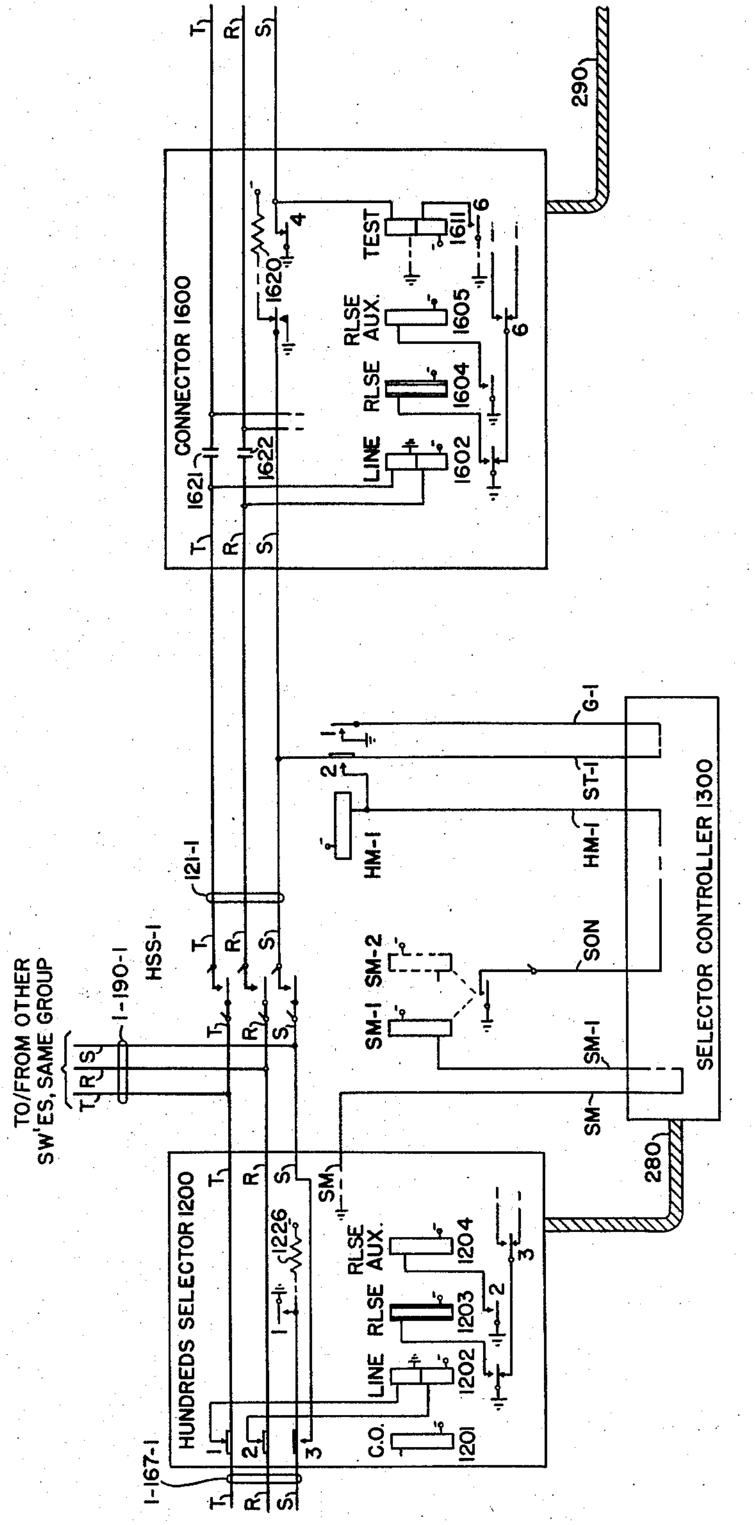

Each time the calling device is operated to transmit one series of interruption impulses, line relay 1102 is restored momentarily for each such interruption impulse in the series, comprising from 1 to 10 impulses, and thousands selector 1100 records such dialed digit on the recording impulse counter (not shown in Fig. 3).

As will hereinafter be described, immediately after completion of the dialing of the thousands digit indexing the connector frame containing the called line, switching apparatus in selector controller 1300 operates to extend the connection to an idle hundreds selector or to an idle trunk outgoing (not shown in Fig. 3) to other exchanges, depending on the value of the digit dialed.

Responsive to the dialing of the thousands digit indexing the connector frame which contains the called line, thousands selector 1100 transmits control to selector controller 1300 over conductors in cable group 270 to cause the select magnet operate circuit of the select magnet (SM–1) of the particular switch containing the called level, to be energized and to position the select shaft to select an idle trunk in the called level, the switch group being one terminating the calling selector 1100. The test circuit for such an idle trunk is over sleeve test wire ST–1, connected to the sleeve conductors S of the thousands trunk, such as 112–1, which when such selector is idle, is supplied from current-limiting resistor 1226 of the associated selector 1200. If the selector associated with trunk 112–1 is busy, ground potential from the selector prevents it from being taken for use and busy tone is returned to the calling line.

When thousands trunk 112–1 is idle, controller 1300 completes the operate circuit for select magnet SM–1 which operates and positions the select shaft associated with the calling selector in a selecting position. Upon being so positioned, an operate circuit is closed for hold magnet HM–1 which operates and extends the calling line 200 through closed contacts on switch TSS–1 to the battery and ground connected windings of line relay 1202. The line relay operates and operates release relays 1203 and 1204 sequentially which ground the sleeve conductor of trunk 112–1. This ground is extended rearwardly to maintain the concerned hold magnet on the thousands selector switch TSS–1 operated and to operate and to hold operated the cutoff relay 1101 of the calling thousands selector and the cutoff relay 226 of line circuit LC–1. The operation of cutoff relay 1101 initiates the clearing out of the common control apparatus on the thousands selector frame and the consequent release of the line relay 1102 of thousands selector 1100. The connection from the calling line to the selected hundreds selector is maintained from ground at contacts 1 of release relay 1203 of selector 1200.

According to one of the features of the invention, in order to prevent the testing operations of the selector controller from seizing a thousands trunk just becoming idle, guard leads from off-normal contacts of all operated hold magnets prevent any disconnection and release of previously operated equipment during the time that the selector controller equipment is in use. This guarding ground is extended over guard leads, such as G–1, and through contacts in the selector controller apparatus to maintain operated all operated hold magnets, such operation being described in detail hereinafter.

*IIIC. Hundreds selector 1200*

When hundreds selector 1200 is seized by the described extension of a connection from calling line 200, over the hereinbefore described path, the direct-current bridge across the battery and ground connected windings of line relay 1202 cause it to operate.

Release relay 1203 and release auxiliary relay 1204 operate in sequence and ground the sleeve conductor as hereinbefore pointed out. Other contacts, not shown, remove the idle-indicating battery potential from the newly grounded sleeve conductor.

The dialing of the thousands digit in the thousands selector 1100 is followed by the dialing of the hundreds digit in the hundreds selector, the extension of the calling line from the thousands selector to the hundreds selector being within the interdigit time interval.

It is assumed that controller 1300 is used as the controller for both thousands selector 1100 and hundreds selector 1200.

The operation of the selector controller 1300 in responding to the dialing of the hundreds digit information received over conductors in group 280 in extending the calling line through hundreds selector switch HS–1 to an idle hundreds trunk, such as 121–1, extending to the connector switch frame, is as previously described with reference to the thousands selector frame in extending a connection to the hundreds selector frame. The operation of hundreds selector 1200 in responding to the dialed hundreds digit will be described in detail hereinafter. The guarding arrangement to prevent possible selection and double connection of a connector just becoming idle is prevented in the manner previously described. The hundreds selector switch HS–1, when actuated, extends the calling line over hundreds trunk 121–1 to the battery and ground connected windings of line relay 1602 of connector 1600. Line relay 1602 operates release relay 1604 and relay 1605 operates sequentially thereby grounding the sleeve conductor S of hundreds trunk 121–1 causing the clearout of the hundreds selector 1200 and controller 1300 in a manner similar to that described with reference to the thousands selector frame.

The connection from the calling line is now held from ground potential from the release auxiliary relay 1605 of connector 1600 and is extended rearwardly to hold operated the necessary equipment to maintain the talking path intact.

*IIID. Connector 1600*

When connector 1600 is seized by the described extension of a connection thereto, the closed bridge across the tip and ring conductors of hundreds trunk 121–1 causes line relay 1602 to operate and as hereinbefore noted, operate release relay 1604 and cause release auxiliary relay 1605 to operate to cause the preceding common control apparatus to clear out and to hold the extended connection intact.

Figure 5:
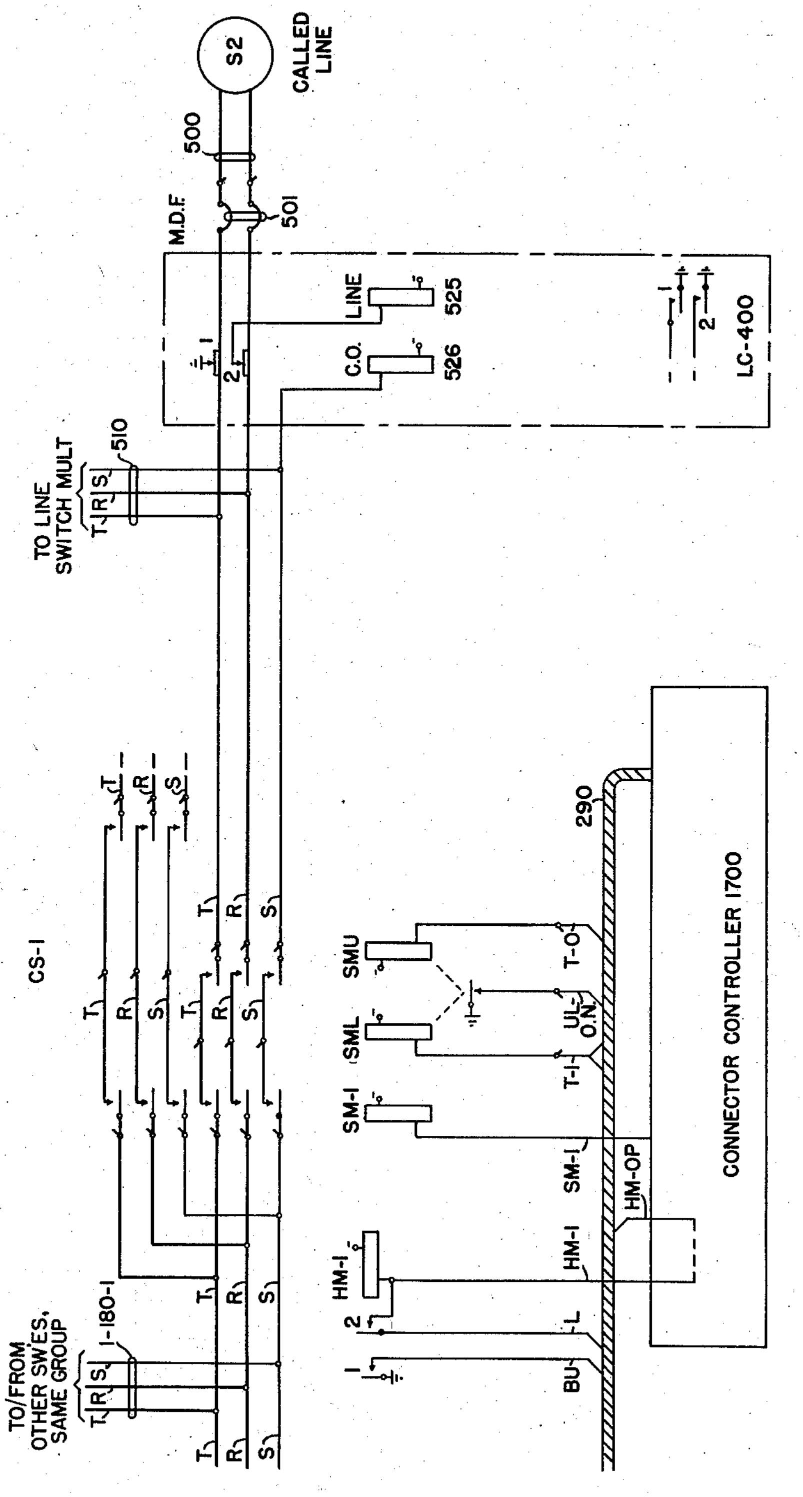

Responsive to the dialing of the tens and units digits of the called line, connector 1600 exercises control over connector controller 1700 of Fig. 5 (shown in detail in Fig. 16) to cause the calling line to be extended to the called line and to signal the called station thereon.

Responsive to the dialing of the tens digit, connector controller 1700 causes the upper or lower select magnet SMU–1 or SML–1 of the concerned switch to operate, depending upon the tens digit dialed, and responsive to the dialing of the units digit, operates the principal select magnet assigned to the horizontal terminating the called line. Responsive to an off-normal signal from the upper or lower select magnet and responsive to the operation of one of the principal select magnets, the hold magnet associated with the vertical to which the calling connector is connected, is operated.

At this time, the calling line is connected to the called line over its hereinbefore traced circuit path to connector 1600 and is connected to the selected called line through the main contact bank of connector switch CS–1, and through the upper or lower sets of contacts of select magnets SMU or SML, depending upon the tens digit dialed, as previously noted.

Off-normal contacts 2 of the operated hold magnet lock the hold magnet operated to the lock lead L and contacts 1 ground busy wire BU. This ground on the busy wire BU operates the connector busy relay when a called line is busy.

Responsive to the operation of hold magnet HM–1 in extending a connection to the called line, ground potential from the sleeve conductor of the trunk extending to the connector is extended forward to operate the cutoff relay of the line circuit LC–400 of the called line 500. Contacts 1 and 2 of cutoff relay 526 open the operate circuit of line relay 525 preventing it from being closed responsive to answer by the called party.

The line switch containing the calling line, the thousands selector switch, and the hundreds selector switch are held operated from ground in connector 1600 extended rearwardly while the connector switch and the cutoff relay of the called line circuit is held operated from ground projected forward. As will be described hereinafter, the connector signals the called line.

Responsive to answer by the called party, the calling subscriber S1 of calling line 200 may converse with the called subscriber S2 of called line 500. Upon completion of the call, disconnected by the calling and called lines, clears out the apparatus involved in extending the described connection, provided, as noted, that the common control apparatus on the thousands and hundreds selector frames are not in use at such time.

If the thousands digit dialed is one indexing trunks to another exchange, the thousands selector switch terminating the trunks in the called outgoing level connects the calling line to an idle outgoing trunk in the manner described for connecting the line to an idle thousands trunk.

As pointed out, with reference to the description pertaining to Fig. 1, the multipling between switches in the same switch group is indicated in Figs. 2 to 5 as conductor groups 1–150–1, 1–160, 1–190, and 1–180–10. The lines are connected to the line and connector switches over conductors 210 and 510, respectively.

IV. DETAILED DESCRIPTION

A detailed description of the circuits and apparatus involved in making a call from calling station S1 on line 200 to called station S2 on line 500 will now be given.

*IVA. Crossbar switches (Figs. 10, 15, and 19)*

Figure 10:
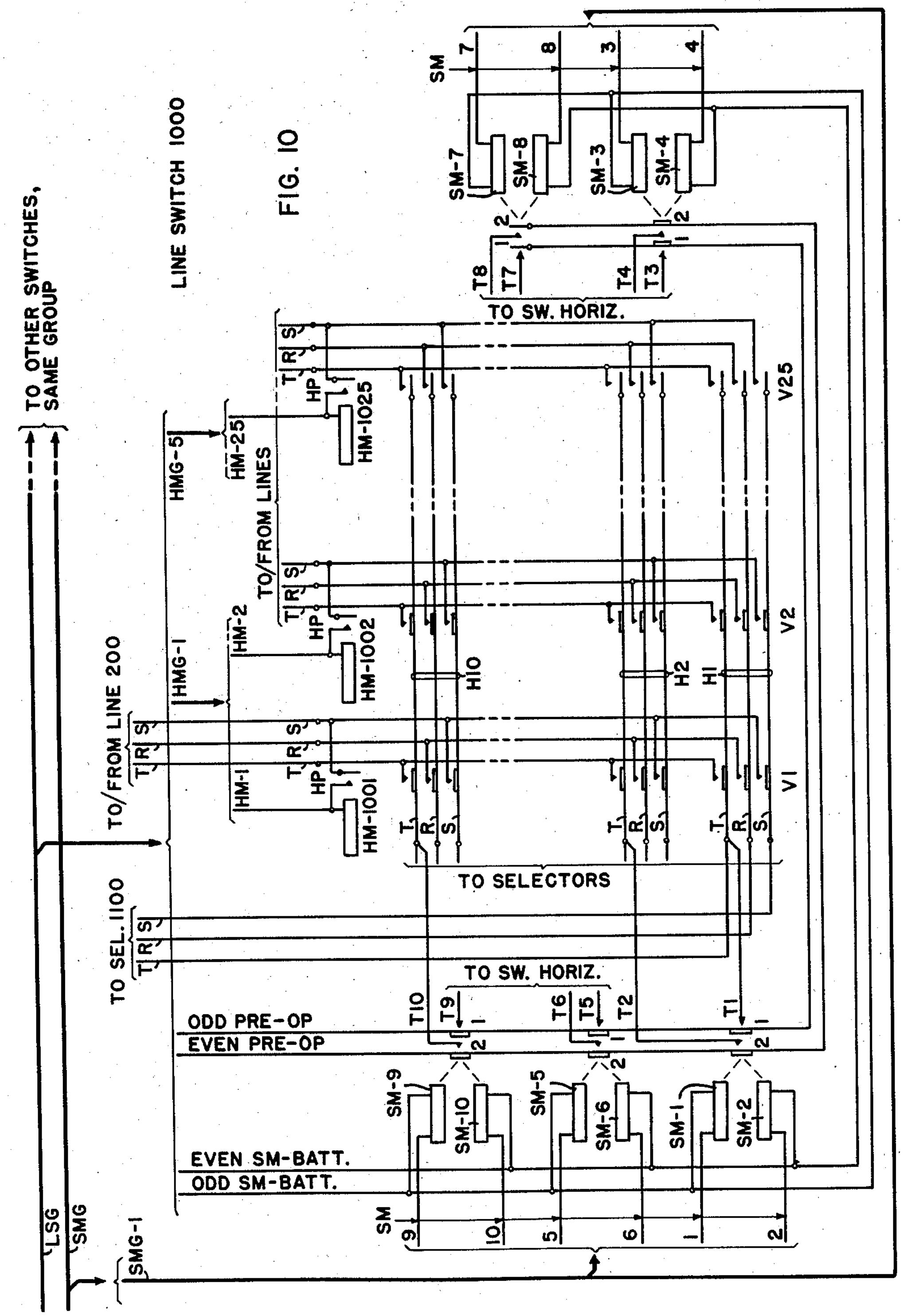
Fig. 10 is the circuit diagram of any line switch 1000 on any line frame.

Figs. 10, 15, and 19 are schematic wiring diagrams of the crossbar switches utilized in extending a connection from a calling line to any called line.

In each of the figures illustrating the crossbar switches, the respective parts are illustrated in substantially the relative location they occupy in the crossbar switch structure.

IVA1. LINE SWITCH 1000 (FIG. 10)

Line switch 1000 (Fig. 10) is termed a 25 x 10, three-wire switch. It has 25 vertical rows of three wire stackups of contact elements. These rows are termed verticals V1 to V25, respectively. The first, second and last verticals are illustrated, the intervening ones omitted.

The contact sets of verticals V1 to V25 are so aligned to provide ten horizontal rows, H1 to H10. The first, second, and tenth horizontal rows are shown, the intermediate ones being omitted.

Line switch 1000 has ten select magnets SM–1 to SM–10, six of which are located at the left end of the switch and four at the right end of the switch, as illustrated. These select magnets correspond respectively to the ten horizontals of the switch.

Hold magnets HM–1 to HM–25 correspond respectively to the verticals V1 to V25 and upon being energized after one of the select magnets SM–1 to SM–10 have operated, closes the selected set of contact elements determined by the intersection of the contact set associated with the operated select magnet and the contact set associated with the concerned hold magnet. Upon being so actuated, restoration of the select magnet has no effect as the hold magnet maintains the contact set actuated. The crossbar switches shown in this application are assumed to be similar to those shown in the Richard P. Arthur U.S. Patent No. 2,577,067, issued December 4, 1951.

IVA2. SELECTOR SWITCH 1500

Selector switch 1500 (Fig. 15) is described as a 12 by 20 three-wire switch as it has 12 horizontal rows and 20 vertical rows of contact sets. The switch is similar to the crossbar switch of the noted Arthur patent, however, the contact banks of the verticals include two additional contact sets associated with the upper and lower select magnets of the Arthur patent and the contact bank has necessarily been reduced to a three-wire bank. These upper and lower select magnets on the selector switch are termed selected magnets SM–11 and SM–12 and perform the same functions as select magnets SM–1 to SM–10.

IVA3. CONNECTOR SWITCH 1900

Connector switch 1900 (Fig. 19) is a 10 by 20 six-wire switch substantially as shown in the noted Arthur patent, with ten principal select magnets SM–1 to SM–10 and two auxiliary select magnets SMU and SML.

*IVB. Line controller 600 (Figs. 6 to 9)*

Line controller 600 of Figs. 6 to 9 will now be described in detail. One line controller is provided to serve the 100 lines of any switch group on any line frame and functions to connect associated calling lines with idle originating trunks on a one-at-a-time basis. The illustrated line controller is assumed to be associated with switch group SG–1 of line switch frame TH–1.

IVB1. PURPOSE AND ARRANGEMENT

The purpose of line controller 600 is to control the previously described extension of a connection from calling lines to available originating trunks extending to the next switching stage.

Line controller 600 comprises units lockout relays 650, fives group relays 700, allotter relays 800 and 850, and line group switching relays 900, suitably interconnected with each other and associated with four line switches, one such switch being shown in Fig. 10, to perform all testing and control operations required of a line controller.

IVB2. GENERAL OPERATION

On calls starting from normal cleared out condition, the general operation of line controller 600 is as follows:

IVB2a. FIVES GROUP SELECTION

On receiving ground over one of fives relay wires FR–1 to FR–20 (wire FR–1 illustrated in Fig. 4) from the line switch containing the called line, the line controller selects the corresponding five groups of lines, exercising an order of preference if two or more fives wires are grounded; it locks in the fives selection locally and disconnects the remaining fives wires to preclude subsequent interference thereover; it prepares an operate circuit for the five hold magnets associated with the five lines in the calling fives group, and it prepares an operate circuit for the five units lockout relays.

IVB2b. UNITS SELECTION

On receiving ground, as described, over one of the units mark wires U–1 to U–5 in the fives group containing the calling line, the concerned units lockout relay operates and the line controller selects the hold magnet associated with the calling line; it exercises an order of preference if two or more lines in the same selected fives groups are initiating a call; it locks in the units relay selection locally; and it opens the units chain circuit to preclude any subsequent interference with the established units selection.

IVB2c. STARTING

On the noted operation of any of the fives relays FR–1 to FR–20, the preference lockout circuit operates one of two chain relays thereby identifying the first or second group of 50 lines within a calling 100-line group.

The lines in any switch group on any line frame are divided into two groups of 50 lines each, as previously noted. The line controller accordingly determines which subgroup of lines is calling as the fives relays are arranged in two preference lockout chains thereby reducing the possibility of open contact points.

The operating circuit of any fives group relay includes one of such chains and upon being energized starts the controller into its hereinafter described operation for testing the originating trunks extending to the next switching stage for selecting an idle one and for operating the select magnet associated therewith.

IVB2d. SELECT MAGNET OPERATION

Upon the selection of an idle originating trunk, the line controller closes the select magnet circuit and causes the selected idle originating trunk to be mechanically selected at line switch 1000. As will be described hereinafter, contacts on the select magnet armature project battery potential forward on the tip conductor of the selected trunk to lessen the time required for seizing the next switching stage.

IVB2e. HOLD MAGNET OPERATION

Responsive to an off-normal signal that the concerned select magnet has operated, and the selected idle originating trunk has been selected mechanically at the line switch, the line controller completes the operate circuit for the hold magnet associated with the calling line. The operation of the hold magnet extends the calling line to the selected originating trunk through the contacts on the line switch 1000.

IVB2f. CLEAROUT

At the end of a time interval sufficient to allow holding ground to be returned over the sleeve wire from the next switching stage associated with the originating trunk, the line controller clears out, permitting the operated select magnet of the line switch to restore. The connection is maintained intact by the continued operation of the hold magnet.

When the connection is cleared out completely, ground maintaining the hold magnet operated is removed and the hold magnet restores, returning the originating trunk to normal.

IVB3. FUNCTIONAL RELAY GROUPS

The relays of line controller 600 comprises the following functional groups:

(1) Relays 601 to 608, units lockout relays 650.
(2) Relays 701 to 720, fives group relays 700.
(3) Relays 801 to 813, allotter control relays 800.
(4) Relays 851 to 870, allotting relays 850.
(5) Relays 901 to 904, line group switching relays 900.

IVB4. DETAILED OPERATION

On all calls, the detailed operation of line controller 600 is as follows:

When a call is originated in any one of the switch groups SG–1 to SG–10 on any line frame, the line relay 225 in the concerned line circuit LC–1 (Fig. 2) operates. As previously noted, such line relay (1) grounds the individual units mark conductor U–1 to U–5 and (2) grounds the fives relay wire FR–1 to FR–20 of the fives group in which the calling line is located.

IVB4a. FIVES GROUP SELECTION

Figure 7:
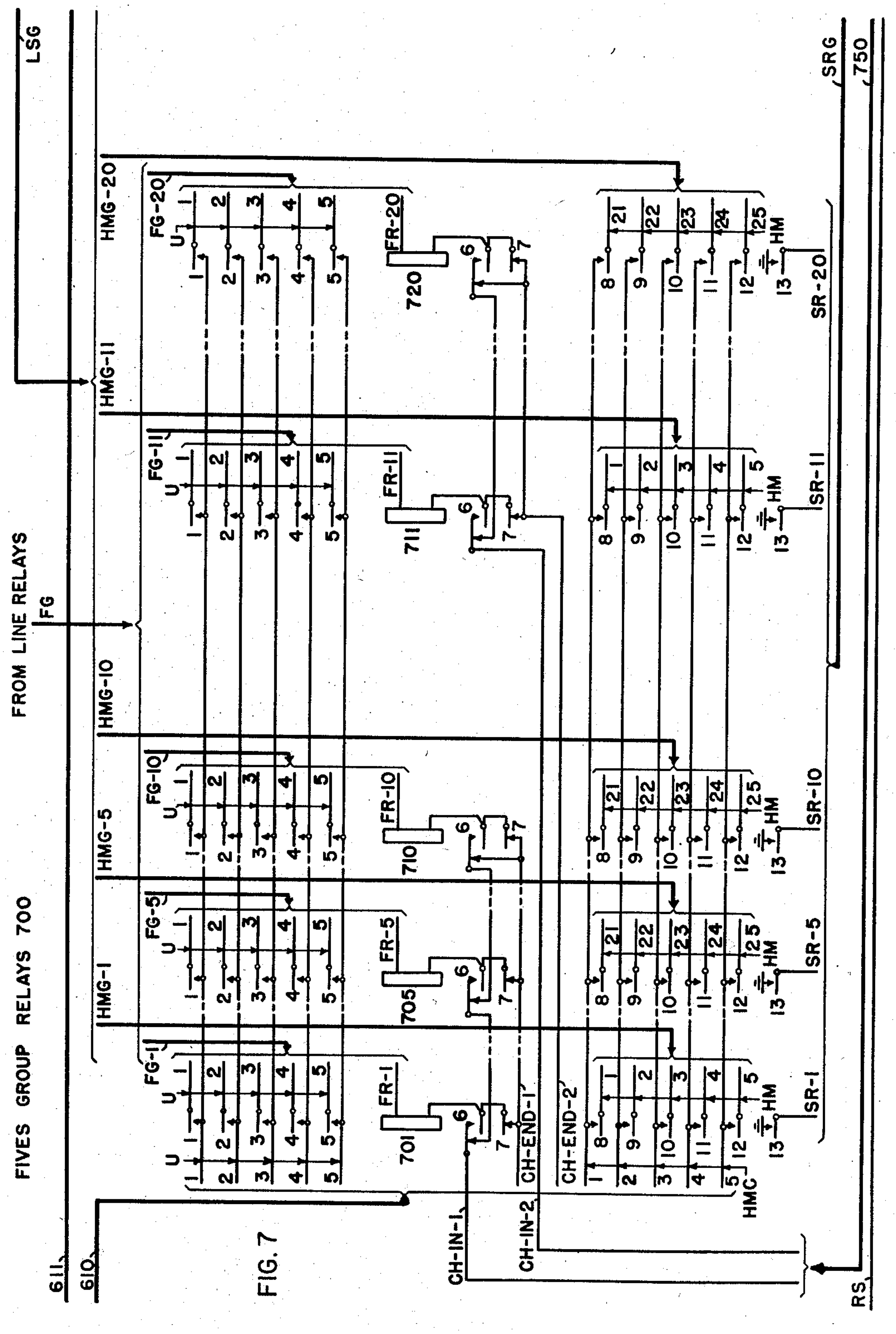
Figure 9:
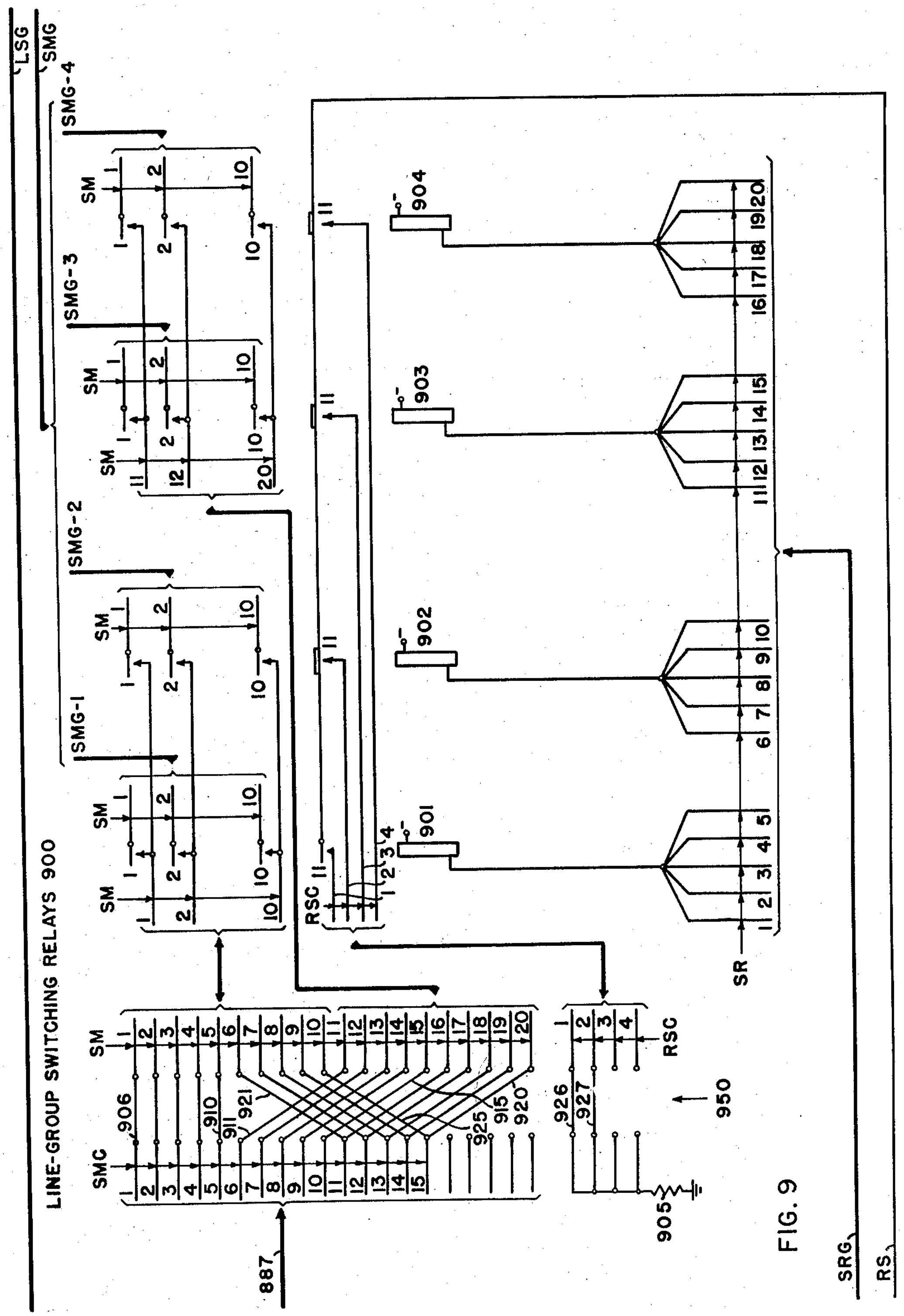

The grounding of any fives relay wire closes an operate circuit for the associated one of fives group relays 701 to 720, shown in Fig. 7. The operate circuit of any fives group relay is from battery potential from supply resistor 814 (Fig. 8, part 1) which normally stands on one side of the winding of each the fives relay FR–1 to FR–20, the circuit being through the windings of chain relays 806 or 807, over one or the other of the chain wires CH–IN–1 or CH–IN–2, conductors in cable group 750, the endless contact chain of the fives group relays and the chain-end wires CH–END–1 or CH–END–2.

If the calling line is in the first 50-line subgroup, the battery potential standing on the chain-end wire CH–END–1 of each of the fives group relays FR–1 to FR–10, causes the fives group relay associated with the calling line to operate. Since the chain relay 806 is in circuit with the chain-in wire CH–IN–1, current flow from the selected fives group relay wire operates chain relay 806 in series with the fives group relay.

Upon operating, the chain relay 806 and the selected fives relay start the line controller in its hereinafter described operation in extending the calling line to an idle originating trunk.

If two or more fives relay wires FR–1 to FR–10 are energized at the same same time from two or more calls in the first 50-line subgroup but in two separate fives groups, each of the corresponding ones of the fives relay FR–1 to FR–10 starts to operate, but the first such relay in the current order of preference opens the preference chain to prevent effective operation of any succeeding one. The contacts 6 and 7 of each of the group relays gives first choice to the fives group relay nearest the associated chain-in wire.

Upon operating effectively, any fives group relay 701 to 710 first closes its make contacts to effectively lock to the chain-end battery and opens, at its break contacts 6 and 7, the forward extension of the endless preference chain.

IVB4b. UNITS SELECTION

When the call is originated at any one of the 100 lines in any switch group, as noted, ground appearing on any units mark wire U–1 to U–5 is extended to the line controller over conductors in line group cable FG–1 and thence through the concerned one of the closed contacts 1 to 5 of the operated fives group relay, through the winding of the corresponding units lockout relay, 601 to 605, to battery potential through current-limiting resistor 609.

Figure 6:
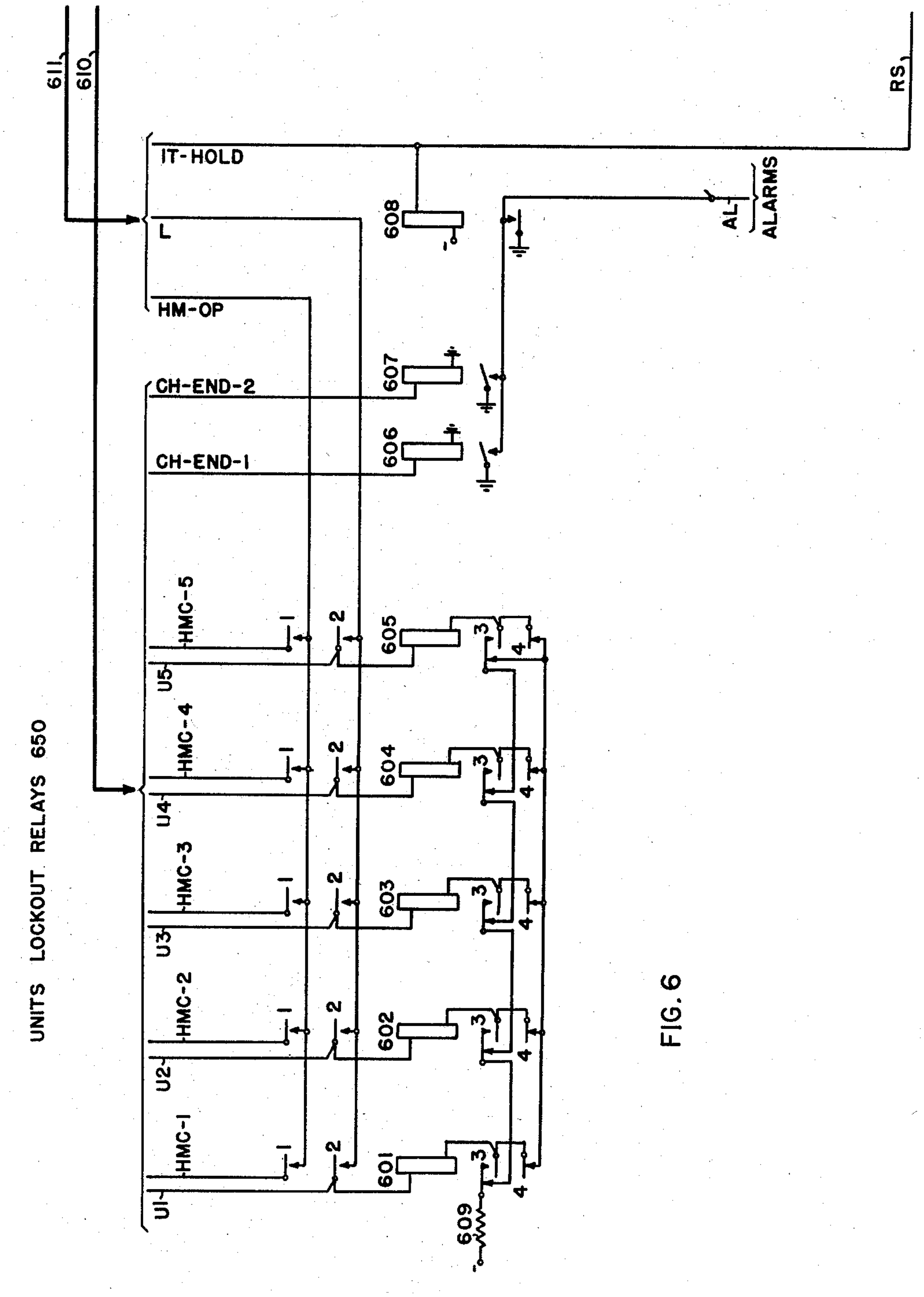

In Fig. 6, it will be observed that operation of any one of the relays 601 through 605, at contacts 3 and 4, precludes the operation of all others. The preference being given to relay 601, as determined by contacts 3.

If two or more of the units mark wires U–1 to U–5 are grounded at the same time, for example, if two lines in the same fives group are calling simultaneously, each of the concerned units lockout relay starts to operate, but the first such relay in the current order of preference opens the preference chain (at its break contacts 3 and 4) thereby preventing effective operation of any succeeding one.

Upon operating effectively, any units lockout relay first closes its make contacts to lock to ground on lock lead L (make contacts 1 of either of chain relays 806 or 807) and at its contacts 4 opens the forward extension of the endless preference chain.

Make contacts 1 of each of the units lockout relays 601 through 605 connect the hold magnet common wires HMC–1 to HMC–5 to the hold magnet operate wire HM–OP. These five hold magnet common wires extend through the make contacts 1 of the operated fives group relay to the corresponding hold magnets of the line switches, thereby selecting the hold magnet associated with the vertical terminating the called line.

In any line controller, serving the lines terminated on four line switches, twenty fives-group relays are provided, five relays for each switch. Therefore, operation of any fives relay 701 to 705 marks the calling line as one served by the first switch of the concerned switch group; operation of a particular fives relay marks the group of five lines containing the called line; and operation of a particular units guard relay marks the concerned calling line.

Assuming the calling line is the first line in the first fives group of the first switch in any switch group, fives group relay 701 operates in series with chain relay 806 from ground appearing on fives mark wire FR–1 and units guard relay 601 operates from the ground on units mark wire U–1 and locks operated through its contacts 2 to lock wire L, grounded at make contacts 1 of chain relay 806, as noted.

If two calls are simultaneously originated from two separate 50-line groups, the associated five group relays and chain relays 806 and 807 all start to operate. However, the chain relays are so arranged that relay 806 has preference (at its contacts 5 and 6) and only relay 806 and its concerned fives relay fully operates.

IVB4c. 50-LINE GROUP SELECTION

Responsive to the operation of one or another of the chain relays 806 and 807, contacts 7 extend ground to the first and second select magnet control wires 1–SMC and 2–SMC, and at contacts 3 connect the idle test hold conductor IT–HOLD to the idle test control wires ITC–1 and ITC–2. Contacts 2 of the operated chain relay prepare a clearout circuit for the line controller apparatus by connecting the sleeve common wires SC–1 and SC–2 to the clearout relay apparatus. Make contacts 1, as previously noted, ground the lock conductor L to maintain the concerned units lockout relay operated.

IVB4d. ALLOTTING RELAY OPERATION

Referring now in particular to Fig. 8, parts 1 and 2, it will be observed that three reset relays 811 through 813 are provided, each having a group of make contacts connected to respective allotting relay groups over conductors in cable groups 821 to 823. The allotting relays 851 through 870 comprise twenty relays, one for each trunk, twenty trunks being the maximum number provided for any one hundred lines. As hereinbefore noted, it has been chosen to provide fifteen originating trunks for any one hundred lines, five such trunks being individual to the first fifty lines, five trunks individual to the second fifty lines, and five trunks common to all one hundreds lines of any one switch group. Accordingly, the five allotting relays 851 through 855 correspond respectively to the five trunks associated individually with the first fifty lines, the five allotting relays 856 through 860 correspond respectively to the five trunks associated individually with the second fifty lines; and the five allotting relays 861 through 865 correspond respectively to the five trunks common to all the lines in any switch group.

Twenty relays, 851 to 870 have been provided, for traffic conditions wherein 10 trunks are desired to be individual to the first 50 lines and wherein 10 other trunks are desired to be individual to the second 50 lines, thereby providing a total of 20 trunks per 100 lines. Other combinations may be provided as desired, such as providing seven trunks individual to the first 50-line subgroup, seven trunks individual to the second 50-line subgroup and three trunks common to the one hundred lines, thereby providing a total of seventeen trunks per one hundred lines.

Each of the allotting relays 851 through 865 when operated, at their make contacts 5, extend ground potential from grounded conductor 873 over respective wires 815, 816, and 817 to associated all-finder-busy relays 808 through 810. Therefore, assuming all allotting relays in their operated position, ground potential appearing on wires 815 to 817 operates the all-finder-busy relays 808 to 810. Break contacts of these relays open the operate circuit of the reset relays until such time all allotting relays associated with the allotting trunk group are restored. When the allotting relays of any trunk allotting group are all restored the concerned AFB relay restores and closes an operate circuit for the associated reset relay. When any reset relay 811 through 813 operates, its contacts 1 to 10 extend ground potential over the associated conductors in the concerned cable group 821 through 823 to one side of the winding of the allotting relays assigned the trunks in the concerned group. The other side of each of these relays is connected to the concerned idle test wires IT–1 to IT–15, such wires being connected to battery potential through the battery supply resistor in the selector associated with the trunk allotted by such relays. Therefore, each of these relays, assuming the trunks which they are associated with, are idle and battery potential is on the corresponding idle test conductor IT, operate and lock operated to locking conductor 871.

If all trunks in one allotting group are busy, a suitable alarm may be provided, as desired. Responsive to the operation of any one relay in any allotting group, ground potential is extended to the winding of the associated all-finder-busy relay operating it, thereby restoring the operated reset relay.

Make contacts 4 of each allotting relay operated extends ground potential to the operate winding of the next succeeding relay in its group to operate it when the trunk associated therewith becomes idle. This operate chain extends forward and only the allotting relays ahead of the current allotting relay can be energized in this manner. Contacts 4 also serve to operate all idle allotting relays if one relay precedes the others in operation and disables the reset means before all idle relays are operated.

Assuming all trunks are in an idle condition, the allotting relays 851 to 865 are all operated; the all-finder-busy relays 808 to 810 are in their operated condition and reset relays 811 to 813 are restored, as shown. Under these conditions, the sleeve wires S–1 through S–15, connected to the sleeve wires of 15 originating trunks, are connected through the make contacts to the associated sleeve control wires SC–1 and SC–2, through the make-break contact combinations. In this manner, the first allotting relay 851 associated with the first 50-line subgroup is in the current order of preference if chain relay 806 operates; allotting relay 856 is in the current order of preference if chain relay 807 is operated; and allotting relay 861 has preference if chain relay 806 operates with relays 851 to 855 restored or if chain relay 807 operates with relay 856 to 860 restored. When the trunks associated with the allotting relay becoming allotted, such allotting relay restores and at its contacts 1 shifts the operating preference to the next succeeding relay.

For the purpose of illustration, assuming that all trunks are idle, the sleeve wires of originating trunk 1 and trunk 6 are connected to the corresponding sleeve control wires SC–1 and SC–2 respectively. Also, it will be observed that the select magnet control wires terminated at contacts 6 of each of the allotting relays and extending to the line group switching relays are connected to the select magnet control wires 1–SMC and 2–SMC through the break-make contact combinations in a manner similar to the sleeve wires. With the allotting relays in an operated condition, indicative of idle associated trunks, the idle test conductors ITC–1 and ITC–2 are connected to the corresponding conductors of each trunk in an order of preference similar to the sleeve and select magnet control wire preference.

Responsive to the operation of chain relay 806 in series with a fives group relay such as relay 701, ground at break contacts 2 of clearout relay 805 is extended through make contacts 7 of relay 806 to the select magnet control wire SMC–1, through make contacts 6 of the operated allotting relay 851, assuming trunk 1 is idle, and over the corresponding conductor SMC–1 in cable group 887 to contacts on the line group switching relays.

IVB4e. SWITCHING RELAY OPERATION

The line group switching relays 900, comprise relays 901 through 904 which correspond respectively to the four line switches in any switch group. Line group switching relay 901 corresponds to the line switch LS–1 on the switching group SG–1 on line frame TH–1; relay 902 corresponds to line switch LS–2; and so forth. Accordingly, the noted ground appearing on any one of the select magnet wires SM–1 to SM–5 and SM–10 to SM–15 is extended through the make contacts of the switching relay 901 or 902 and over conductors in select magnet group SMG–1 or SMG–2 to the select magnet of the corresponding horizontal of the associated switch.

As pointed out hereinbefore, trunks 1 to 5, associated with allotting relays 851 to 855, are accessible only from the first two switches in any switch group. Therefore select magnet control wires SMC–1 to SMC–5 are connectable to the select magnets of switches LS–1 and LS–2 by operation of switching relays 901 or 902. However, with the calling line being served by the first switch LS–1, illustrated in Fig. 10, only line group switching relay 901 is operated, as noted. Since the first 25 lines are terminated on the switch LS–1, and since fives group relays 701 to 705 are associated with the fives group within that switch, the switching relay wires SR–1 to SR–5 are connected to the line group switching relay 901; wires SR–6 to SR–10 are connected to the second switching relay 902; and so forth.

Responsive to the noted operation of the fives group relay 701, make contacts 13 thereon ground switching relay conductor SR–1 extending to the battery-connected winding of line group switching relay 901. Contacts 11 on relays 901 to 904 provide for 25-line group restricted service as will be described in detail hereinafter.

Associated with the line group switching relays 900 is a terminal strip section 950 wherein jumpers 906 through 927 are shown connected. The jumpers 906 to 925 are connected in a predetermined order, such order corresponding to the manner in which the lines and trunks of the line switches are interconnected.

On the incoming side of terminal strip section 950, select magnet control wires SMC–1 to SMC–15 are terminated in numerical order. The incoming side is connected by jumpers to the outgoing side in the order in which the trunks of the line switch are assigned to certain groups of lines.

The first 50 lines, terminated on switches LS–1 and LS–2 have access to individual trunks 1 to 5 which are controlled by select magnets 1 to 5 of such switches. Accordingly select magnet control wires SMC–1 to SMC–5, associated with the first 50-line allotting relay group, are connected to select magnet wire SM–1 to SM–5, extending to relays 901 and 902 by jumpers 906 to 910.

The second 50 lines, terminated on switches LS–3 and LS–4 have access to individual trunks 6 to 10 which are controlled by select magnet wires SM–1 to SM–5 of these switches. Accordingly, select magnet control wires SMC–6 to SMC–10, associated with the second 50-line allotting relay group, are connected to select magnet wires SM–1 to SM–5 extending to relays 903 and 904 by jumpers 911 to 915.

Trunks 11 to 15 of any switch group, being common to all lines in such group and controllable by select magnets 6 to 10 of each switch require connection to all switches. Therefore, select magnet control wires SMC–11 to SMC–15, associated with the common allotting relay group, are connected to select magnet wires SM–6 to SM–10 extending to relays 901 to 904 by the two sets of jumpers 916 to 920 and 921 to 925.

IVB4f. ALLOTTING OPERATION

Under the previously assumed conditions, responsive to the operation of chain relay 806 in series with fives group relay 701, contacts 7 of relay 806 extend ground from break contacts 2 of clearout relay 805 to select magnet common wire 1–SMC from whence it is extended through make contacts 6 of allotting relay 851, over select magnet control wire SMC–1, jumper 906, make contacts 1 of the operated line group switching relay 901, and over the corresponding conductor in cable group SMG–1 to one side of the winding of the select magnet SM–1 of Fig. 10. The other side of the select magnet winding is connected to the odd select-magnet battery wire ODD–SM–BATT extending to the battery-connected winding of the odd select magnet operate relay 801. Select magnet SM–1 operates and closes its off-normal contacts 1 and 2.

At the same time, contacts 3 of chain relay 706 extend the battery potential from the battery-connected winding of the idle-test hold relay 608 over idle-test hold wire IT–HOLD, to the idle-test common wire ITC–1. This battery potential is further extended through make contacts 2 of the operated allotting relay 851 to trunk 1. This battery potential also appears on the idle-test wire IT–1 connected to one side of the winding of allotting relay 851 to maintain it operated until such time that the common control apparatus is released, thereby preventing the seizure of the selector by the call in progress from restoring relay 851 prematurely and possibly seizing the next selector.

Break contacts 4 of chain relay 806 opens the operate circuit of reset relay 811 in case that the allotting relay used to allot an idle trunk responsive to the current call is the last one in the group. This operation prevents resetting during line finding action as it may disturb the trunk selection in progress. On completion of a clearout of the line controller, the resetting operation takes place if resetting is required.

Select magnet SM–1 operates in series with the odd select magnet operate relay 801 over the previously traced path. Contacts on relay 801 complete an operate circuit for the pre-operate relay 803 over the odd pre-operate wire ODD–PRE–OP. This circuit is from battery-connected winding of relay 803, contacts on relay 801, the off-normal contacts 1 associated with the select magnets SM–1 and SM–2, and the normally-grounded tip conductor T of the originating trunk extending to the selector that was allotted by the action of the allotting relay 851. As previously noted, this battery potential being applied to the tip conductor of the originating trunk causes the line relay of the seized selector to operate before the line loop is closed across the winding in order to decrease the time interval required before ground is returned on the sleeve conductor, initiating the clearing out of the common control apparatus.

The current flow over the tip conductor from the battery-connected winding of the pre-operate relay 801 causes relay 801 to operate after the short delay caused by its short-circuited lower winding (at its contacts 3). Upon so operating, contacts 1 extend ground potential to the hold magnet operate wire HM–OP. At the same time, its contacts 2 connect the battery-connected winding of the first clearout relay 804 to the sleeve common wire SC–1 extending to the sleeve conductor of the seized selector through make contacts 2 of chain relay 806 and make contacts 1 of allotting relay 851.

The ground potential on hold magnet operate wire HM–OP is extended over conductors in cable group 611 and through make contacts 1 of the operated units lockout relay 601 to the hold magnet control wire HMC–1, from whence it is extended through the operated fives group relay 701 to the hold magnet wire HM–1 extending to the battery-connected winding of hold magnet HM–1001 of Fig. 10.

Hold magnet HM–1001 operates and locks through its off-normal contacts to the sleeve conductor of the built-in vertical multiple. The hold magnet closes the contact points at the intersection of vertical V1 associated with hold magnet HM–1001 and horizontal H1 associated with select magnet SM–1, thereby connecting the tip, ring, and sleeve conductors of the calling line to the orginating trunk associated with such horizontal.

The extension of the calling line to an idle originating trunk associated with selector 1100 closes the usual calling bridge across the tip and ring conductors to maintain the line relay of the selector operated, as will be described hereinafter. The calling line is now connected to an idle selector and dial tone is returned, signalling the calling line that dialing of the digits of the directory number of the desired line may commence.

Responsive to the seizure of a selector 1100, ground is returned on the sleeve conductor S of the seized originating trunk, as will be later described. This ground appears on the sleeve common wire SC–1 over the hereinbefore noted path and causes operating current to flow through the winding of clearout relay 804.

IVB4g. CLEAROUT

Clearout relay 804 operates and at its contacts prepares an operate circuit for clearout relay 805.

Relay 805 operates and at its break contacts 1 disconnect the idle-indicating battery supply resistor 814 from the concerned chain wire thereby permitting the restoration of the operated chain relay 806 and the concerned fives group relay 701. At its break contacts 2, it removes ground from the select magnet control wire thereby permitting the select magnet SM–1 to restore. As is well known, the indicated cross points are held closed by maintaining the hold magnet energized irrespective of whether the select magnet is operated or not.

With the restoration of the chain relay and the fives group relay, contacts 1 of the chain relay remove the ground from the locking wire L thereby permitting the concerned units lockout relay 601 to restore and contacts 13 of the fives group relay 701 open-circuit relay 901 permitting it to restore.

The ground returned on the sleeve conductor operating the clearout relay 804 is also projected over the sleeve conductor to the calling line and operates the concerned cutoff relay of line circuit LC–1. Line relay 225 restores and opens the fives marking wires and the units mark wires, further insuring that the chain is cleared out.

With the restoration of the units lockout relay, the fives group relay, and chain relay 806, the operate circuit of the clearout relay 804 is opened and relay 804 consequently restores. After a short delay due to its slow-release characteristics, clearout relay 805 restores. Break contacts 4 of now restored chain relay 806 again extends ground to the operate winding of the reset relay 811 provided the originating trunk last used was the last one in the group.

With the restoration of the select magnet following the operation of hold magnet HM–1001, the operate circuit of relay 801 is opened and it restores, thereby releasing the pre-operate relay 803.

The restoration of pre-operate relay 803 and the noted restoration of units and fives relays opens the initial operate circuit of the hold magnet HM–1001. Hold magnet HM–1001 does not restore as it is now held operated through its off-normal contacts from the ground on the sleeve conductor S of the seized originating trunk.

With the restoration of the chain relay, contacts 3 open the idle-test hold battery from the idle-test hold relay 608 and permits the allotting relay associated with the seized originating trunk to be restored, as idle-indicating battery potential from the selector is removed and ground potential is substituted therefor. The break-make spring combination on relay 851 (the relay associated with the originating trunk used in extending the calling line to an idle selector) transfers the select magnet common wire 1–SMC, the idle test common wire ITC–1, and the sleeve common wire SC–1 to the next succeeding relay in the same 50-line group, assuming all trunks are idle expecting the one used in the noted extension of a connection.

The line controller is now returned to common use in preparation for another call. The hold magnet HM–1001 is held operated and the calling line is connected to a thousands selector through closed contacts of switch 1000.

IVB4h. ALARMS

The line controller disclosed herein includes alarms for indicating chain contact failure of the two 50-line groups of fives group relays and for indicating failure of the line controller to clear out within a predetermined interval. Other alarms and meters not shown may be provided when necessary, as for all-finder-busy condition and so forth.

The fives group relay chain alarm relays comprise relays 606 and 607 of Fig. 6. The resistance of such relay is great enough that when in circuit with the chain relays 806 or 807 and associated fives relay, current flow thereover is insufficient to operate the concerned chain relay and fives group relay but sufficient to operate the alarm relays 606 and 607. Open-circuit of such path by faulty chain contacts of the fives group relays, restore the alarm relays, grounding alarm lead AL and after a predetermined delay an audible or visible alarm is given.

*IVC. Thousands selector 1100 (Fig. 11)*

As shown in Fig. 11, thousands selector 1100 includes a test jack TJ, nine relays 1101 through 1109, condenser 1111, resistor 1112, and magnetic impulse counter THR.

IVC1. CIRCUIT FUNCTIONS OF SELECTOR 1100

Thousands selector 1100 is a local thousands selector and handles only locally originated calls, which are received over its assigned originating trunk 101–1, incoming from a line switch such as line switch 1000. According to its destination, any such call is handled as an outgoing call to other exchanges or as a localling terminated call to lines served by the disclosed exchange. The thousands selector 1100 performs the following principal circuit functions:

(1) Normally, it supplies idle-indicating battery potential to the idle-test conductor IT of the attached originating trunk;

(2) Upon seizure, it (1) applies dial tone to the calling line until the first digit is dialed, and (2) removes the noted idle-indicating battery potential and places a holding ground potential on the sleeve conductor of the attached originating trunk;

(3) It absorbs the initial digit 1 as many times as dialed or otherwise produced;

(4) It receives and stores a single digit for controlling the thousands controller in extending calling connections;

(5) It temporarily seizes the chain circuit of its local thousands selector section, subject to such chain being idle, and thereafter guards the seized chain against seizure by any other thousands selectors associated with the switches in the same switch group;

(6) Upon a signal that no idle thousands trunk extending to the next switching stage can be found, it applies busy tone to the calling line and frees the seized chain;

(7) Provides restricted service on the basis of 25 line groups; and (8) On completion of the extension of a connection to the next switch stage, it cuts-off all unnecessary current drain sources and is connected to the next stage with no contact points in the talking path through the selector.

IVC2. RELAY FUNCTIONS OF THOUSANDS SELECTOR 1100

The nine relays (1101 to 1109) of thousands selector 1100 have principal functions assigned thereto as follows:

Relay 1101 (cutoff) cuts off the line relay from the calling line thereby freeing the talking conductors from external apparatus;

Relay 1102 (line) operates when the selector is seized, and restores thereafter, under control of the calling device or hookswitch, whenever the calling line loop is opened;

Relay 1103 (release) is slow-releasing by virtue of a copper sleeve under its winding; it is operated by the line relay; it remains operated during pulsing, but releases when line relay remains restored for a substantial fraction of a second;

Relay 1104 (release auxiliary) is operated from contacts on the release relay and aids in the performance of the release relay functions;

Relay 1105 (restricted service) operates when the calling line is in a group of lines restricted from dialing certain trunk levels, illustrated as level "8";

Relay 1106 (off-normal) is operated on the start of the dialing of the first digit and remains operated until the selector is released;

Relay 1107 (busy) is operated from the common control apparatus to apply busy tone signal to the calling line, when necessary;

Relay 1108 (series) is operated by the line relay; it operates at the beginning of the series of dial pulses and it restores only after the line relay comes to rest operated, as it is slow-releasing because of a copper sleeve under its winding; and Relay 1109 (chain) is operated on the completion of the dialing of the thousands digits of the directory number by seizing the chain of selector section containing the calling selector for providing the selector exclusive use of the common control apparatus.

The impulse counter THR registers the number of impulses in the thousands digit or trunk level digit dialed; at its break contacts 1 removes the idle-indicating battery supply resistor as a guard measure; at its make contacts 1 aids in the digit 1 absorption; and at its make contacts 2 prepares the operate circuit of chain relay 1109.

IVC3. DETAILED OPERATION

A detailed operation of selector 1100 will now be given.

IVC3a. SEIZURE

When thousands selector 1100 is seized by the projecting of battery potential ahead on the tip conductor T of the originating trunk by the allotting action of the controller, the ground-connected upper winding of line relay 1102 is energized. Line relay 1102 operates and at its make contacts extend ground potential to the battery-connected winding of release relay 1103. Release relay 1103 operates and at its contacts 1, ground the sleeve conductor S of the originating trunk and at its make contacts 2 extend ground potential to the battery-connected winding of release auxiliary relay 1104.

At the time that the ground potential appears on the sleeve conductor S of originating trunk 101–1, the extension of a connection from the calling line to the first thousands selector 1100 is completed, and the calling line is bridged across the tip and ring conductors T and R, maintaining line relay 1102 operated. The ground on the sleeve conductor maintains the concerned hold magnet and cutoff relay of the line circuit operated, as hereinbefore described.

Release auxiliary relay 1104 operates and at its contacts 1 supplies dial tone to the calling line through break contacts 1 of cutoff relay 1101, break contacts 1 of off-normal relay 1106 and busy relay 1107, the small-capacity tone-coupling condenser 1111, make contacts 1 of release auxiliary relay 1104, and break contacts 2 of the cutoff relay 1101; its contacts 2 disable the release circuit of the thousands register THR and prepares an operate circuit for the select magnet associated with horizontal terminating this selector; its break contacts 3 aid in disabling the circuit of the digit counter and at its make contacts 3 prepares an operate circuit for advancing the magnetic counter responsive to impulses constituting the dialed digit; contacts 4 ground common locking wire 1115; and break contacts 5 open the operate circuit of the restricted service relay if it has not operated by this time.

IVC3b. RECEIPT OF DIGIT PULSES

On hearing the noted dial-tone signal, the calling subscriber dials the thousands digit in the directory number of the called line or station.

Each time the calling device is operated to transmit a series of circuit interruption impulses, line relay 1102 is restored momentarily for each such interruption impulse in a series comprising from 1 to 10 impulses, depending upon the digit dialed. Release relay 1103 remains operated throughout any series of impulse-induced restorations of line relay 1102, it being slow-restoring because of its indicated copper sleeve and relatively light spring load.

Series relay 1108 operates promptly upon the first restoration of line relay 1102, its operate circuit being from break contacts of the line relay 1102, make contacts 2 of release auxiliary relay 1104 and pulse wire 1119. Being slow-restoring because of the indicated copper sleeve under its winding, relay 1108 remains operated throughout the digit series of momentary restoration of the line relay.

With release relay 1103 maintained continuously operated, each restoration of line relay 1102 delivers an impulse at its break contacts to pulse wire 1119 as noted. The lower or operating winding of the thousands register THR is connected so that the series of impulses appearing on wire 1119 are extended through break contacts 2 of busy relay 1107, wire 1121, break contacts 5 of relay 1101, and wire 1120 to operate the digit register.

When line relay 1102 comes to rest operated at the end of any digit series of impulses, series relay 1108 shortly thereafter restores, responsive to the continued open-circuit of its operate circuit and at its break contacts closes the chain relay circuit.

When the impulses of the thousands digit are delivered over wires 1120, 1121, and 1119, to the operate winding of thousands register THR, the contact sets (1 to 10) of this register are actuated successively, responsive respectively to the impulses of the digit.

On receipt of the first impulse, thousands register THR, at its break contacts 1 disconnect the idle-indicating potential from the idle test conductor IT and at its make contacts 1 prepare for absorbing the digit 1, if no more pulses are forthcoming.

Thousands selector 1100 is arranged to absorb the initial digit 1 as many times as dialed or otherwise produced, as by improper hookswitch operation or by line trouble. Accordingly, the digit 1 is unassignable as an effective thousands digit.

IVC3c. DIGIT "1" ABSORPTION

When the thousands digit received contains only a single impulse, the first contact set is the only one operated on the thousands register THR. Then, when series relay 1108 restores, as described, at the end of the thousands digit registration, ground potential from back contacts of series relay 1108 is extended through break contacts 4 of busy relay 1107, break contacts 7 of cutoff relay 1101, make contacts 1 and break contacts 2 of thousands register THR, current-limiting resistor 1112, and the lower or release winding of thousands register THR to battery. The current flow through the lower winding of thousands register THR neutralizes the residual holding flux in the thousands register THR and it consequently restores. When the thousands register THR restores, its contacts 1 opens the release circuit of the register and prepares it to receive impulses again.

IVC3d. SELECTOR 1100 RELAY OPERATION

The first stepping impulse which is delivered to the thousands register THR is also delivered to the battery-connected winding of series relay 1108. Series relay 1108 operates and at its make contacts extend ground potential to the battery-connected winding of off-normal relay 1106. Relay 1106 operates and locks to ground on locking wire 1115 through its make contacts 3. Make contacts 2 of off-normal relay 1106 prepare the release circuit of thousands register THR for normal clearout, as will hereinafter be described; break contacts 1 open the dial-tone lead to prevent reapplication of dial tone to the calling line; and break contacts 4 open the battery supply to the idle test wire IT to prevent seizure of this selector by the line controller.

At the end of the dialing of the first digit, the line relay 1102 comes to rest operated, and release relay 1103, release auxiliary relay 1104, and off-normal relay 1106 are maintained operated, along with the setting of register THR.

When series relay 1108 restores on completion of the dialing of the thousands digit, its break contacts place ground potential on wire 1117 through break contacts 4 of busy relay 1107 and break contacts 7 of cutoff relay 1101. This ground is extended through the make contacts 2 of the thousands register THR to wire 1116 extending to one side of the winding of chain relay 1109. If a battery-supply circuit is complete to the chain-in wire from break contacts 6 of chain relay 1109, chain relay 1109 operates. This path includes the chain-end conductor closed in the idle selector controller, and the closed chain-out conductor when no other selectors in the selector section is individualized to the controller. The chain conductors of each selector in one section are connected together and are normally connected to the chain-out conductor of the last selector in the section. The chain-in conductor of the last selector is connected to the chain-out conductor of the next to the last selector, and so forth with the chain-in conductor of the first selector in the section being connected to battery potential. This interconnection of such conductors is indicated in Fig. 11 with dotted lines representing other selectors in the same section. In this manner, operation of the chain relay of any selector precludes the operation of any other chain relays of selectors in the same section.

Chain relay 1109 is operated over the traced circuit in this selector to seize the common chain and to guard it against seizure by any selector in the same section by locking itself (at its make first contacts) to the associated chain-end wire, CH–END, and by isolating the chain-out wire from the chain-in wire of the next coupler at break contacts 6 and 7.

Chain relay 1109, at its make contacts 3 extend ground potential to common lead 1118 extending to contacts 3 to 10 of thousands register THR, thereby grounding the previously selected one of the digit wires D2 to D10 extending to the selector controller; contacts 4 prepare the operate circuit for the busy relay in the event that there are no trunks idle in the called group; contacts 5 connect the HB battery lead to the HB lead in preparation for preparing the common test relays of the selector controller for use; contacts 2 ground wire 1123 and consequently ground the select magnet wire SM extending to the selector switch, through make contacts 2 of release auxiliary relay 1104; and make contacts 1 connect the sleeve conductor S of the trunk extending to the selector switch, to wire 1125 in preparation for the operation of the cutoff relay 1101.

Upon receiving the extended digit information, over the selected one of the digit wires D2 to D10, the selector controller positions the select shafts of the selector switch for mechanically selecting the horizontal terminating this selector. In the event that all trunks in the called level are busy, ground appearing on the busy wire BU operates busy relay 1107 which locks operated through its make contacts 3 and at its contacts 1 transfers tone-coupling condenser 1111 from the dial tone wire DT to the busy tone wire BT thereby providing the calling line with an appropriate busy tone signal. Break contacts 2 of relay 1107 open the pulsing circuit of the thousands register THR, and break contacts 4 thereof open the release circuit of the chain relay thereby permitting the seized selector controller to return to common use.

In the event that there is an idle trunk in the called level, the selector controller controls the selector switches in extending the calling line through selector 1100 to such trunk extending to the next stage.

When the next stage is seized ground potential is returned on the sleeve conductor S of the attached trunk, and is extended through make contacts 1 of chain relay 1109 to wire 1125 extending to the battery-connected winding of cutoff relay 1101. Cutoff relay 1101 operates and at its make contacts 2 and 3 disconnects line relay 1102 from the calling line; its break contacts 1 disconnect the dial-tone lead DT from the calling line; its contacts 4 connect the sleeve conductor of the selector switch to the sleeve conductor of the originating trunk 101–1 thereby maintaining the hold magnet on the line switch operated and the cutoff relay of the calling line operated as hereinbefore noted; its make contacts 5 open-circuit the pulsing wire of the thousands register THR; its break contacts 6 open-circuits the select magnet lead SM thereby permitting the operated select magnet in the selector switch to restore; and at its break contacts 7 open-circuits the chain operate circuit.

Line relay 1102, release relay 1103, release auxiliary relay 1104, and chain relay 1109 restore. With the restoration of chain relay 1109, the initial operate circuit of cutoff relay 1101 is opened, but cutoff relay 1101 does not restore at this time as it is held operated in series with the upper winding of the off-normal relay 1106 to the ground appearing on the sleeve conductor S of the attached thousands trunk extending to the hundreds selector stage.

The calling line is now connected through the selector switch associated with selector 1100 to the next stage, in this case the hundreds selector stage, and the next digit (the hundreds digit) is dialed.

Cutoff relay 1101, off-normal relay 1106, and register THR are the only apparatus operated in the selector at this time.

IVC3e. CLEAROUT

Responsive to the clearout of the selector, by disconnection by the calling line, ground potential is removed from the sleeve conductor of the associated trunk and cutoff relay 1101 and off-normal relay 1106 restore, off-normal relay 1106 restoring a short time later, it being slow-restoring because of the indicated copper sleeve under its winding.

With the restoration of cutoff relay 1101, ground from back contacts of line relay 1102, break contacts 3 of release auxiliary relay 1104, break contacts 6 of cutoff relay 1101, and make contacts 2 of the yet operated off-normal relay 1106 energize the release winding of the thousands register THR through break contacts 2 of release auxiliary relay 1104 and current-limiting resistor 1112. Thousands register THR restores and shortly thereafter, off-normal relay 1106 restores and the selector is completely cleared out. Idle-indicating battery potential reappears on the idle test conductor IT and the associated allotting relay operates if the next preceding relay is operated.

In the event of power failure, all operated relays in selector 1100 restore with the exception of impulse counter THR which is held operated by residual magnetism. However, the arrangement of selector 1100 is such that when power is restored to the selector, the chain relay operates through the closed contacts of thousands counter THR and at its make contacts 2 ground wires 1123 and 1122 thereby clearing out the counter. Thereafter, the restoration of the chain relay returns the selector to normal condition in preparation for receiving another call.

IVC3f. RESTRICTED SERVICE

In the illustrated embodiment, restricted service is provided for all lines in the first 50-line group of switch group SG–1 by the strapping of control wires RSC–1 and RSC–2 (Fig. 9) to ground through resistor 905 by jumpers 926 and 927. Since relay 901 is operated when any line served by the first switch originates a call and relay 902 is operated when any line served by the second switch originates a call, contacts on such relays ground restricted service wire RS. In the event that any one of such lines originate a call, this resistance ground is extended over the idle-test hold conductor IT–HOLD, the idle test common conductors ITC–1 or ITC–2 to selector 1100 from whence it is extended through contacts of test jack TJ, over wire 1115, through break contacts 4 of the off-normal relay 1106, break contacts 1 of thousands register THR, and through break contacts 5 of release auxiliary relay 1104 to the battery-connected upper winding of restricted service relay 1105. Under such conditions, before the off-normal relay 1106 operates, as described, restricted service relay 1105 operates and locks operated through its make contacts 1 to the ground at make contacts 2 of release relay 1103.

Upon operating, restricted service relay 1105 at its contacts 2 opens the digit lead of the thousands register THR that corresponds to the trunk level to be restricted, in this case digit lead D8, thereby preventing the selector controller from extending a call to the trunks served by level 8. Failure of the selector controller to extend a connection results in the grounding of busy tone wire BT to operate relay 1107 causing busy tone to be returned to the calling line.

Upon the clearing out of the connection, restricted service relay 1105 restores when relay 1103 restores and the selector is again returned to common use, as noted.

IVC3g. TEST JACK TJ

Test jack TJ is adapted to receive a three-conductor test plug (not shown) when a test connection is desired to the incoming tip, ring, and sleeve conductors of thousands selector 1100. When such a plug is inserted, the break contacts of the test jack TJ remove idle-indicating battery from the idle-test conductor IT thereby causing the thousands selector and trunk to test busy to the line controller for the duration of the test connection. When desired, a dummy plug may be inserted into test jack TJ to cause selector 1100 and originating trunk 101–1 to test busy.

*IVD. Hundreds selector 1200 (Fig. 12)*

Hundreds selector 1200 is a local hundreds selector which handles only locally terminated calls which are received over its assigned thousands trunk 1–167–1, incoming from the thousands selector switch 1500.

IVD1. Circuit functions of selector 1200

The hundreds selector 1200 performs the following principal circuit functions:

(1) Normally, it supplies idle-indicating battery potential to the sleeve test conductor ST attached to the sleeve conductor of the thousands trunk incoming to selector 1200;

(2) Upon seizure, it removes the noted idle-indicating battery potential and places ground potential on the sleeve conductor of the attached thousands trunk;

(3) It receives and stores a single hundreds digit for transfer to the selector controller for controlling the apparatus used in extending the calling connection;

(4) It temporarily seizes the chain circuit of its hundreds selector section subject to such chain being idle and thereafter guards the seized chain against seizure by any other hundreds selector associated with the switches in the same switch group; and (5) Upon signal that no idle hundreds trunk extending to the next switching stage can be found it applies busy tone to the calling line and frees the seized chain.

IVD2. Detailed operation

The eight relays (1201 to 1208) perform their respective principal functions described in reference with thousands selector 1100 for corresponding relays. The impulse counter HR registers the number of impulses in the hundreds digit dialed; and its make contacts 1 control the chain circuit of its associated chain section; and its break contacts, control the application of idle-indicating potential. Since digit "1" absorption is not provided in the hundreds selector, ten digit leads (D1 to D10) provide 10 selector levels.

IVD2a. SEIZURE

The seizure of hundreds selector 1200 is accomplished by the extension of the bridged tip and ring conductors of the calling line to the battery and ground connected windings of line relay 1202, which operates and operates the release relay and release auxiliary relay in the manner described for selector 1100. At such time, the idle-indicating battery potential is removed from the sleeve conductor and ground potential is placed thereon. Dial tone is not returned to the calling line as the switch-through of the thousands selector and the seizure of the hundreds selector is accomplished during the inter-digit interval and the subscriber dials the hundreds digit of the directory number to be recorded in the hundreds selector without any interruption.

IVD2b. RECEIPT OF DIGIT IMPULSES

Responsive to the receipt of the digit impulses constituting the hundreds digit of the directory number of the called line, line relay 1202 restores momentarily for each interruption impulse and generates a series of ground impulses which are extended to the battery-connected winding of the series relay 1207 and to the operate winding of the hundreds register HR.

Series relay 1207 operates in the manner described for selector 1100 and remains operated throughout the digit series of momentary restorations of line relay 1202.

The impulses of the hundreds digit are delivered over wire 1221 and 1220 to the operate winding of hundreds register HR, and the contact sets (1 to 10) of this register are actuated successively responsive respectively to the pulses of the hundreds digit.

On receipt of the first impulse, hundreds register HR at its break contacts 1, opens the idle-indicating battery potential supply to prevent its reapplication to the sleeve conductor until such time that the selector is completely cleared out. Make contacts 1 of register HR prepare an operate circuit for the chain relay 1208 in preparation for seizing the common apparatus.

IVD2c. SELECTOR 1200 RELAY OPERATION

On the completion of the dialing of the hundreds digit, line relay 1202 comes to rest operated, and release relay 1203, release auxiliary relay 1204, and off-normal relay 1205 are maintained operated residual magnetism in the core of such register.

When series relay 1207 restores on completion of the dialing of the hundreds digits, its break contacts 1 complete an operate circuit for chain relay 1208 as hereinbefore described with reference to selector 1100, and chain relay 1208 operates responsive to the associated chain circuit being idle.

When chain relay 1208 operates, its contacts 3 ground common wire 1218 thereby grounding the selected one of the digit wires D1 to D10 as determined by the hundreds digit dialed. The remaining contacts on the chain relay 1208 perform their functions as described for corresponding contacts on chain relay 1109 of selector 1100.

When the thousands controller receives the digit information over the selected one of the digit wires D1 to D10, it positions the select shaft for mechanically selecting the horizontal terminating the calling selector.

In the event that all trunks in the called level are busy, ground appears on the busy wire BU operating busy relay 1106 which locks and at its make contacts 1 applies busy tone through tone-coupling condenser 1211 to the tip conductor of the attached thousands trunk thereby notifying the calling line that there are no trunks available in the called level.

In the event that there is an idle hundreds trunk in the called trunk level, the selector controller controls the associated selector switch in extending the calling line through selector 1200 to such trunk extending to the next stage.

When the next stage is seized, ground potential is returned on the sleeve conductor S of the selected trunk and is extended through contacts of chain relay 1208 to the battery-connected winding of cutoff relay 1201 and is further extended rearwardly over the sleeve conductor S of the attached thousands trunk to maintain operated the previously operated apparatus involved in maintaining the talking connection intact.

Cutoff relay 1201 operates and disconnects line relay 1202 from the calling line, thereby restoring line relay 1202, release relay 1203, and release auxiliary relay 1204. At such time the cutoff relay 1201 and off-normal relay 1205 are the only relays held operated. As noted, the hundreds register HR is maintained operated by residual magnetism.

At such time, the calling line is extended through line switch 1000, selector 1100, selector switch 1500, selector 1200, and a second selector switch to the next switching stage over a selected hundreds trunk such as trunk 121–1. The equipment is now prepared to receive the remaining digits of the directory number of the called line and station.

IVD2d. CLEAROUT

Responsive to the clearout of selector 1200 by disconnection by the calling line or removal of ground potential from the sleeve conductor of the associated hundreds trunk, the operate and locking circuits of cut-off relay 1201 and off-normal relay 1205 are opened and both relays restore, the restoration of the off-normal relay 1205 being somewhat delayed because of its indicated copper sleeve under its winding.

The ground potential from back contacts of line relay 1202, is extended to the release winding of the hundreds register HR in the manner previously described with reference to selector 1100 and selector 1200 is consequently cleared out. The battery potential reappears on the idle-test sleeve conductor ST and the selector is in readiness for receiving another call.

IVD2e. TEST JACK TJ

As described with reference to thousands selector 1100, hundreds selector 1200 is adapted with a test jack TJ for permitting a test connection to be made to the incoming tip, ring, and sleeve conductors of selector 1200.

As will be observed, no restricted service relay is provided, restricted service for any call being controlled entirely by the first switching stage.

*IVE. Selector controller 1300 (Figs. 13 to 15)*

Selector controller 1300 of Figs. 13 to 15 will now be described in detail. One such selector controller is provided for each selector section, comprising ten selectors. The selector controller disclosed herein as serving thousands selector 1100 is similar to the controller serving hundreds selector 1200, as noted. It functions to connect associated calling thousands or hundreds trunks to idle selectors or connectors on a one-at-a-time basis. The illustrated thousands controller is assumed to be associated with switch group SG–1 of selector frame TS–1 and associated with the selector switch 1500.

IVE1. PURPOSE AND ARRANGEMENT

The purpose of selector controller 1300 is to control the previously described extension of a connection from a calling selector to available trunks extending to the next switching stage served by trunks of the called level.

Selector controller 1300 comprises common test relays 1350, trunk level relays 1400, and selector switch 1500, suitably interconnected with each other to perform all testing and control operations required of a selector controller.

IVE2. GENERAL OPERATION

On calls starting from the normal cleared out condition, the general operation of the selector controller 1300 is as follows:

IVE2a. FIVES GROUP SELECTION

On receiving ground over one of the digit wires D1 to D10 of conductors in cable group 1340, from the selector individualized with the selector controller, the concerned set of level relays 1400 operate and close the hold magnet leads and select magnet leads to the respective magnets on selector switch 1500, the select magnet leads closed being determined by the horizontal terminating the calling selector, and the hold magnet leads closed being determined by an idle trunk in the level called.

IVE2b. SELECT MAGNET SELECTION AND OPERATION

On receiving ground, as described over the select magnet wire SM from the calling selector, the select magnet associated with the horizontal terminating the calling selector operates and closes its off-normal contacts to ground the select magnet off-normal wire SON.

IVE2c. HOLD MAGNET SELECTION AND OPERATION

Responsive to the receipt of the secondary off-normal ground, the concerned one of the magnet wires M–1 to M–10 is energized, according to the setting of the common test relays 1350, and the ground on the M lead is extended over the corresponding conductor in cable 1330, through the level relays 1400 which operated responsive to the dialing of a particular digit corresponding to a certain trunk level, to the battery-connected winding of the corresponding hold magnet of selector switch 1500. Responsive to hold magnet and selector magnet operation, the calling line connection is extended over an idle trunk to the next switching stage.

IVE2d. CLEARING OUT

At the end of a time interval sufficient to allow holding ground to be returned over the sleeve wire from the next switching stage associated with the selected trunk, the selector controller clears out, permitting the operated select magnet on the selector switch 1500 to restore, the connection being maintained intact by the continued operation of the concerned hold magnet.

When a connection is cleared out completely, the ground potential on the sleeve is removed and the operated hold magnet restores.

IVE3. FUNCTIONAL RELAY GROUPS

The relays of thousands selector controller 1300 comprise the following functional groups:

(1) Relays 1301 through 1314, common test relays and alarms 1350;

(2) Relays 1401 through 1409, level relays 1400; and (3) Selector switch 1500 and its associated select magnets and hold magnets.

IVE4. DETAILED OPERATION

On all calls, the detailed operation of selector controller 1300 is as follows:

IVE4a. LEVEL RELAYS 1400

As pointed out with reference to Fig. 1, on any selector switch, ten verticals serve as attachment points for ten trunks of a trunk group containing a total of 15 trunks by the described multipling arrangement. Responsive to the dialing of a certain level and the consequent grounding of a selected one of one of the digit leads D1 to D10 extending to the selector controller, the operate circuit of the hold magnets terminating the ten trunks in the called level must be closed in order to select one trunk in the concerned level. Accordingly, levels 1400 are provided, with 4 pairs of relays performing the switching operation. As previously noted, the verticals of the selector switches may be grouped to serve four groups of five trunks, two groups of ten trunks, or two groups of five and one group of ten. Accordingly, each pair of relays serves five verticals and ten verticals comprise termination points for ten trunks, two pairs of relays have their windings connected in parallel.

Level relay 1402 has contacts 1 to 5 for connecting the magnet wires M–1 to M–5 to the hold magnet wires HM–1 to HM–5 associated with the hold magnets HM–1501 to hold magnet HM–1505 (not shown) and relay 1401 has contacts 1 to 5 for connecting the five sleeve test common wires STC–1 to STC–5 to the guard and sleeve test wires G–1 to G–5 and ST–1 to ST–5 associated with the selectors terminated on the corresponding verticals V–1 to V–5 associated with hold magnets HM–1501 to HM–1505.

Relays 1403 and 1404 connect the magnet wires M–6 to M–10 to corresponding magnets on the selector switch, and connect the sleeve test control wires STC–6 to STC–10 to the selectors associated with such switches.

The two relay pairs, relays 1405 and 1406 and relays 1407 and 1408 connect the corresponding hold magnet wires HM–11 to HM–20 and sleeve test wires ST–11 to ST–20 to the last ten hold magnets and trunks associated with verticals thereof in a similar manner.

Accordingly, since any one selector switch serves ten trunks of a particular level, responsive to the calling of a trunk level serving trunks assigned verticals V1 to V10 the relays 1401, 1402, 1403, and 1404 of the first two pairs must be operated in order to test such trunks.

Assuming selector controller 1300 is serving the thousands selector 1100 and the thousands digit "2" of the subscriber directory number is called, the trunks served by level "2" being assigned the first ten verticals of selector switch 1500, the digit wires D2 of cable 1340 are strapped to group control wires GCA and GCB by jumpers 1451 and 1452.

Under such conditions, the ground appearing on the digit wire D2 is extended to the battery-connected winding of relays 1401, 1402, 1403, and 1404. This ground potential is further extended through the associated rectifiers 1410 and 1411 to the battery-connected winding of relay 1409.

Relay 1409 operates and at its contacts 1 to 10 extends the select magnet wires SM of the selectors in the section containing the calling selector to the battery-connected winding of the associated select magnets. As noted, the select magnet wires SM of the selectors have ground potential appearing thereon only when the chain relay is operated, and only the wire SM of the calling selector is energized.

The select magnet associated with the horizontal terminating the calling selector is operated, in this case the select magnet SM–1, and at its off-normal contacts ground the secondary-off-normal conductor SON and positions its select shaft such that operation of any hold magnet closes the contact stackup associated with horizontal H1.

With the select shaft so positioned, mechanically selecting the horizontal for connection to the trunks in the called level terminated on the verticals, the ground potential on the secondary-off-normal wire SON is extended to the common test relays 1301 through 1311.

Responsive to the operation of relays 1401 through 1404, the sleeve test wires of the trunks in the called group are connected to the lower winding of the common test relay.

Under the assumption that all thousands trunks or hundreds trunks are idle, the idle-indicating battery potential from the sleeve test conductor of such trunks causes all the common test relays 1302 through 1311 to operate, as will be described hereinafter.

With the operation of relays 1401 and 1404, the magnet wires M–1 to M–10 are extended through make contacts of relays 1402 and 1404, and over conductors in cable group 1432 to the battery-connected winding of hold magnet HM–1501 to HM–1510. At the same time, the ten guard wires G–1 to G–10 (G–1 and G–2 being the only ones shown) are connected by contacts 1 to 10 of relays 1401 and 1403 over conductors in cable group 1420 to the corresponding contacts on the hold magnets HM–1501 to HM–1510.

If the trunks associated with the verticals controlled by the hold magnets within the called group are busy, the corresponding hold magnet is operated and off-normal contacts 1 ground the associated guard lead. This ground potential appearing on the guard lead is extended through the make contacts on the concerned one of the relays 1401 or 1403 to the sleeve test conductor ST extending to the trunks assigned such verticals. At the same time, the guard ground being connected to the sleeve test conductors maintain the operated hold magnets in their operated condition during the time the selector controller is in use in extending a connection. This ground on the sleeve conductor of the established connection prevents any hold magnet restoration during the time the control apparatus is in use, thereby preventing possible double connections.

IVE4b. COMMON TEST RELAYS 1350

Relays 1302 through 1311 comprise the ten common test trunk relays associated with ten trunks of one trunk level served by any switch. These relays are normally in their illustrated unoperated condition until such time that the selector controller 1300 is taken for use whereupon they simultaneously test all ten trunks in the called trunk group. When the controller is taken for use, the sleeve test wires ST–1 to ST–10 associated with the conductors of the selectors serving the called level are extended to one side of the lower winding of test relays 1302 to 1311 by operation of the level relays as noted. The other side of such winding is normally connected to ground potential through break contacts of cutoff relay 1301.

Consequently, at such time that the sleeve test conductors ST–1 to ST–10 are connected to the test relays by operation of level relay 1400, the idle-indicating battery potential on the sleeve conductors of idle selectors causes the test relays associated with such selectors to operate, indicating to the controller which associated trunks are idle.

Immediately upon operating, any such relay, as determined by an order of preference starting with the lowest numbered test relay, locks operated to the battery potential supplied by resistor 1316 and extended to contacts 4 of the test relays over wire HB. Responsive to the operation and locking of the relay having preference, the locking circuit of the succeeding relays is opened. Ground potential from make contacts 2 of the operated relay operates cutoff relay 1301 which opens the initial operating circuit of all the relays, restoring all excepting the one having locking preference.

The relay having the preference upon being operated and locked operated, connects the noted secondary-off-normal grounded conductor to the hold magnet operate lead HM–1 to HM–10 associated with the selected idle trunk in the called group, as determined by the operation of the test relay.

When certain trunks in the called level are busy, the ground potential appearing on the sleeve test conductor ST associated with the concerned selectors, short-circuits the associated common test relay preventing its operation.

Assuming the first trunk to be idle, the hold magnet associated therewith operates and locks operated to the sleeve test conductor ST associated with that vertical from the ground on the guard lead G–1.

When the hold magnet is operated, the tip, ring, and sleeve conductors of the calling line are extended through the selector switch 1500 to the selected idle trunk extending to the next switching stage.

As hereinbefore pointed out, with reference to the thousands selector 1100 or hundreds selector 1200, responsive to ground appearing on the sleeve conductor from the selector switch, the concerned cutoff relay in such selector operates and opens the chain circuit. Responsive to the opening of the chain circuit and the consequent restoration of the chain relay, the ground appearing on the selected one of the digit wires D1 to D10 is removed thereby releasing the operated ones of the level relays.

With the restoration of the level relays, and the consequent restoration of the relay 1409, the operated select magnet is restored and the connection is maintained intact by the continued operation of the hold magnet from the sleeve conductor ground.

With the restoration of the chain relay in the calling selector, the HB battery supply from current-limiting resistor 1316 is opened, thereby removing battery potential from the HB conductor extending to the upper winding of the operated one of common test relays 1302 to 1311. With the restoration of the operated common test relay, the cutoff relay 1301, and the restoration of the level relays, the selector controller 1300 is returned to normal use in preparation for extending another connection.

Under conditions where all trunks in a called level are busy, none of the common test relays operate and battery potential from the HB lead being placed to the ground-connected winding of the busy relay 1312 for a substantial fraction of a second, as its operate circuit is not opened at break contacts 3 of any relay, causes relay 1312 to operate. With the operation of relay 1312, its contacts ground the busy wire BU extending to the selector. As hereinbefore noted, busy tone is returned to the calling subscriber and upon disconnect, the chain circuit is opened and the common control apparatus and selector clears out as hereinbefore described.

The selector controller 1300 is arranged with a chain alarm relay 1313 which operates to provide an alarm signal in the event that the chained break contacts 5 of the common test relays 1302 through 1311 become open for a predetermined interval of time. Upon such conditions, with the operate circuit open, normally operated chain relay 1313 restores and at its contacts 1 and 2 grounds the wires extending to the alarms, which after a predetermed time give an audible or visible signal indicating that the selector controller has not handled the call within the predetermined time or that a fault exists.

The secondary-off-normal relay 1314 operates responsive to the grounding of the secondary-off-normal conductor SON to thereby isolate the chain-out conductor from the chain-in conductor to individualize the common equipment to the selector originating the call thereby preventing interference from other calling selectors.

*IVF. Connector 1600 (Fig. 16, parts 1 and 2)*

Referring now to Fig. 16, parts 1 and 2, the connector 1600 shown therein will be described.

Connector 1600 includes a test jack T*j*, 14 relays 1601 through 1614, condensers 1615, 1616, and 1617, rectifier 1618, resistor 1619, and magnetic impulse counters SEQ, TR, and UR.

IVF1. Circuit functions of connector 1600

Connector 1600 handles only locally terminated calls which are received over its assigned hundreds trunk 121–1, incoming from a selector switch, such as selector switch 1500. Connector 1600 performs the following principal circuit functions:

(1) Normally, it supplies idle-indicating battery potential to the sleeve conductor of the attached hundreds trunk;

(2) Upon seizure it removes the idle-indicating battery potential and substitutes a holding potential therefor;

(3) It receives and stores three digits, two digits for transfer to the connector controller to control the extension of a connection to a desired line and one digit for controlling the ringing equipment;

(4) It temporarily seizes the chain circuit of its connector section subject to such chain being idle and thereafter guards the seized chain against seizure by any other connector in the same section.

(5) It transfers the two digits of stored digit information to the connector controller while it has the chain seized;

(6) Upon a signal that the called line is busy, it applies busy tone to the calling line and frees the seized chain;

(7) When the called line is idle, it applies ringing tone to the calling line; signals the called line; and frees the seized chain;

(8) When the call is answered, it trips the ringing circuit; completes the talking connection; and reverses the current flow over the tip and ring conductors of the attached hundreds trunk;

(9) It supplies transmitter current to both lines;

(10) Upon disconnect by the calling and called line, it clears out and releases the entire connection by removing holding ground from the incoming sleeve and from the sleeve of the forward connection; and

(11) It provides P.B.X special services.

IVF2. Relay functions of connector 1600

The 14 relays (1601 to 1614) of connector 1600 have principal functions assigned thereto as follows:

Relay 1601 (reverse battery) operates responsive to called party answer and reverses the incoming tip and ring conductors to provide any desired supervisory function;

Relay 1602 (line) supplies transmitter current to the calling line; operates when the connector is seized; and restores thereafter under control of the calling device or hookswitch whenever the calling line loop is opened;

Relay 1603 (back-bridge) operates over the called line when the call is answered to operate the reverse battery relay, and to supply transmitter current to the called line;

Relay 1604 (release) is slow-releasing by virtue of a copper sleeve under its winding; it is operated by the line relay; it remains operated during pulsing, but releases when the line relay remains restored for a substantial fraction of a second;

Relay 1605 (release auxiliary) is operated by the release relay and aids in the performance of the release relay functions;

Relay 1606 (ring-cutoff) is operated when the called line answers to disconnect the called line from the ringing current supply;

Relay 1607 (ring-reverse) operates when the station digit dialed corresponds to the second station on the line to cause ringing current to be applied to the other side of the line for divided ringing;

Relay 1608 (ring-trip) is slow-operating by virtue of a copper collar surrounding the armature end of its core and is operated by the D.C. flow in the ringing circuit when the call is answered to open the ringing circuit and to close the talking circuit;

Relay 1609 (chain) is operated when the stations digit has been dialed; it seizes the chain of the local connector section for the exclusive use of this connector subject to the chain being idle;

Relay 1610 (busy) is operated if the called line is busy to apply busy tone signals to the calling line;

Relay 1611 (test) operates when the called line is idle to "cut-through" the tip and ring conductors of the calling line to the tip and ring conductors of the called line;

Relay 1612 (series) is operated by the line relay; is slow-restoring by virtue of a copper sleeve under its winding; and it remains operated during pulsing but restores when the line relay remains restored for substantial fraction of a second;

Relay 1613 (series auxiliary) is operated by the series relay and aids in the performance of the functions of the series relay; and Relay 1614 (off-normal) operates when any one of the counters is operated and remains operated until all counters are released.

IVF3. Impulse counter functions of connector 1600

The three impulse counters, the combined sequence and stations counter SEQ, the tens register TR, and the units register UR of connector 1600 have principal functions assigned thereto as follows:

Impulse counter SEQ (sequence and stations counter) operates at the end of each digit series of impulses to distribute such series to registers TR and UR and to record the stations digit dialed.

Impulse counter TR (tens register) registers the number of impulses in the tens digit.

Impulse counter UR (units register) registers the number of impulses in the units digit.

Sequence device SEQ, which actuates its contact set 1 on receipt of the first operating pulse, disconnects resistor 1619 as a sleeve-guarding measure and completes an operate circuit for the off-normal relay 1614.

IVF4. Detailed operation

A detailed operation of connector 1600 will now be given.

IVF4a. SEIZURE

Connector 1600 is seized by the closure of the calling line loop through selector switch 1500 to the tip, ring, and sleeve conductors of hundreds trunk 121–1 to the battery and ground connected windings of line relay 1602. Relay 1602 operates and closes an operate circuit for release relay 1604.

Release relay 1604 operates and at its contacts closes an operating circuit for release auxiliary relay 1605.

Release auxiliary relay 1605 operates and at its contacts 1 removes the idle-indicating battery potential from the sleeve conductor and places ground potential thereon; its contacts 2 ground the ring-start wire RI–ST, starting the common ringing apparatus into operation if it is not already operating; its contacts 4 prepare an operate circuit for ring-cutoff relay 1606; its contacts 5 ground common locking wire 1636; its make contacts 6 ground common locking wire 1626; and its contacts 7 prepare the release circuit for sequence counter SEQ.

As hereinbefore pointed out, the seizure of the connection is accomplished during the interdigit period and immediately following the dialing of the hundreds digit of the directory number of the called line and station, the tens, units, and stations digits are dialed in succession.

IVF4b. TENS DIGIT REGISTRATION

Each time the calling device (not shown) is operated to transmit a series of circuit interruption impulses constituting the tens, units, and stations digits, line relay 1602 is restored momentarily for each such interruption impulse in a series, comprising from one to ten impulses, depending upon the digit dialed.

Release relay 1604 and release auxiliary relay 1605 remain operated throughout any series of impulse-induced restorations of line relay 1602.

Series relay 1612 operates promptly upon the first restoration of line relay 1602, its operate circuit being from the back contacts of relay 1602, break contacts 3 of relay 1603, make contacts 7 of release auxiliary relay 1605, wire 1625, break contacts 4 of sequence counter SEQ, wire 1632, and break contacts 3 of series auxiliary relay 1613 to the battery-connected winding of series relay 1612. Upon operating, series relay 1612 locks operated independent of contacts 3 of series auxiliary relay 1613. As its make contacts 1, relay 1612 completes an operate circuit for auxiliary relay 1613 from the ground on grounded wire 1636.

Series auxiliary relay 1613 operates; its make contacts 3 opens the initial operate circuit of the series relay 1612; and its contacts 1 prepare an operate circuit for advancing sequence counter SEQ.

With release auxiliary relay 1605 maintained continuously operated, each restoration of line relay 1602 delivers an impulse at its break contacts to pulse wire 1625 extending through break contacts 4 of sequence counter SEQ to pulse wire 1632, as noted. These ground impulses are transmitted to the operate winding of the tens register TR through break contacts 2 of the sequence counter SEQ and maintain series relay 1612 operated.

When line relay 1602 comes to rest, operated, at the end of any digit series of impulses, series relay 1612 restores after a slight delay and opens the operate circuit of relay 1612 which restores sequentially a short time later. At such time when series relay 1612 is restored and series auxiliary relay 1613 is yet operated, the ground appearing on wire 1636 is extended through break contacts 1 of relay 1612 and make contacts 1 of relay 1613 to deliver a stepping impulse to sequence counter SEQ.

This stepping impulse which is delivered to device SEQ at the end of the receipt and registration of the tens digit, causes both its contact sets 1A and 1B to shift to their alternate positions. Make contacts 1A close an operate circuit for off-normal relay 1614; break contacts 1A disconnect idle-indicating battery from wire 1633 to prevent the reapplication of idle-indicating potential to the incoming sleeve conductor of the connector before the device SEQ is cleared out; break contacts 1B disconnect the incoming impulse wire 1632 from the first tens register TR; and make contacts 1B transfer such pulsing wire to the operate winding of units register UR.

IVF4c. UNITS DIGIT REGISTRATION

Responsive to the dialing of the units digit of the called directory number, a series of circuit interruption impulses are transmitted over pulsing wire 1625 and are extended through break contacts 4 and make contacts 1B of counter SEQ to the battery-connected winding of units register UR. At the same time, these circuit-interruption impulses are transmitted to series relay 1612 which operates as noted and operates series auxiliary relay 1613. The contact sets 1 to 10 of register UR are actuated successively, responsive respectively to the impulses constituting the units digit.

When line relay 1602 comes to rest, operated, at the end of the dialing of the units digit, series relay 1612 restores after a slight delay and thereafter restores series auxiliary relay 1613, as noted. A second stepping impulse is thereupon delivered to the winding of sequence device SEQ from the ground on conductor 1636 causing it to shift its contact set 2 to its alternate position which opens the operate circuit of units register UR and transfers the pulsing wire to wire 1638 extending to the winding of counter SEQ.

IVF4d. STATIONS DIGIT REGISTRATION

Responsive to the restoration and reoperation of the line relay according to the impulses of the stations digit, ground impulses are transmitted over wire 1625 and 1638 through contacts 2, 3, and 4 of device SEQ to the operate winding of sequence device SEQ. At the same time, series relay 1612 operates followed thereafter by the operation of relay 1613. The make contacts on relays 1612 and 1613 maintain the operate circuit of sequence device SEQ closed.

The stations digit comprises one or two impulses depending on whether the called party is on the tip or ring side of the called line. Therefore, responsive to the dialing of the stations digit, sequence device SEQ operates its contacts 3 or 4 depending on whether stations digit "1" or digit "2" were dialed. Assuming that the digit "2" is dialed, the sequence device actuated its contact sets 3 and 4 responsive to the two impulses of the dialed digit.

Responsive to the third stepping impulse delivered over wire 1636, sequence device SEQ actuates its contact sets 5 which shift to their alternate position, thereby connecting wire 1628 to wire 1637.

Shortly after the third stepping impulse from 1636 is delivered to the operate winding of sequence device SEQ, series auxiliary relay 1613 restores and the ground on wire 1636 is extended to wire 1637 which is connected to the battery-connected winding of the ring-reverse relay 1607 through SEQ contacts 5, over wire 1628 and make contacts 3. At the same time, ground on wire 1637 is extended through make contacts 4 of device SEQ to wire 1629 extending to one side of the chain relay 1609 through break contacts on the busy relay and the test relay.

Ring-reverse relay 1607 operates and locks through its make contacts 3 to the grounded conductor 1636, and at its make contacts 1 and 2 transfer the generator-ground wire GEN–GRD from the ring conductor of the called line to the tip conductor in preparation for signalling the called station on the tip conductor of the line.

As described hereinbefore with reference to selectors 1100 and 1200, battery from the chain-end wire (in the connector controller, resistor 1749) completes an operate circuit for chain relay 1609 providing the selector controller is idle and no other connectors have their chain relays operated.

With line relay 1602, release relay 1604, release auxiliary relay 1605, and ring-reverse relay 1607 operated, sequence device SEQ in position 5, and the tens and units registers TR and UR set according to their respective line performing any required supervisory function, and at its contacts 3 open the idle-indicating battery supply wire.

During conversation the following relays of connector 1600 are operated:

(1) Reverse-battery relay 1601
(2) Line relay 1602
(3) Back-bridge relay 1603
(4) Release relay 1604
(5) Release auxiliary relay 1605
(6) Ring-cutoff relay 1606
(7) Test relay 1611
(8) Off-normal relay 1614

Additionally, the three counters SEQ, TR, and UR are held operated by residual magnetism.

IVF4i. CLEAROUT

Responsive to disconnect by both the calling and called parties, connector 1600 is cleared out.

Assuming the calling line disconnects, the opening of the line loop across the tip and ring conductors restores line relay 1602 which restores relays 1604 and 1605 sequentially. Wire 1626 remains grounded at make contacts 4 of reverse-battery relay 1601 thereby maintaining relays 1601, 1603, 1606, and 1611 locked operated.

When the called line thereafter disconnects, the back-bridge relay 1603 restores, and restores reverse-battery relay 1601. With the restoration of relay 1601, ground is removed from locking wire 1626 and all operated relays restore with the exception of off-normal relay 1614 which is maintained operated by contacts 1 of the counters, the counters being held operated by residual magnetism.

At the time when all relays are restored excepting off-normal relay 1614 which is maintained operated by contacts 1 of any of the impulse counter devices, a clear-out circuit for all counters is prepared.

Ground potential from break contacts of the line relay 1602 is extended to wire 1627 through break contacts 3 of relays 1603 and 1605. This ground is further extended through the back contacts 2 of relay 1611, break contacts 1 of ring-reverse relay 1607, the winding of ring trip-relay 1608, break contacts 2 of chain relay 1609, break contacts 6 of test relay 1611 to wire 1635 from whence it is extended through make contacts 1 of off-normal relay 1614 to battery through the restoring windings of the counters SEQ, TR and UR in series. The magnetic flux generated by the current flow through the restoring windings is in opposition to the residual magnetism thereby each counter restores.

Responsive to the restoration of each of the magnetic impulse counters, the operate circuit of the off-normal relay 1614 is opened, restoring it. With the restoration of the off-normal relay 1614, the knock-down or restoration circuit of the counters is opened at contacts 1 and resistor 1619 is again connected to wire 1633.

IVF4j. P.B.X SERVICE

As will be described in detail hereinafter, certain lines of this exchange may be arranged to provide P.B.X service, these lines having certain tens digits assigned thereto. When calling a P.B.X group, the tens digit assigned P.B.X service is followed by the dialing of the units digits "1," else the call will be extended to the called line whether a P.B.X line or not. This operation will be described in connection with the connector controller.

Under conditions when all lines in a called P.B.X group are busy, ground is returned on the P.B.X busy lead P.B.X–BUSY and is extended through make contacts 1 of the operated chain relay to operate busy relay 1610 which functions thereafter as previously described.

*IVG. Connector controller 1700 (Figs. 17 to 19)*

Connector controller 1700 of Figs. 17 to 19 will now be described in detail.

One connector controller is provided to serve the one hundred lines associated with five connector switches of any switch group. The connector controller functions to connect associated calling connectors with called lines on a one-at-a-time basis. The illustrated connector controller is assumed to be associated with switch group SG–1 of connector frame CSF–1.

IVG1. PURPOSE AND ARRANGEMENT

The purpose of connector controller 1700 is to control the crossbar connector switch 1900 in connecting the calling connectors, such as connector 1600, to called lines.

Connector controller 1700 comprises P.B.X relays 1750 and connctor switch connector relays 1850 suitably interconnected with each other and associated with the five connector switches of a switch group, one such switch being shown in Fig. 19, to perform the necessary switching operation in extending calls to called subscriber and P.B.X lines.

IVG2. GENERAL OPERATION

On calls starting from the normal cleared out condition, the general operation of connector controller 1700 is as follows:

Assuming the connector switch 1900 shown in Fig. 19 is connector switch CSS–1 of switch group SG–1 of connector switch frame CSF–1, as noted in Fig. 1, part 7, the lines having the tens and units digits ending in 01 to 09 and 10 to 19 are served by such switch.

When the calling line has completed the dialing of the directory number of the called line, assuming that the ground on the selected one of the tens digit wire is transmitted to the winding of the upper or lower select magnet of the switch serving the called lines having the tens digit dialed, such magnet operates and grounds the units lock off-normal lead UL–ON. This lead extends to the windings of the associated connector switch connect relays, there being five such groups of switch-connect relay, one group for each switch.

Ground appearing on the units lock off-normal lead UL–ON causes the connect relays associated with switch 1900 to operate and close the select magnet and hold magnet leads through to the magnets of the connector switch.

Ground on the units digit leads from the units register UR is transmitted to the winding of the select magnet associated with the called line.

The select magnet associated with the double horizontal serving two lines, including the called line, operates and together with the operation of either the upper or lower select magnets, selects the one horizontal that serves the called line. Ground potential is placed on the secondary-off-normal lead SON and is extended to the connector chain relay contacts and is connected to the hold magnet operate wire HM–OP.

The hold magnet associated with the vertical terminating the calling connector operates and closes the tip, ring, and sleeve conductors of the called line to the tip, ring, and sleeve conductors of the calling connector.

The off-normal contacts on the hold magnet lock the hold magnet operated to the noted ground on the lock lead L and place ground on the busy lead BU extending to the connector, as previously pointed out.

If the called line is idle, the chain relay is released thereby removing the ground from winding of the operated auxiliary select magnet SMU or SML and from the selected one of the principal select magnet leads SM–1 to SM–10. All select magnets are deenergized, but the cross points between the verticals and horizontals and the upper or lower contact group selected by select magnets SMU or SML are held closed by the continued operation of the hold magnet.

If the called line is busy, the operation will be similar excepting that upon operation of the busy relay and conregistered digits, an operate circuit is closed for the chain relay, which operates provided the chain is idle, as noted.

Contacts 3 and 4 of chain relay 1609 prevent any interference by other connectors associated with controller 1700 and renders the controller individual to the calling connector. Make contacts 1 prepare the operate circuit of busy relay 1610 in the event that a P.B.X number has been called and no lines are idle; its break contacts 2 open the operate circuit of the ring-trip relay to prevent its operation until such time that the called line may have been tested; its make contacts 5 and 6 ground conductors 1630 and 1631 extending to the tens and units registers TR and UR thereby grounding the selected one of the tens digit wires and the units digit wires extending to the connector controller and connector switches; and make contacts 7 connect the secondary-off-normal wire SON to the hold magnet operate wire HM–OP.

IVF4e. TESTING THE CALLED LINE

Assuming that the called line was reached by dialing directory number 2101–2, (tens digit "0," units digit "1," and stations digit "2"), the tens register TR connects grounded wire 1630 to tens wire T–0 and the units register UR connects grounded wire 1631 to units wire U–1. As will be described hereinafter, since the tens digit is not assigned to a P.B.X group, no P.B.X hunting takes place. The ground appearing on the selected tens and units digit wires is extended to the connector controller and connector switch thereby causing the tip, ring, and sleeve conductors of the calling connector to be extended to the tip, ring, and sleeve conductors of the called line by operation of the connector controller.

As will be described hereinafter, when the hold magnet associated with the vertical terminating the calling connector operates, it locks operates through off-normal contacts to the grounded locking conductor L and at other off-normal contacts ground busy wire BU.

At the time that such hold magnet operates and closes its off-normal contacts, the sleeve conductor of the called line is extended to one side of the upper winding of test relay 1611, the other side of such winding being connected to ground potential on wire 1626 through break contacts 3 of busy relay 1610 and rectifier 1618. Rectifier 1618 prevents the ground on wire 1626 from being projected forward on the sleeve conductor so that the cutoff relay associated with the calling line will not be operated prematurely.

Assuming the called line to be idle, the battery potential from the battery-connected winding of the cutoff relay of called line, causes current flow through the upper winding of test relay 1618. Relay 1618 operates and locks operated through its lower winding and make-first contacts 7; its make contacts 4 ground the sleeve conductor S to operate the cutoff relay of the called line to prevent answer by the called line from causing line finding action to take place; its contacts 2 and 3 connect the battery and ground connected windings of the back-bridge relay 1603 to the tip and ring conductors of the called line; its make contacts 1 apply ring-tone from conductor RT through tone-coupling condenser 1717 to the tip conductor of the calling line thereby signalling that ringing has started; its break contacts 5 open the operate circuit of the busy relay from the grounded busy conductor BU; its contacts 6 connect generator battery lead GEN-BATT to the ring conductor of the called line in series with the winding of ring-trip relay 1608; and at its contacts 8 free the seized chain thereby restoring the chain relay 1609, freeing the connector controller for use in extending other calls.

Responsive to the restoration of chain relay 1609, its break contacts 2 complete the ringing circuit and ringing current is supplied between the tip conductors and ground to signal the desired party; its make contacts 5 and 6 remove the ground from the digit wires; and its make contacts 7 open the initial operating circuit of the hold magnet associated with the calling connector. The hold magnet is held operated from the ground on sleeve conductor S.

IVF4f. THE CALLED LINE TESTS BUSY

Assuming that the called line is busy, the sleeve conductor of the called line has ground potential thereon from the connector in use and this ground appears on the sleeve conductor short-circuiting the upper winding of test relay 1611, preventing its operation.

Responsive to the failure of test relay 1611 to operate, after a slight delay, the ground potential on the busy lead BU, originating at the off-normal contacts of the operated hold magnet, is extending through break contacts 5 of the unoperated test relay to the battery-connected winding of busy relay 1610.

Busy relay 1610 operates, and at its contacts 1 applies busy tone to the calling line through the tone-coupling condenser 1617. Its make contacts 2 extend the ground potential from make contacts 3 of release auxiliary relay 1605, through make contacts 2 of relay 1610 locking it operated. Break contacts 3 of the busy relay 1610 opens the operate circuit of the upper winding of test relay 1611 and at break contacts 4 free the chain, thereby releasing the common equipment.

Responsive to the receipt of busy tone, the calling subscriber disconnects and the connector and preceding apparatus is restored to normal.

IVF4g. CALLED LINE ANSWER

Ring-trip relay 1608, whose winding is included in the ringing circuit does not operate before the call is answered for each ringer (not shown) on the called line has the usual condenser in series therewith to block direct-current flow and because the shading collar surrounding the armature end of the core, keeps it from responding to the alternating ringing current.

In order to permit ring-tip relay 1608 to be operated by direct current flow during the application of ringing current (if the call is then answered) the applied frequency of ringing current is in series with (superimposed upon) the exchange battery.

When the call is answered at the called station on the called line, the closure of the usual talking bridge across the called line causes direct-current flow thereover from the generator battery lead GEN-BATT, operating ring-trip relay 1608. Relay 1608 closes its make contacts to apply ground potential to the battery-connected winding of ring-cutoff relay 1606.

Ring-cutoff relay 1606 operates and at its make-break contacts 1 disconnects ringing tone from the calling line; its make contacts 2 and 3 transfer the tip and ring conductors of the called line from the ringing current and extends the talking bridge across the ground and battery connected windings of back-bridge relay 1603, thereby supplying transmitter current to the called line; its break contacts 4 restore ring-reverse relay 1607 and its make contacts 5 lock ring-cutoff relay 1606 operated to the ground on locking conductor 1626. Ring-trip relay 1608 restores, its operate circuit being opened by contacts 2 and 3 of restored ring-cutoff relay 1606.

The transmitter current flow through the windings of relay 1603 cause it to operate and at its contacts 1 to remove the ground from the ring-start wire RI-ST; its contacts 2 close an operate circuit for reverse-battery relay 1601; and at its break contacts 3 opens the pulsing wire 1625.

IVF4h. ANSWERED SUPERVISION

The relay 1601 operates and at its contacts 4 maintain an additional ground on locking conductor 1626, rendering the connector last-party release. Its contacts 1 and 2 reverse the tip and ring conductors of the calling sequent restoration of relay 1609, the locking circuit of the operated hold magnet will be opened, thereby returning the switch to normal condition.

IVG2a. P.B.X SERVICE

Certain lines served by a connection switch are adapted for P.B.X service by extending the sleeve conductor of a line assigned P.B.X service to P.B.X group relays from whence they are used in determining the busy or idle condition of such lines. Two such sleeve extensions are shown in cable 1735.

IVG3. FUNCTIONAL RELAY GROUPS

The relays of connector controller 1700 comprise the following functions groups:

(1) Relays 1701 through 1704, P.B.X grouping relays.
(2) Relays 1705 to 1708, P.B.X control relays.
(3) Relays 1709 to 1718, P.B.X test relays.
(4) Relays 1801 through 1815, five connector switch connect relay groups, three relays per group.

IVG4. DETAILED OPERATION

As pointed out, with reference to Fig. 1, parts 7 and 8, connector switch CSS–1 serves lines having tens digits "0" and "1" and units digits "1" to "0." Accordingly, the tens digit wires T–0 and T–1 are associated with connector switch CSS–1, switch CSS–1 being similar to the illustrated connector switch 1900 of Fig. 19.

It will be observed in Fig. 1, parts 7 and 8, that the lines having the tens digit "1" are assigned the horizontals associated with the lower select magnet and the lines having the tens digit "0" are associated with the horizontals associated with the upper select magnet. Further, connector switch CSS–2 is assigned the tens digits "2" and "3"; the third switch is assigned the tens digits "4" and "5"; and so forth.

Referring now to the Fig. 19 it will be observed that the tens wires T–1 to T–10 are associated with the battery-connected windings of lower select magnet SML and upper select magnet SMU, respectively.

Assuming tens digit "0" is dialed, then following the operation of the chain relay in the calling connector, ground appears on tens digit wire T–0 and is extended to the battery-connected winding of upper select magnet SMU which operates and at its off-normal contacts extends ground potential to the units-lock off-normal wire UL–ON extending over a conductor in cable group 1837 to the battery-connected windings of the connect relays 1801 to 1803, these relays being associated with the first switch.

Responsive to the ground appearing on the units-lock off-normal wire, each of the relays 1801 to 1803 operate and close their make contacts 1 to 10.

Assuming that the units digit dialed is the digit "1," ground appears on the units digit wire U–1 and is extended over an associated conductor SMC–1 in cable group 1737 to contacts 1 on the connect relay 1803.

The ground on digit wire U–1 is extended through make contacts 1 of relay 1803 to the battery-connected winding of principal select magnet SM–1, such magnet being associated with the double horizontal terminating the called line.

Responsive to the operation of the upper select magnet SMU and the consequent operation of the principal select magnet SM–1, the lower horizontal of double horizontal H–1 is selected, such horizontal being associated with the called line.

The off-normal contacts of the operated principal select magnet ground the secondary-off-normal conductor SON which, as noted, is connected to the hold magnet operate wire HM–OP through contacts 7 of the calling connector from whence it is extended through make contacts 1 of the operated switch connect relay 1801 to the hold magnet wire HM–1 extending to the battery-connected winding of hold magnet HM–1901 over conductors in cable group 1836.

The contacts 1 to 10 of relay 1801 and contacts 1 to 10 of relay 1802 serve to connect the hold magnet operate wires of each of the calling connectors associated with any switch group to the hold magnet associated with the vertical terminating such connector, in this disclosure 15 connectors being served by the connector switches of a switch group.

Responsive to the operation of the hold magnet HM–1901, it being associated with the vertical terminating calling connector 1600, it locks operated through its off-normal contacts to grounded lock conductor L and at its off-normal contacts 1, ground the busy lead BU, as noted.

At such time, the called line associated with select magnet SM–1 and upper select magnet SMU is connected through the cross points of horizontal H1 and vertical V1 to the tip, ring, and sleeve conductors of the calling connector and the testing of the called line is performed in the manner previously described.

Upon finding such line idle, the chain relay is restored thereby disconnecting the secondary-off-normal wire SON from the hold magnet wire HM–OP and removing the ground from the tens and units digit wires T–0 and U–1, thereby permitting the auxiliary select magnet SMU and principal select magnet SM–1 to restore. At this time, however, the indicated cross points of horizontal H1 and vertical V1, together with the contacts associated with the upper select magnet are maintained closed as long as hold magnet HM–1901 is operated. The initial operate circuit of hold magnet HM–1901 is opened but it does not restore as ground from lock conductor L of calling connector 1600 maintains it operated.

With the restoration of the principal and auxiliary select magnets, the operating ground potential is removed from the connect relays, permitting them to restore thereby returning the connector controller 1600 to common use.

IVG4a. P.B.X SERVICE

It has been chosen to provide certain ones of the lines whose directory number tens digit is 1, 2, 3, or 4, for P.B.X service.

Referring now to Fig. 19, it will be observed that the lines associated with the horizontals H1 and H2 and associated with the lower select magnet are arranged in a P.B.X group by connecting an extension of the sleeve conductor to the P.B.X grouping relays of Fig. 17 over conductors in cable group 1735. Accordingly, with the dialing of the tens digit "1," thereby operating the auxiliary select magnet SML and the dialing of the units digit "1," thereby operating select magnet SM–1, the P.B.X relays 1750 are operated to extend the call to an idle line in the P.B.X group.

On completion of the dialing of the stations digit "1" of the directory number, operation of the chain relay of the calling connector grounds the tens digit wire T–1 and the units digit wire U–1, as noted. Ground appearing on the digit wire T–1 is extended to the battery-connected winding of the auxiliary select magnet SML and at the same time is extended over the tens extension wire TE–1 to the battery-connected winding of the P.B.X grouping relay 1701.

The lower select magnet SML operates as hereinbefore described, responsive to the grounding of the associated digit wire and at its off-normal contacts, operates its associated connector switch connect relays to connect the select magnet and hold magnet wires to the corresponding magnets of switch 1900.

Relay 1701 operates from the ground appearing on the tens extension wire TE–1 and at its contacts 12 close an operate circuit for units relay 1705 from the ground appearing on the units wire U–1; at its contacts 1 to 10, connect the sleeve wires of all lines serving as P.B.X lines (in this disclosure S1 and S2 extending to the P.B.X grouping relays over conductors is cable group 1735) to the make contacts 1 to 10 of units auxiliary relay 1706; and at its contacts 11 connects battery through resistor 1731 to locking conductor 1722 in preparation for locking any P.B.X test relays that operated.

It will be observed that there is a P.B.X grouping relay for each of the tens digit extension wires assigned P.B.X service, each such relay connecting the sleeves of the lines in their respective P.B.X groups to the units auxiliary relay for test to determine their busy or idle condition.

Units relay 1705 operates from the ground on units digit wire U–1 and at its make contacts 1 prepares an operate circuit for units auxiliary relay 1706; its make contacts 2 prepare an operate circuit for slow-operating busy relay 1708; and its break contacts 3 open the select magnet control wire SMC–1 thereby delaying the operation of all select magnets until an idle line in the called P.B.X group is determined.

Units auxiliary relay 1706 operates and at its make contacts 1 to 10 connects the sleeve wires of the lines of switch 1900 serving as P.B.X lines to the ground-connected winding of the P.B.X test relays.

Assuming switch 1900 has two lines serving as P.B.X lines and assuming the first P.B.X line is busy, the ground potential on the sleeve conductor of the busy lines and the battery potential from the battery-connected winding of the cutoff relay of the associated line circuit of the second line are extended through the closed contacts on the P.B.X grouping relays and the contacts of units auxiliary relay 1706 to the ground-connected winding of the P.B.X test relay 1709 to 1718.

Relay 1709 is short-circuited by the grounded sleeve conductor and fails to operate but relay 1710 operates in series with the battery-connected winding of the cutoff relay. Relay 1710, at its contacts 1, locks operated to the locking battery potential on locking conductor 1722; its make contacts 2 extend ground potential to wire 1721 extending to the battery-connected winding of P.B.X cutoff relay 1707; and its make contacts 3 exercise an order of preference in favor of the line assigned the lowest numbered P.B.X test relay operated.

Cutoff relay 1707 operates and at its break contacts 1 disconnect the sleeve extensions of the calling line from the P.B.X test relays; at its make contacts 2 disconnect the operate circuit of the busy relay 1708, this operation being performed before the operate time of the busy relay 1708 has elapsed; and extends ground potential from make contacts 2 of units relay 1705 through break contacts 3 of relay 1709 and make contacts 3 of relay 1710 to the select magnet control wire SMC–2 extending to the select magnet associated with the second line in the called P.B.X group.

Select magnet SM–2 operates and at its off-normal contacts ground the secondary-off-normal wire SON, which as previously described, is extended through contacts on the chain relay of the calling connector to operate the hold magnet associated with the vertical terminating such connector. At such time, the calling line is connected to the called line, such called line being the second line of the P.B.X group, and the connector controller is cleared out as previously described.

In the event that no P.B.X lines are idle, cutoff relay 1707 fails to operate and ground from make contacts 2 of units relay 1705 is extended to the battery-connected winding of slow-operate busy relay 1708 for a substantial fraction of a second and causes this relay to operate.

Responsive to the operation of busy relay 1708, ground potential is placed on the P.B.X-BUSY lead extending to the calling connector. As previously described, the busy relay of the calling connector operates and supplies busy tone to the calling line.

Responsive to the removal of ground from the units and tens digit wires upon extension of the calling line to the called line and the consequent restoration of the connector chain relay, units relay 1705 restores and the operated one of the P.B.X grouping relays restore, thereby completely clearing out the P.B.X relays 1750. Upon the restoration of the principal and auxiliary select magnets on completion of the call extension, ground is removed from the units lock off-normal wire and the operated connector switch connect relays are restored.

The connector controller 1700 is now restored to common use in preparation for calls from other connectors.

We claim:

1. In a switching system, selector switching apparatus for enabling in trunks to be connected respectively to idle trunks in respectively called numerical groups of out trunks, or levels, said switching apparatus comprising a group of crossbar switches each including a set of vertical multiples and a set of horizontal multiples and cross-point means for connecting any vertical multiple thereof to any horizontal multiple thereof, means connecting the in trunks respectively to the multiples of one set of multiples of each switch, means connecting the out trunks respectively to the multiples of the other set of multiples of the switches, with each level being connected to a separate switch, whereby such switches are common to the in trunks and correspond respectively to the levels, means controlled over any calling in trunk for selecting any level and for selecting an idle trunk therein, means for selecting the switch corresponding to the selected level, and means for operating the cross-point means of the selected switch to connect the said calling in trunk to the said selected idle trunk in the called level.

2. In a switching system according to claim 1, a switchboard frame comprising successive tiers of apparatus, each tier including a separate group of switches and associated control means according to claim 1, corresponding switches of the several tiers comprising columns corresponding respectively to said levels, and vertically extending inter-group strap means for connecting the out trunks of any level to corresponding switches of adjacent tiers.

3. A switching system according to claim 2, wherein each tier of apparatus includes independent means controlled over the associated in trunks to select called levels and to control the switches to effect connections from the calling in trunks to idle trunks in selected levels.

4. In a switching system according to claim 3, means for applying an interim guard condition to any idle out trunk selected at any tier to prevent its selection at any other tier in the interval elapsing between its first said selection and the consequent completion of a connection thereto.

5. In a switching system according to claim 3, each crossbar switch having hold magnets associated respectively with the multiples of one set thereof for closing and holding the associated cross-point means closed, normal circuit means for holding any said hold magnet operated as long as the cross-point connection closed thereby is desired, temporary circuit means for holding any hold magnet operated during selection of an idle trunk in a called level, and means for rendering any said second circuit means effective dependent upon a call being in progress to the level containing the out trunk held closed by its associated hold magnet and further depending upon the last said hold magnet being energized.

6. A switching system according to claim 3, wherein the means for selecting idle trunks in a called level effects selection of the out-trunk multiples in the same fixed order of preference at all tiers, whereby out trunks connected to later-choice positions may be multipled to more tiers than those connected to earlier-choice positions to secure the trunk efficiency of a larger number of trunks in a level than can be connected to a single tier.

7. In a switching system according to claim 1, at least one said switch having two similar but numerically distinct levels of trunks connected to the same set of multiples thereof, such set of multiples comprising two groups of multiples corresponding respectively to the said two levels, whereby the number of switches in the group is less than the number of levels of out trunks reached therefrom.

8. In an automatic switching system including switching apparatus operable to extend first trunks to respective idle second trunks, a controller common to said first trunks for controlling said switching apparatus, means responsive to a calling condition on any first trunk for associating said controller specifically therewith, means for thereupon causing the controller to first test the second trunks to select an idle one thereof and to thereafter operate said switching apparatus to connect the associated first trunk to the selected second trunk, normal circuit means for holding any said connection of a said first trunk to a said second trunk as long as desired and for thereupon severing the connection, means for marking any said connected second trunk busy to the controller so long as said normal circuit means is holding such second trunk connected to a said first trunk, and means for preventing any said connection of a said first trunk to a said second trunk from being severed by control exercised by said normal circuit means while said controller is testing the second trunks.

References Cited in the file of this patent

UNITED STATES PATENTS

| | | |
|---|---|---|
| 1,553,317 | Hinrichsen | Sept. 15, 1925 |
| 1,595,084 | Goodrum et al. | Aug. 10, 1926 |
| 1,700,467 | Clark | Jan. 29, 1929 |
| 2,038,222 | King | Apr. 21, 1936 |
| 2,056,265 | Germanton | Oct. 6, 1936 |
| 2,104,449 | Bowe et al. | Jan. 4, 1938 |
| 2,504,274 | Nilsson et al. | Apr. 18, 1950 |
| 2,512,942 | Jones | June 27, 1950 |
| 2,559,702 | Bellamy | July 10, 1951 |
| 2,575,882 | Lundkvist | Nov. 20, 1951 |
| 2,741,663 | Obermann | Apr. 10, 1956 |
| 2,744,163 | Den Hertog | May 1, 1956 |
| 2,747,021 | Chubb et al. | May 22, 1956 |